United States Patent [19]

Danielson et al.

[11] Patent Number: 4,997,283

[45] Date of Patent: Mar. 5, 1991

[54] VEHICLE STRAIGHTENER MEASURING UNIT, MEASURING APPARATUS RELIANT ON REFLECTED BEAMS, AND SOURCE, TARGETS AND METHOD

[76] Inventors: Glen C. Danielson, 2515 Pioneer Blvd., Grand Island, Nebr. 68801; Thomas M. Westhoff, 716 NW. 8th St., Willmar, Minn. 56201

[21] Appl. No.: 359,921

[22] Filed: May 31, 1989

Related U.S. Application Data

[63] Continuation-in-part of Ser. No. 329,010, Mar. 27, 1989, abandoned.

[51] Int. Cl.[5] .............................................. G01C 5/00
[52] U.S. Cl. .................................... 356/375; 356/400
[58] Field of Search ...................... 356/4, 152, 20, 21, 356/375, 400; 72/705; 33/288

[56] References Cited

U.S. PATENT DOCUMENTS

| | | |
|---|---|---|
| 3,633,010 | 1/1972 | Svetlichny . |
| 4,271,829 | 6/1981 | Heckele . |
| 4,325,640 | 4/1982 | Dreyfus et al. . |
| 4,329,784 | 5/1982 | Björk . |
| 4,330,945 | 5/1982 | Eck . |
| 4,441,259 | 4/1984 | Lietermann et al. . |
| 4,454,659 | 6/1984 | Eck . |
| 4,480,912 | 11/1984 | Snyder, Jr. . |
| 4,492,471 | 1/1985 | Wiklund . |
| 4,556,322 | 12/1985 | Wickman et al. . |
| 4,576,480 | 3/1986 | Travis . |
| 4,578,870 | 4/1986 | Cooke . |
| 4,598,481 | 7/1986 | Donahue . |
| 4,615,618 | 10/1986 | Bailey et al. . |
| 4,630,379 | 12/1986 | Wickmann et al. . |
| 4,630,380 | 12/1986 | Donahue . |
| 4,663,855 | 5/1987 | Hamilton et al. . |
| 4,691,443 | 9/1987 | Hamilton et al. . |
| 4,775,235 | 10/1988 | Hecker et al. . |
| 4,788,441 | 11/1988 | Laskowski . |

FOREIGN PATENT DOCUMENTS

| | | |
|---|---|---|
| 240893 | 10/1987 | European Pat. Off. . |
| 2042178 | 9/1980 | United Kingdom . |

OTHER PUBLICATIONS

Nike Hydrolic brochure, "Dataliner" Catalogue No. 164E, prior to 9-1980.
Chart Catalogue No. 750015, "Collision Repair Equipment", Effective Sep. 1, 1986, at pp. 16-17.
Garda Impianti Pamphlet, dated Jul. 1987 or Earlier.
Kansas Jack Brochure, "Quik-Chek", dated about 1987.
NAMCO Brochure, "Lasernet TM, The Smart Sensor", Copyright 1986.
"Nonwire AGV Uses 3D Sensing" Publication, Copyright 1986.

Primary Examiner—Richard A. Rosenberger
Attorney, Agent, or Firm—Allegretti & Witcoff, Ltd.

[57] ABSTRACT

Apparatus and methods for determining the deformation of a vehicle body comprising coded target including coded reflective surfaces positioned in predetermined locations relative to the vehicle body for indicating deformation of the body by determining the spatial position of the targets, a laser generating unit positioned for sweeping a laser beam across the reflective surfaces of the targets, a receiver for receiving the reflected beam, and computer-based, electronic equipment and logic responsive to the receiver for indicating the spatial position of the target means relative to a predetermined normal position with respect to the vehicle body. Apparatus also for determining two and three dimensional spatial coordinates of objects from each other and from a base, utilizing the foregoing components. Additional apparatus comprising portions of the foregoing.

10 Claims, 33 Drawing Sheets

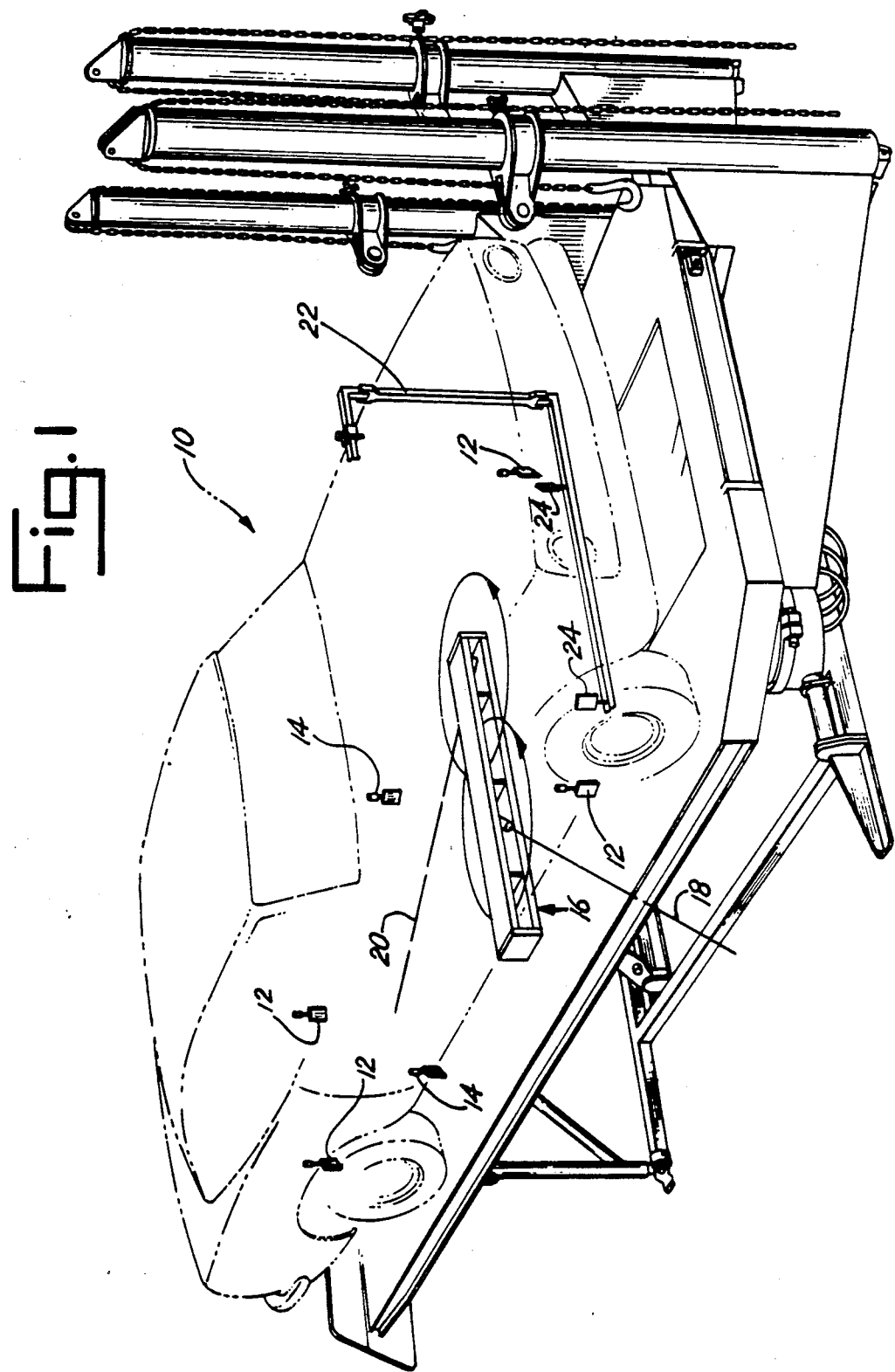

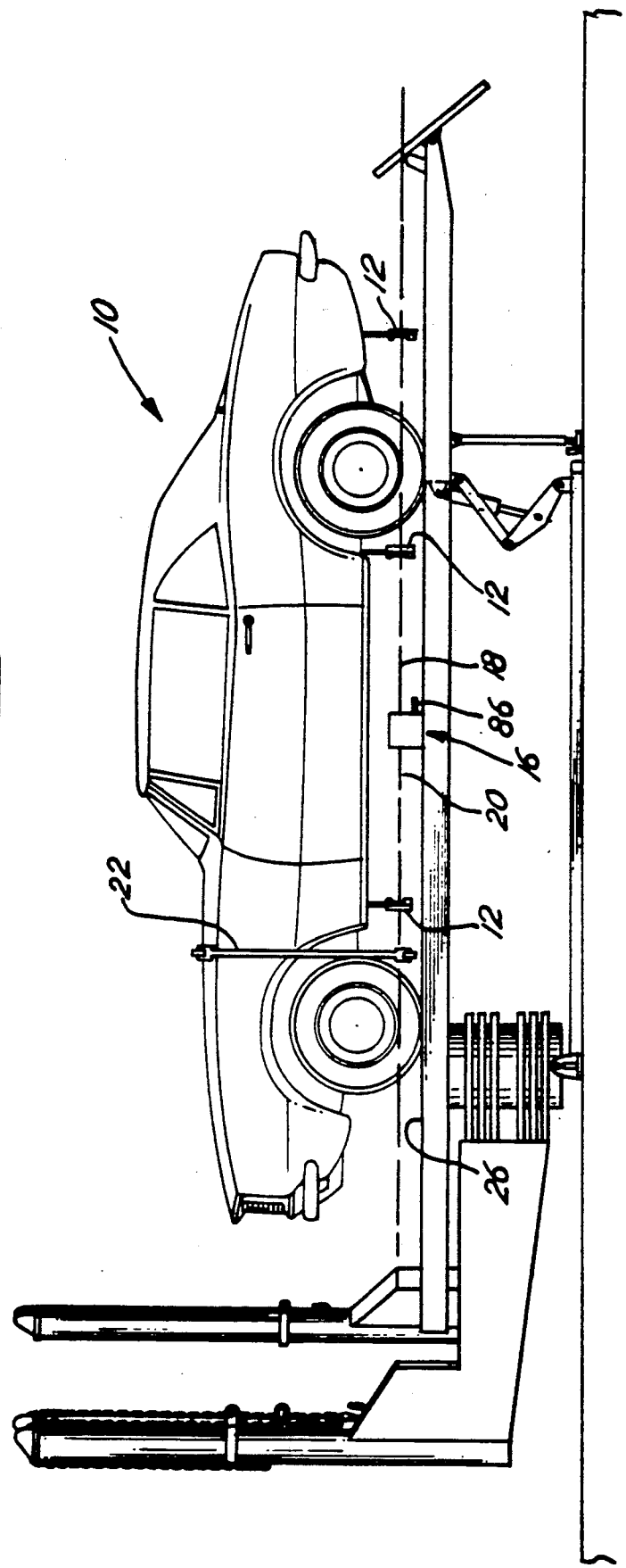

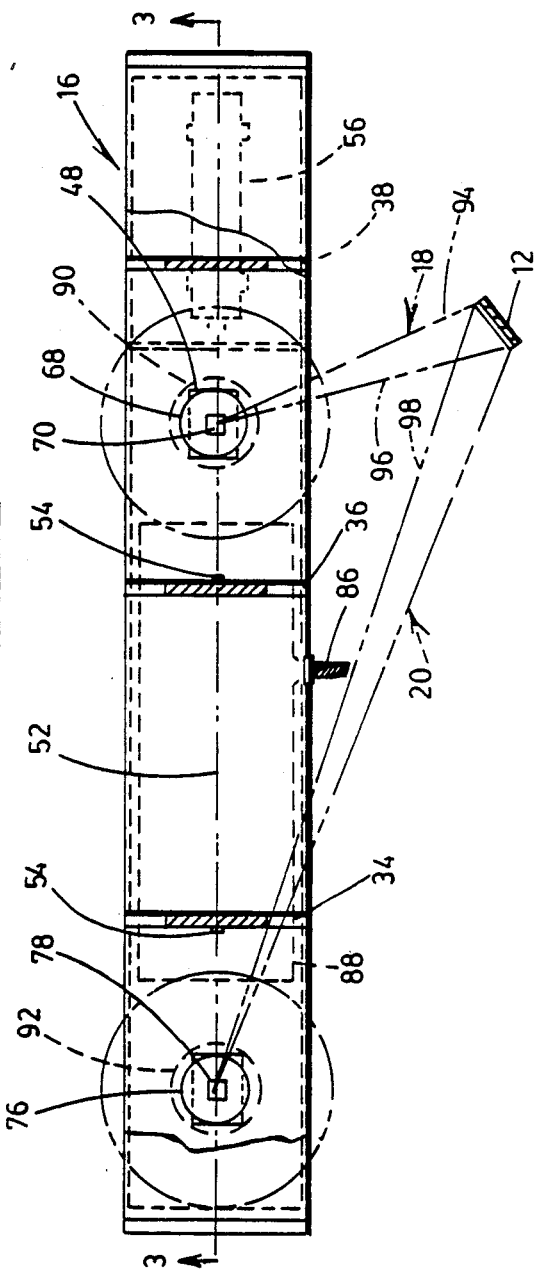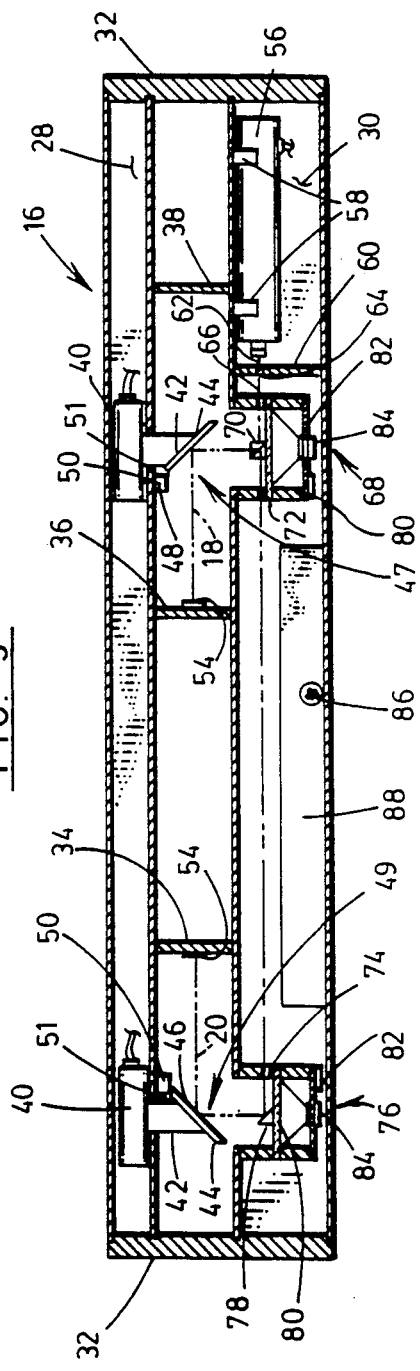

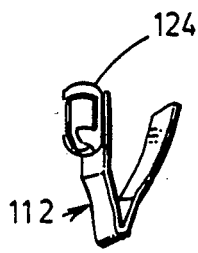
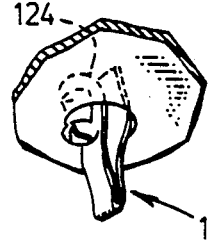
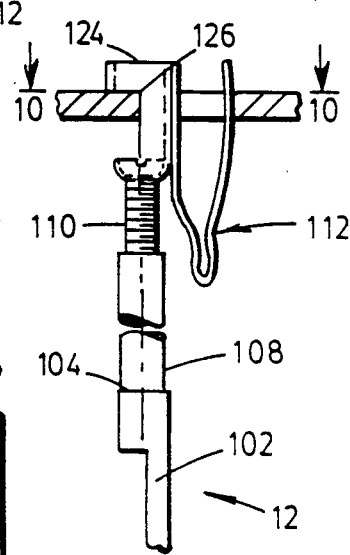
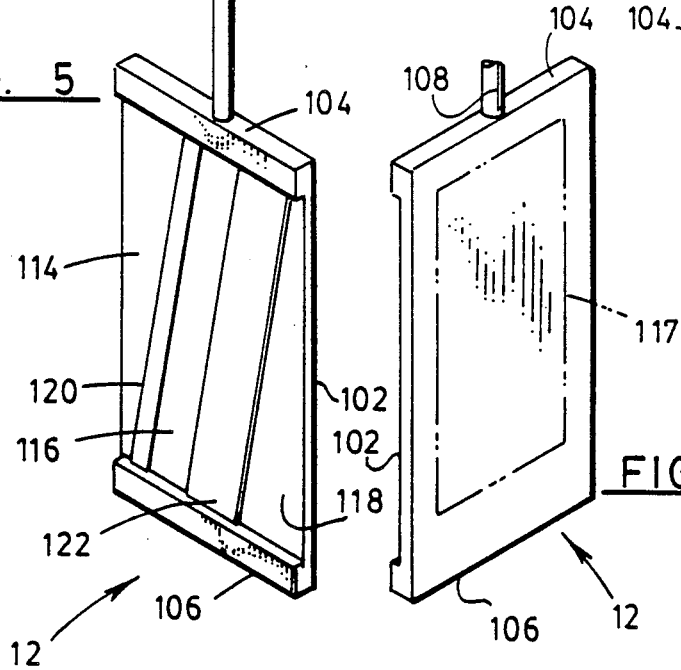

| FIG.14a | FIG.14b | FIG.14c | FIG.14d | FIG.14e | FIG.14f | FIG.14g |
|---|---|---|---|---|---|---|
| FIG.14h | FIG.14i | FIG.14j | FIG.14k | FIG.14l | FIG.14m | FIG.14n |

FIG. 16

| FIG.16a |
|---|
| FIG.16b |
| FIG.16c |
| FIG.16d |
| FIG.16e |
| FIG.16f |
| FIG.16g |

FIG. 13

| FIG.13a | FIG.13b |
|---|---|

FIG. 15

| FIG.15a | FIG.15b |
|---|---|

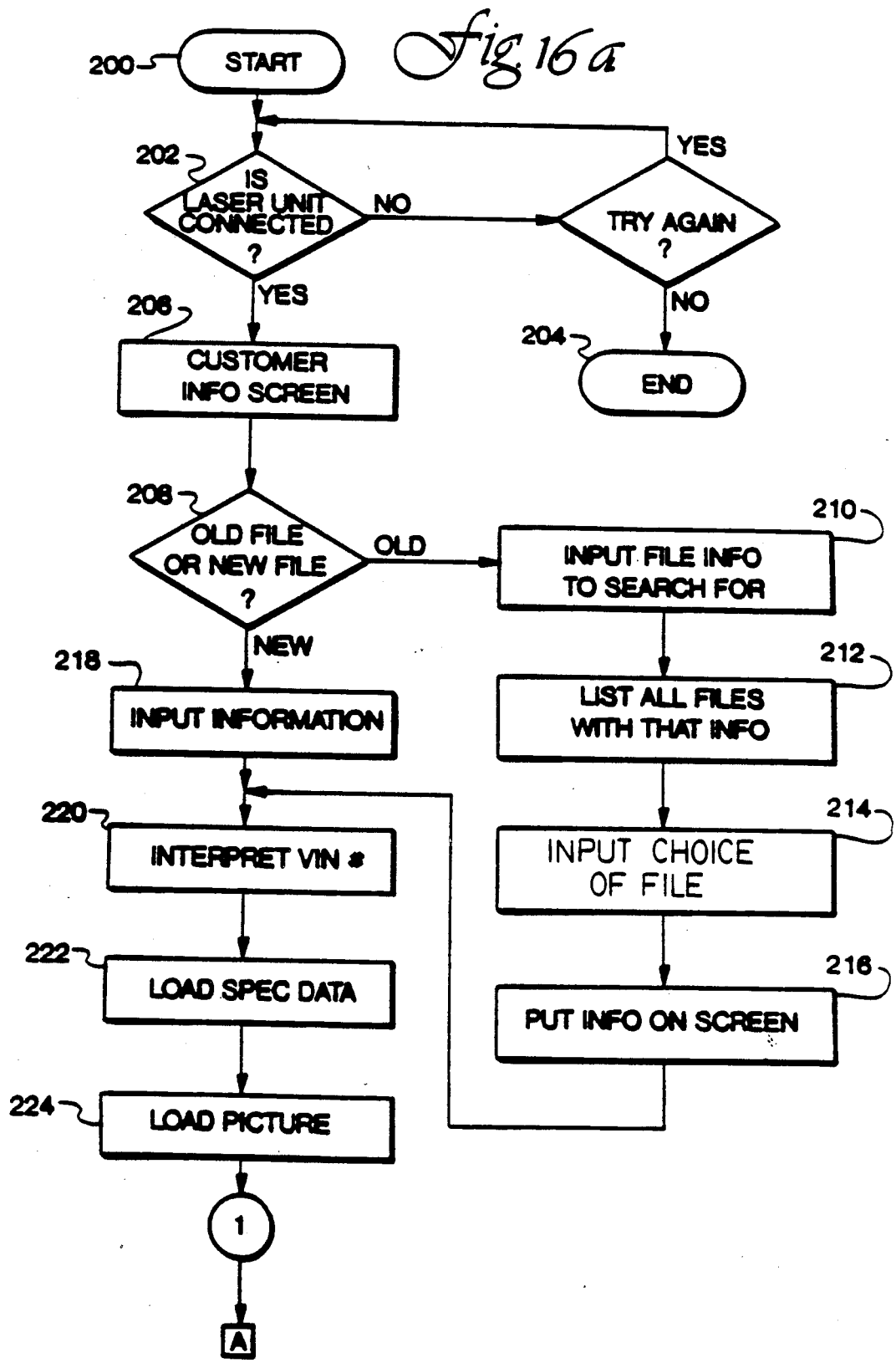

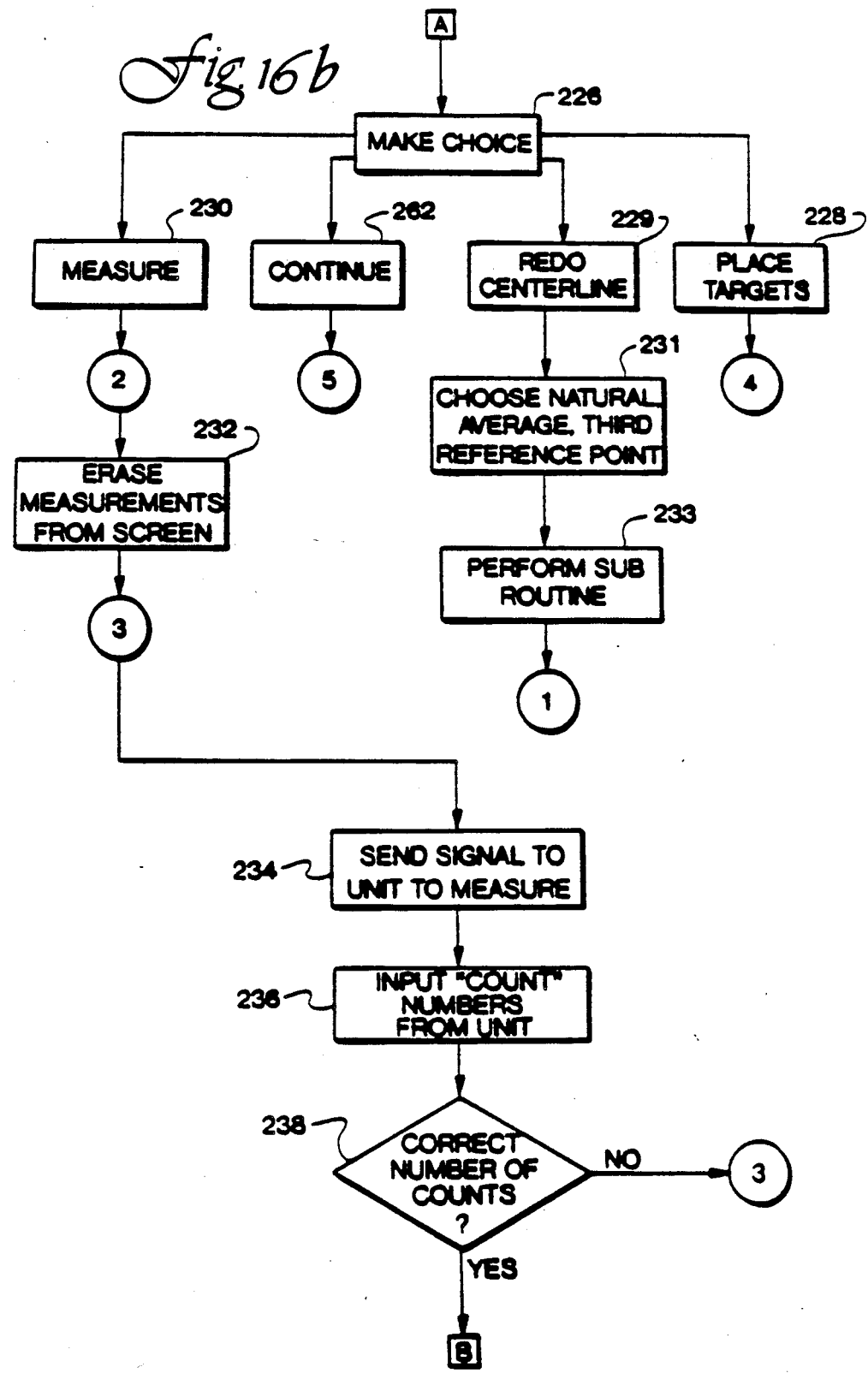

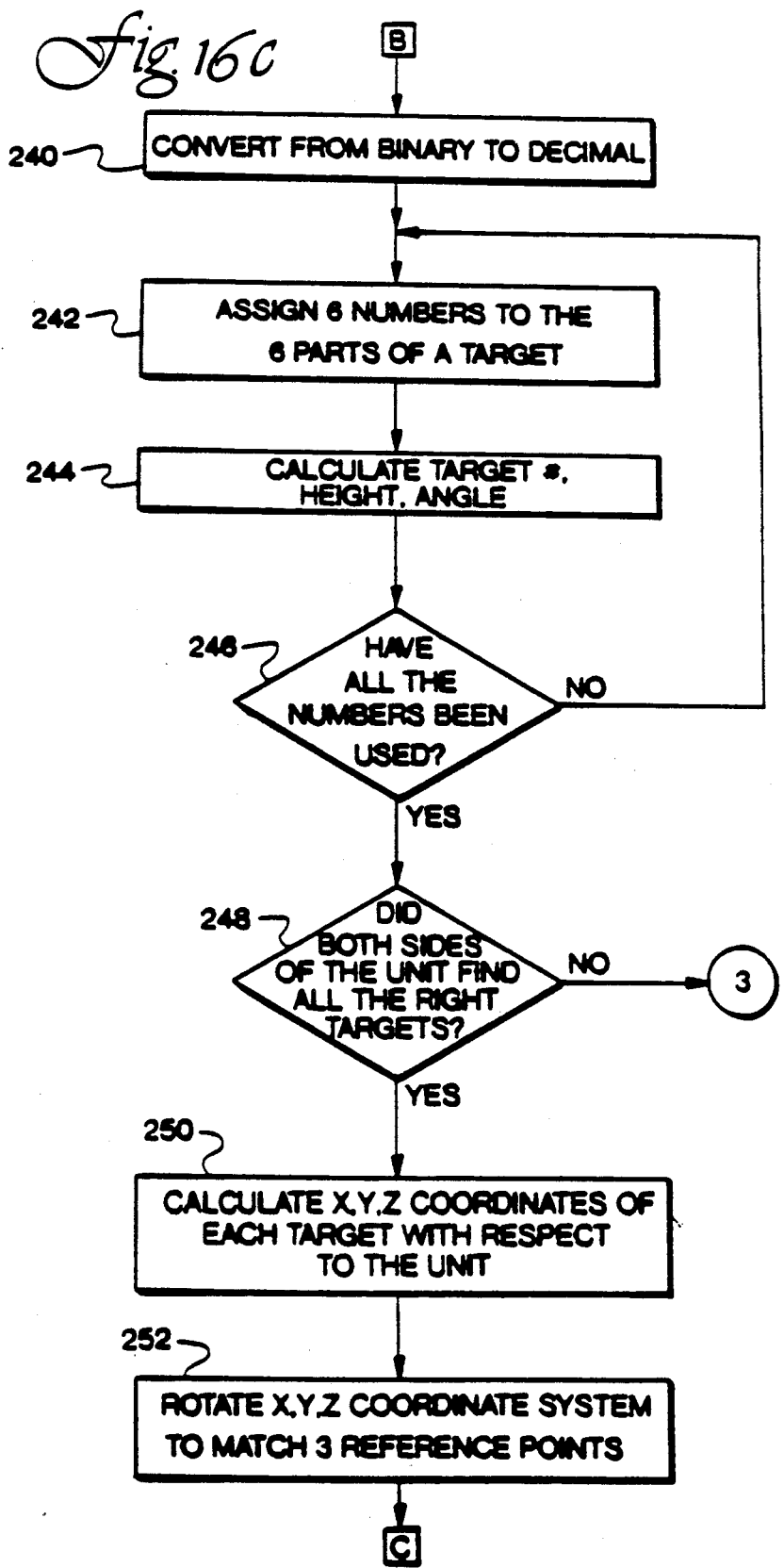

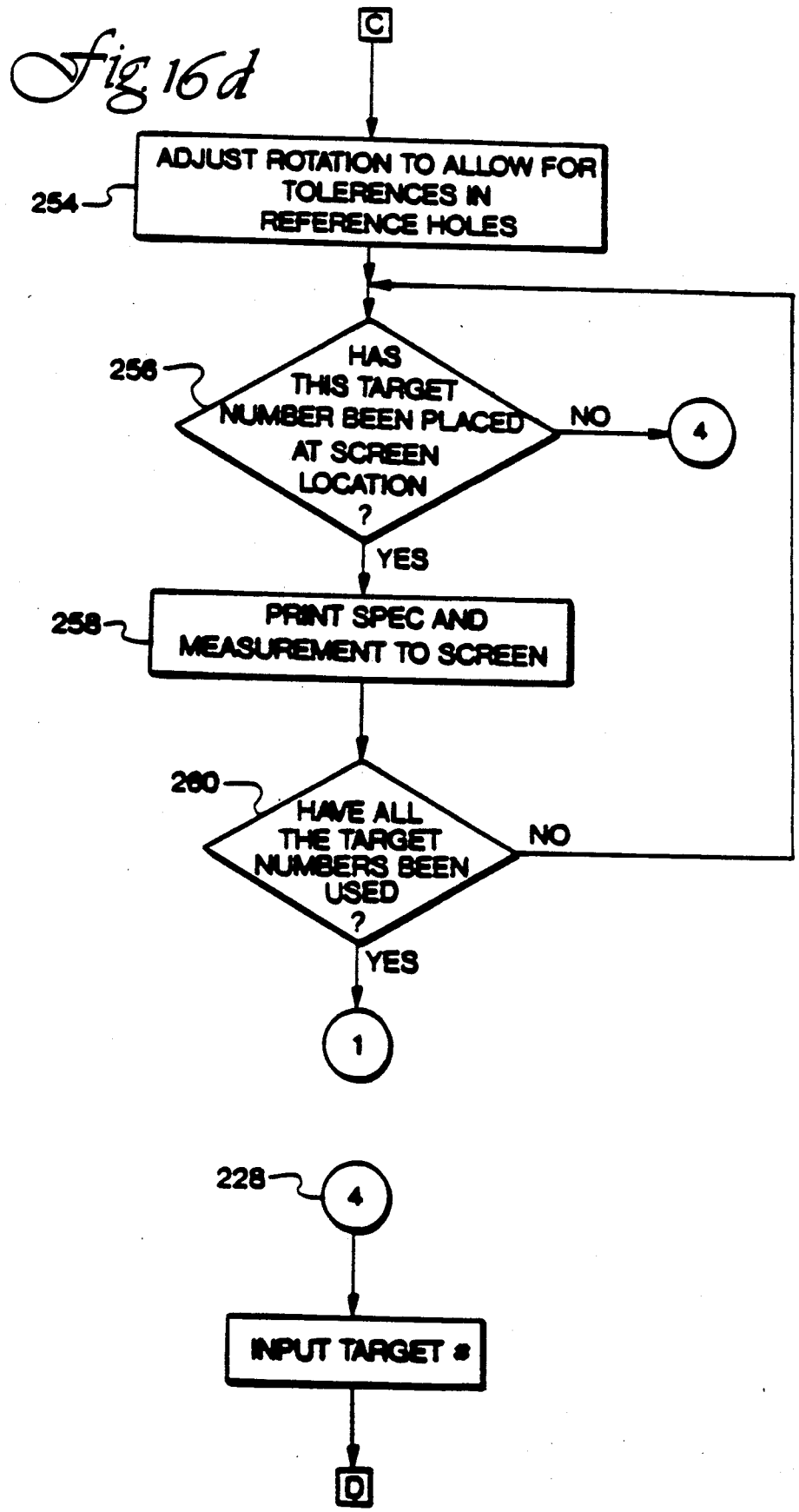

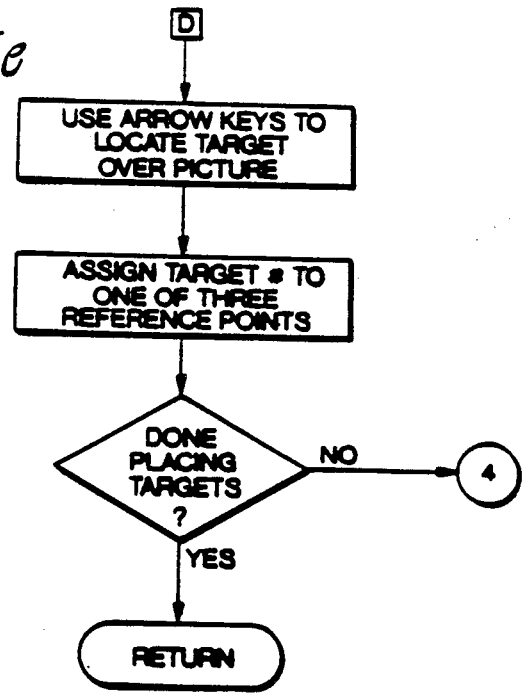
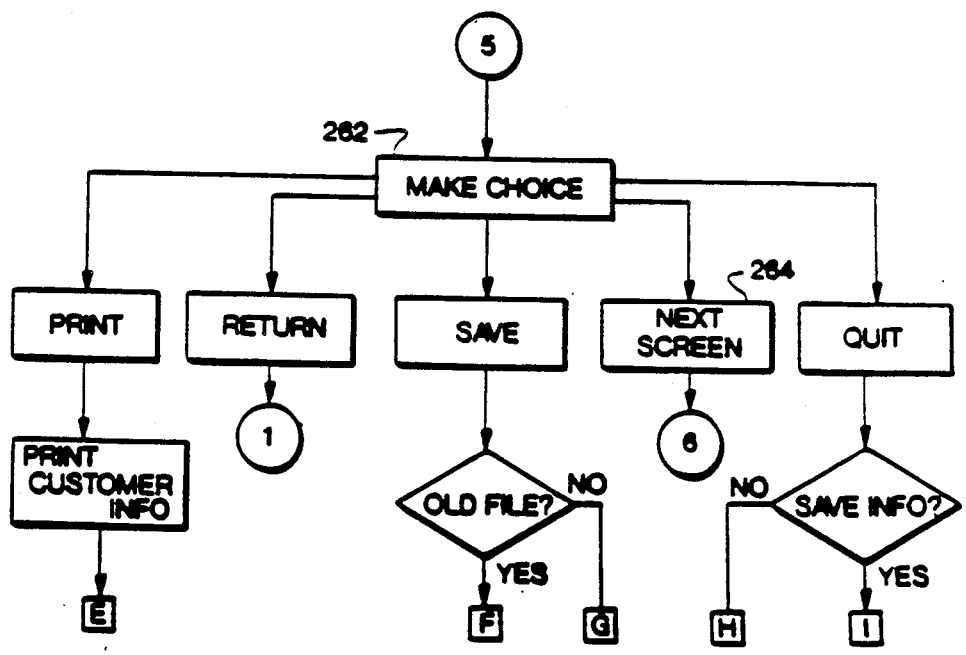
Fig. 16e

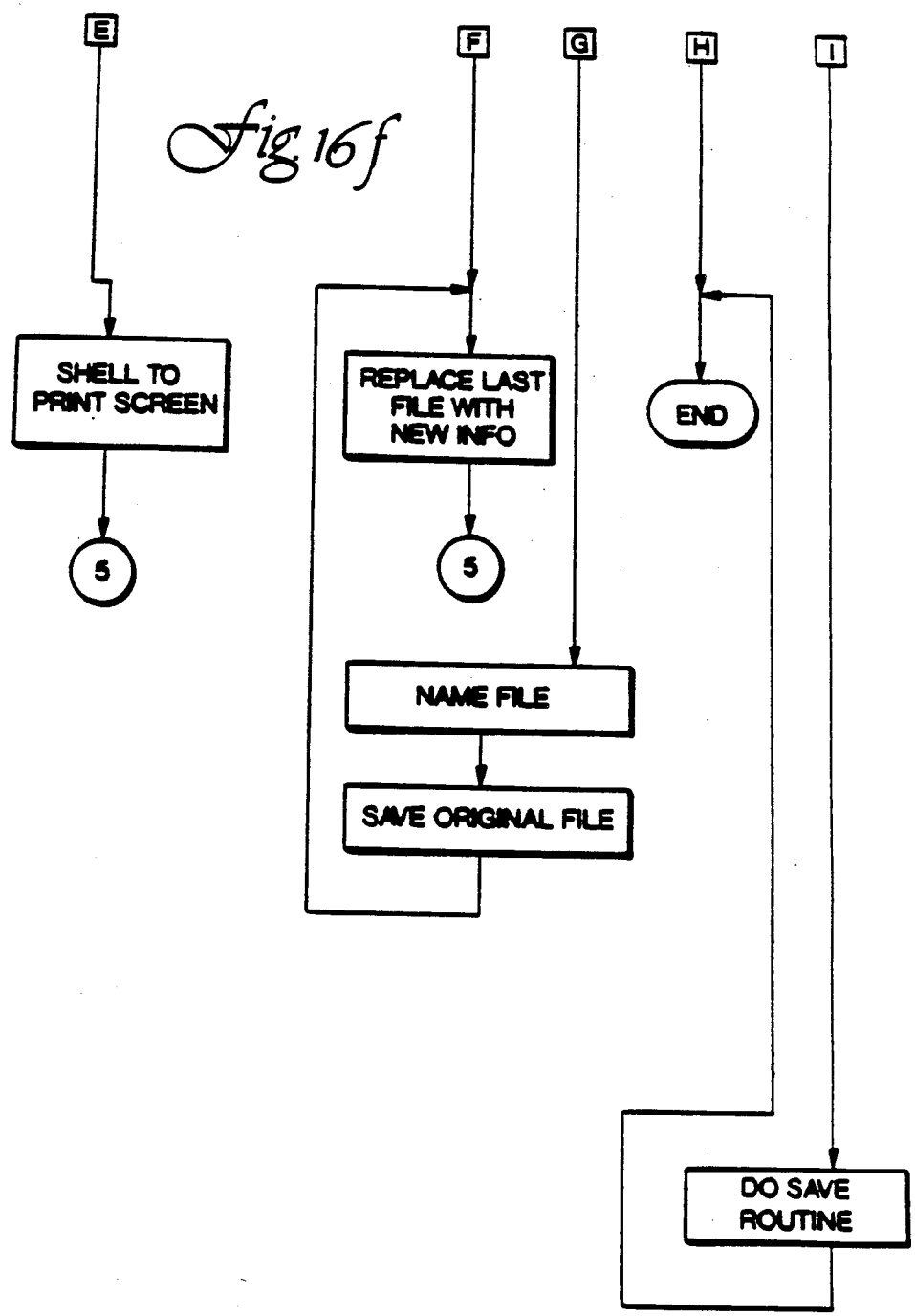

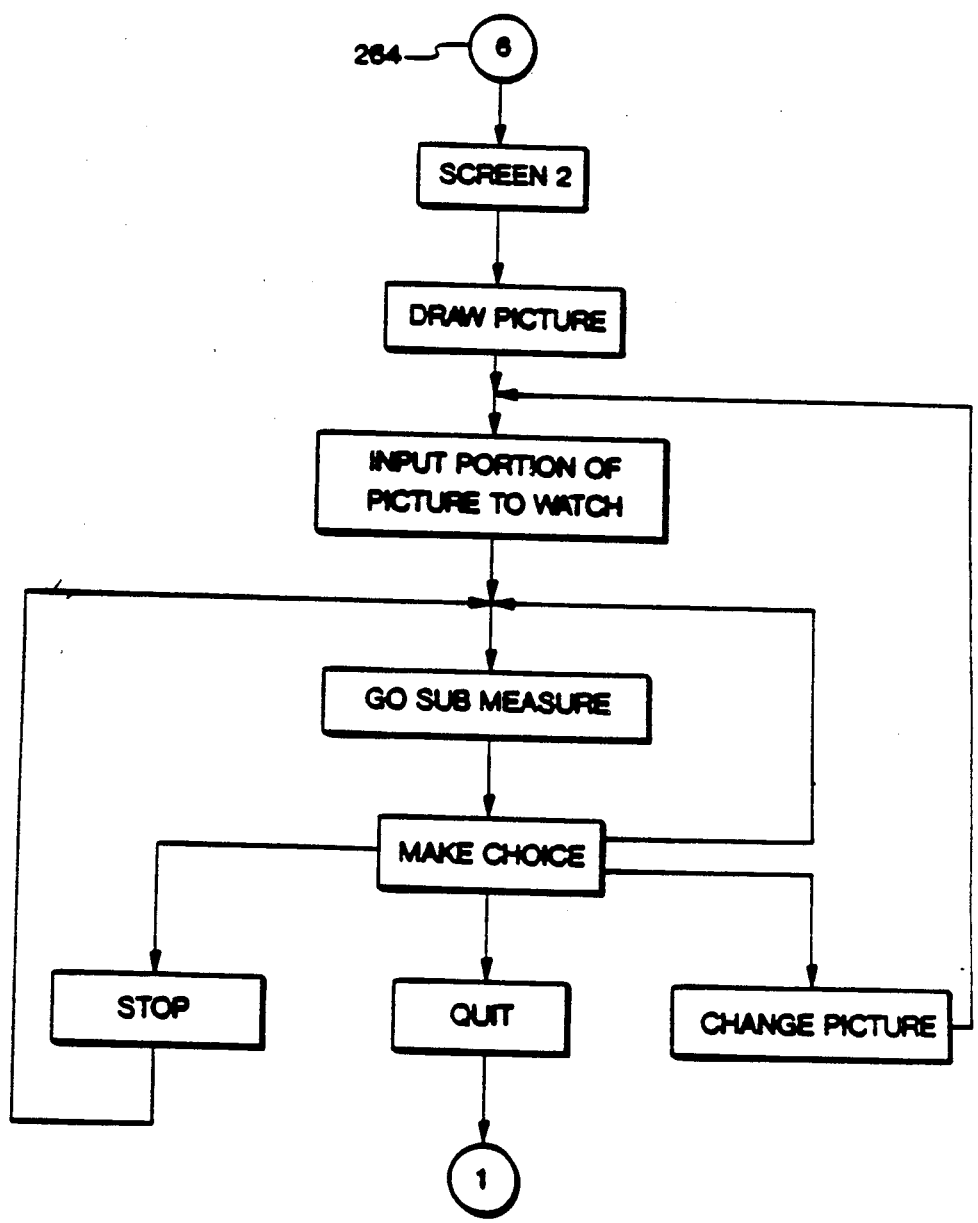

FIG. 17

```
╔══════════╡ GLEN'S AUTO BODY ╞══════════╗
║              CUSTOMER INFORMATION       ║
║         Last              First         ║
║ Name: LEWIS,              C             ║
║ Address: 505 HUDSON CIRCLE              ║
║ City: RAMSTEAD                          ║
║ State: PA.   Zip: 70776                 ║
║ Phone: 103 293 3223                     ║
║ Insurance Co.: MARS INS. CO.            ║
║                                         ║
║              VEHICLE INFORMATION        ║
║ VIN #: 1C31C41YYJY                      ║
║ Year: 88         Make: CHRYSLER         ║
║ Model: LEBARON        Type: 2 DOOR      ║
║ Odometer: 35,332                        ║
║ Color: BROWN                            ║
║ License #: YAK 319                      ║
║                                         ║
║ Repair Technician: G. DANIELSON         ║
║ Repair Order # 09376                    ║
║                                         ║
╚═══════════════< CONTINUE >══════════════╝
```

VEHICLE STRAIGHTENER MEASURING UNIT, MEASURING APPARATUS RELIANT ON REFLECTED BEAMS, AND SOURCE, TARGETS AND METHOD

This application is a continuation-in-part, of application Ser. No. 329,010, filed Mar. 27, 1989, now abandoned.

BACKGROUND OF THE INVENTION

Field of the Invention

This invention relates generally to apparatus for determining deformation in vehicle bodies and the like. More specifically, in its most preferred embodiment, this invention relates to apparatus for comparing the actual three dimensional spatial coordinates of manufacturer-provided reference points in a vehicle with their normal or specification values to thereby determine if the vehicle is deformed. In a general sense, this invention also concerns apparatus for determining two and three dimensional spatial coordinates of objects from each other and from a base which is physically distant from and unconnected with the objects, through the use of beams such as laser light beams.

In the past, vehicles such as automobiles had structural frames on which vehicles including body panels were built. Repair of accidental vehicle damage involved straightening the frame, and re-shaping or replacing body panels. Vehicle technology then accelerated to meet needs such as low fuel consumption, and most passenger vehicles came to have unibody construction. In a unibody vehicle, no distinct frame exists apart from the body panels; instead, like an egg carton, the panels together form a "unibody". Substantial weight is saved.

With either form of vehicle, frame or unibody, repair is greatly speeded, and repair quality greatly improved, with a frame (and unibody) straightening machine such as described in U.S. Pat. No. Re. 31,636 issued to F. Lavell Chisum (incorporated by reference). The Chisum machine has attributes which have withstood the test of time, and the machine has been continuously manufactured and sold since its invention by Chief Automotive Systems, Inc. (or its predecessors) of Grand Island, Nebr. as the Chief EZ Liner ™.

The Chief EZ Liner ™ machine speeds frame and unibody straightening, but was not intended to, and does not by itself, provide information as to the extent of straightening to be accomplished. Vehicles currently have manufacturer-provided unibody reference points, such as reference openings or holes, and specifications are published for the correct three-dimensional locations of the reference points relative to each other. If a vehicle is involved in an accident, these reference points will be moved from their "normal", "specification", or pre-accident positions with respect to each other. Most, if not all, vehicle frame and unibody straightening jobs require of the vehicle reference points to within specification.

In association with the Chief EZ Liner ™ machine, operators may use only their training and experience to measure the extent of straighting to be accomplished, but most often employ gauges such as the advanced gauges described in U.S. Pat. Nos. 4,689,888 and 4,731,936, issued Sept. 1, 1987 and Mar. 22, 1988, respectively (incorporated by reference). By referring to the data provided by manufacturers in KLM Body and Chassis Dimension and Specification Charts (Specification Manuals), and by employing gauges operators can determine which portions of vehicles to straighten, and how deformed the vehicles are.

SUMMARY OF THE INVENTION

In a principal aspect, the invention of this patent specification constitutes a vehicle straightener measuring apparatus which, in its preferred embodiment, compares the actual three dimensional spatial coordinates of manufacturer-provided reference points or holes with their specification or normal value, using data provided by the manufacturer.

Main components of this principal aspect of the invention include a laser measuring unit, coded targets to be attached to reference holes and computer-based electronic equipment and logic which controls the laser measuring unit, performs calculations and displays the results.

In the most preferred form of this aspect, the laser measuring unit is preferably comprised of a helium-neon laser firing a 1 milliwatt 632.8 nanometers wavelength (red) laser beam. The laser beam is split into two laser beams by a 50/50 beam splitter, each beam then being directed to a rotating mirror. The rotating mirrors direct the laser beams in a 360° arc or circle, with both beams being directed in a single plane.

The beams sweep across the surfaces of coded targets attached to the reference holes on the vehicle. Each coded target contain stripes of reflective and non-reflective material. Each laser beam is reflected back to its source when it strikes the reflective stripes of the coded targets. These reflected beams are registered as "on" events (or counts) by the electronics on board the laser measuring unit. A counter counts the number of counts (as measured by an oscillator) from zero to the edge of each reflective, non-reflective border.

The computer-based, electronic equipment and logic (hereafter "the computer") receives the count information for each target and computes the angle from the center of each mirror to the center of each target. With the two angle measurements (one for each mirror and target), and the known baseline between the two mirrors, the planar (X,Y) coordinates of each reference hole are computed using trigonometry. The third coordinate (Z coordinate) is calculated using Z coordinate-representative sizing of the reflective and non-reflective stripes on the coded targets. The actual three dimensional spatial coordinates of each reference hole relative to a calculated point and plane are calculated and displayed by the computer, along with the deviation from the normal or specification value provided by the manufacturer's data. Armed with this information the operator may then begin to straighten the frame or unibody. The operator may swiftly re-measure and continue straightening in desirable, small increments increments until the actual and specification values are substantially the same, whereby deformation is eliminated.

In additional and important principal aspects, the invention also constitutes a laser measuring unit as described, alternative laser measuring or "base" units within the scope of the claims, the targets as described, alternative targets within the scope of the claims, methods associated with the apparatus, such as methods of use, and apparatus of more generalized application employing the same principles and equipment as the described apparatus.

BRIEF DESCRIPTION OF THE DRAWING

A description of the preferred embodiments of the invention is hereafter provided. The description is detailed, with specific reference being made to the drawings in which:

FIG. 1 is a perspective view of two embodiments of the invention, as seen beneath a typical vehicle as the two embodiments would be positioned in association with a Chief EZ Liner TM frame straightening machine, or with a laser measuring unit resting on the floor of a body shop, with neither the EZ Liner TM machine nor the floor shown fully, for clarity;

FIG. 2 is a left side elevation view of FIG. 1, with the two embodiments of the invention shown positioned in association with a Chief EZ Liner TM frame straightening machine;

FIG. 3 is a sectional elevation taken along line 3—3 in FIG. 4;

FIG. 4 is a top plan view of the laser measuring unit assembly;

FIG. 5 is a perspective view of a coded target assembly;

FIG. 6 is a fragmentary perspective view of the reverse side of FIG. 5;

FIG. 7 is a perspective view of a coded target positioning clip;

FIG. 8 is a fragmentary perspective detail of a coded target positioning clip inserted in a manufacturer-provided reference hole;

FIG. 9 is a fragmentary diagram showing the dimensional alignment of the coded target and the reference hole;

FIGS. 13 and 13a–13b are a system block diagram;

FIGS. 15 and 15a–15b are an electronic circuit diagram;

FIGS. 16 and 16a–16g are a computer program flow chart;

FIG. 17 is a diagram of a computer display; and

DETAILED DESCRIPTION OF THE PREFERRED EMBODIMENTS

Figure 10:
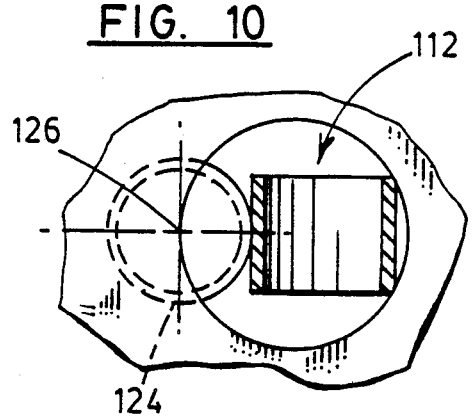
FIG. 10 is an enlarged sectional taken along line 10—10 of FIG. 9.

This invention may be embodied in many different forms for a variety of different uses. For clarity, there are shown in the drawings and described in detail herein specific preferred embodiments of the invention. The present disclosure is an exemplification of the principles of the invention and is intended to limit the invention to the particular embodiments illustrated only as appropriate based on the claims.

Referring now to FIG. 1, a vehicle shown generally at 10 has coded targets 12 attached to or hanging from manufacturer-provided reference holes 14. The manufacturer of the vehicle provides data relating to the spatial positioning of reference holes 14 relative to some arbitrary reference plane (not shown). The number and location of these reference holes vary from vehicle to vehicle. Their existence as well as the data relating to the three dimensional position of any reference hole with respect to the arbitrary reference plane, is well known in the art. The vehicle laser measuring unit or straightener measuring unit, or base unit, is shown generally at 16. The unit is placed under the vehicle 10 on the floor, or on the platform of a Chief EZ Liner TM machine, as better shown in FIG. 2. Laser beams 18 and 20 emanate from the unit 16 and sweep around in clockwise or counterclockwise circles, striking the coded targets 12. Beams 18 and 20 are laser beams of wavelength 632.8 nanometers produced by a helium-neon laser in the preferred embodiment, although it is possible that imitators and followers of the invention may determine that the wavelength or type of beam is not significant to the operation of the invention. It is possible that such persons may determine that other types of waves can be used in the present invention: radar; sound; coherent light; incoherent light, or any other wave. It is contemplated that whatever the beam type or strength, the beam be reflected by the reflective portions of the coded targets and the reflected beam be registered as described below.

Coded targets 12 are used to determine if any deformations exist in the bottom or side portions of the vehicle unibody or frame. FIG. 1 is a composite of two separate embodiments. Mechanical transfer means 22 and coded targets 24 are used in a second embodiment for determining if any deformations exist in the top portion of the unibody or frame, as will be described more with respect to FIG. 11. The invention described herein can be used to measure the deviation of any point on a damaged unibody or frame from the normal position of such point using coded targets which are attached (hanging or using a mechanical transfer mechanism) to the manufacturer's reference holes.

Referring now to FIG. 2, the vehicle straightener measuring unit 16 is shown resting on the floor 26, under vehicle 10. Laser beams 18 and 20 are arranged so that they lie in the same plane as they scan a 360° circle. All the coded targets are arranged such that the reflective surfaces of the targets are struck by the scanning laser beams, as will be described in more detail with reference to FIG. 5.

Referring now to FIGS. 3 and 4, the vehicle straightener measuring unit 16 is shown in detail (FIG. 3 in section, FIG. 4 in top plan view) divided into two sections, an upper section 28 and a lower section 30, connected with end plates 32. Supports 34, 36, and 38 provide additional support for upper section 28. In its preferred embodiment, unit 16 measures 46 inches long, 5 inches wide and 7 inches high, although these measurements are not critical. The upper section 28 contains motors 40 which rotate the cylindrical mirror mounts 42. In the preferred embodiment, motors 40 are commercially available floppy disk drive motors, used for their precise and consistent revolutions per minute (RPM). The motors used in the current embodiment spin at 300 RPM, although it is contemplated that much faster motors may be used for more accurate readings. The speed of the motor is less critical than that the motor have a very constant and known number of revolutions per minute.

The mirror mounts 42 in the preferred embodiment are made from 1⅜ inch round aluminum rod which is cut to a length of 1 5/16 inches. The exact length and diameter of the rod is not critical to the invention. 3/16 inches of the motor end of mount 42 is machined to 1⅛ inch round and center tapped for a number 6-32 bolt. End 44 of the mount is machined to a peak (as shown in FIG. 3) with each side of the peak being at a 45° angle with respect to the motor end. A 2¼ 1½ inch mirror (46 and 48 respectively as shown in FIG. 3) is glued to the mirror mount 42 with its short centerline lined-up with the peak of the mount. A silicon adhesive glues the mirror to the mount. The 45° angle was chosen so that beams 18 and 20 are preferably coplanar (seen in FIG. 2). The actual dimensions of the various parts are not important, as long as the two mirrors are positioned such that they will reflect any beams in a parallel fashion. The first mirror mount assembly is shown generally at 47, with the second assembly shown generally at 49. In the preferred embodiment, mirror mount assemblies 47 and 49 are arranged such that the centers of mirrors 46 and 48 are 750 millimeters apart. This distance may be varied but must be known since it establishes a baseline used for angle measurements (described more fully below).

A 1/16 by ⅜ inch vertical non-reflective black stripe 51 is attached to each mirror mount 42 just below the upper section 28. Stripe 51 is centered on mount 42 with respect to mirror 46. A light (opto-reflective) sensor 50 is mounted on centerline 52 (shown in FIG. 4). The sensor 50 directs a beam directly at mirror mount 42 and at a height such that the beam will strike the stripe 51. The beam is reflected back and received by sensor 50 until the beam strikes the stripe 51 which absorbs the light. Thus the sensor 50 can be used to indicate the beginning and end of one complete revolution of the mount 42.

A ⅛ by ½ inch vertical stripe of reflective material 54 is fastened to the center of supports 34 and 36, respectively, on the side closest to each mirror assembly 47 and 49. The stripe is arranged such that the beam will strike the stripe when the mount rotates. The function of stripes 54 will be more fully explained below.

The lower section 30 of the vehicle straightener measuring unit holds beam generator 56. In the preferred embodiment the beam generator generates a 0.5–1 milliwatt laser beam of wavelength 632.8 nanometers produced by a helium-neon laser. As mentioned above, coherent light of the wavelength specified above has produced the best results to date. The particular wavelength of light used in the preferred embodiment was selected to minimize the effect of random reflections of the laser beam from walls and other objects as well as to allow ambient lighting in the area in which the device is in use.

When unit 16 if first built care must be taken to accurately set up the light path of the laser. Once this has been accomplished the laser is fastened securely in place to laser mounts 58 by welding, adhesive or other means. The laser beam generator 56 is walled off from the rest of the unit by wall 60. Laser beam 62 exits the walled off area through hole 64 in wall 60. Laser beam 62 proceeds through hole 66 in the side of a first cylindrical well shown generally at 68. Laser beam 62 then strikes a 50/50 beam splitter 70. Well 68 is arranged such that beam splitter 70 is directly below the center of mirror 48 of mirror assembly 47. Beam splitter 70 is mounted directly in the path of laser beam 62 and directs half of the beam straight up to strike the rotating mirror 48 (this half becomes beam 18, also shown in FIG. 1). The other half of the laser beam (which becomes beam 20, also shown in FIG. 1) continues through hole 72 in the first well 68 and continues on through hole 74 in the wall of the second cylindrical well shown generally as 76. The laser beam strikes a mirror 78 which is angled at 45° to direct the laser beam directly up at mirror 46 of the second mirror assembly 49. Well 76 and mirror 78 are positioned such that mirror 78 is directly below the center of mirror 46.

Thus, it can be seen that one laser beam will produce two beams 18 and 20 which will strike their respective rotating mirrors 46 and 48 and produce two coplanar beams which scan a 360° circle upon rotation of the mirrors. These beams will strike coded targets 12 or 24 (as described more fully below) and as each beam encounters the reflective portions of the coded targets the light will be almost instantly reflected directly back to strike the mirror. Reflected light is directed down at a 90° angle by the mirrors 46 or 48. A fresnel lens 80 is used to focus the reflected light due to the beam spread. The type of lens may be varied, as long as it can be used to focus light. This focused light is then passed through an optical bandpass filter 82 which will keep out stray reflections and background light. The light is then focused on a light detector 84 which is "ON" when light strikes it and "OFF" during the absence of light.

Figure 15A:
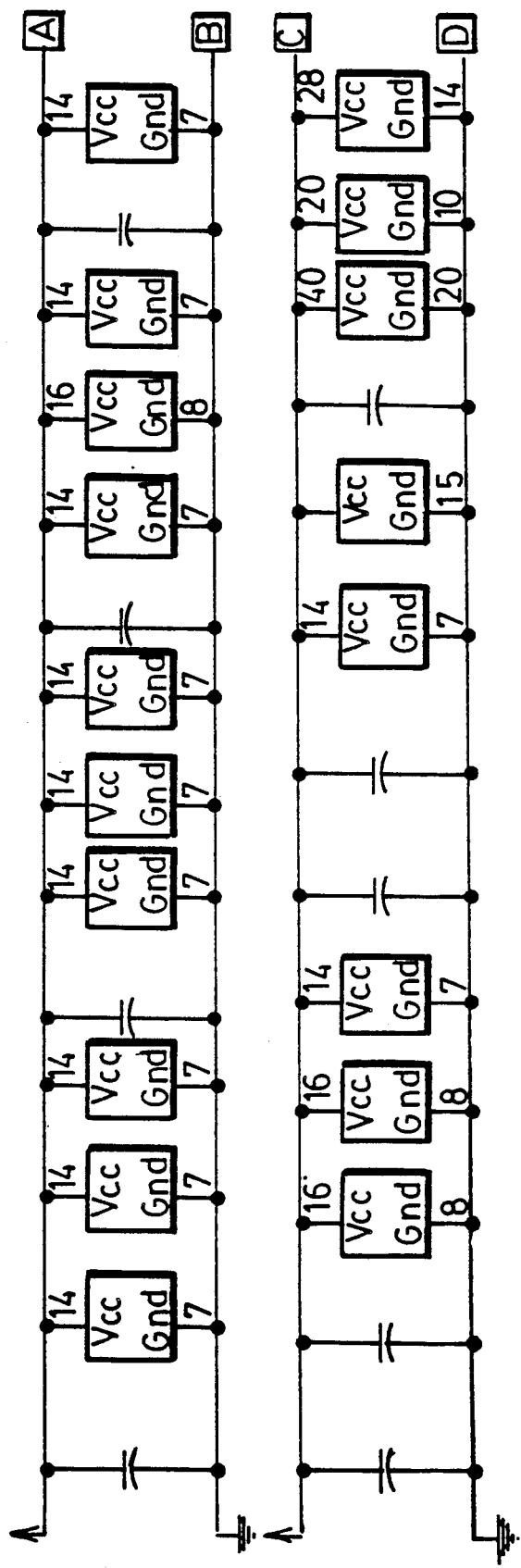
Figure 15B:
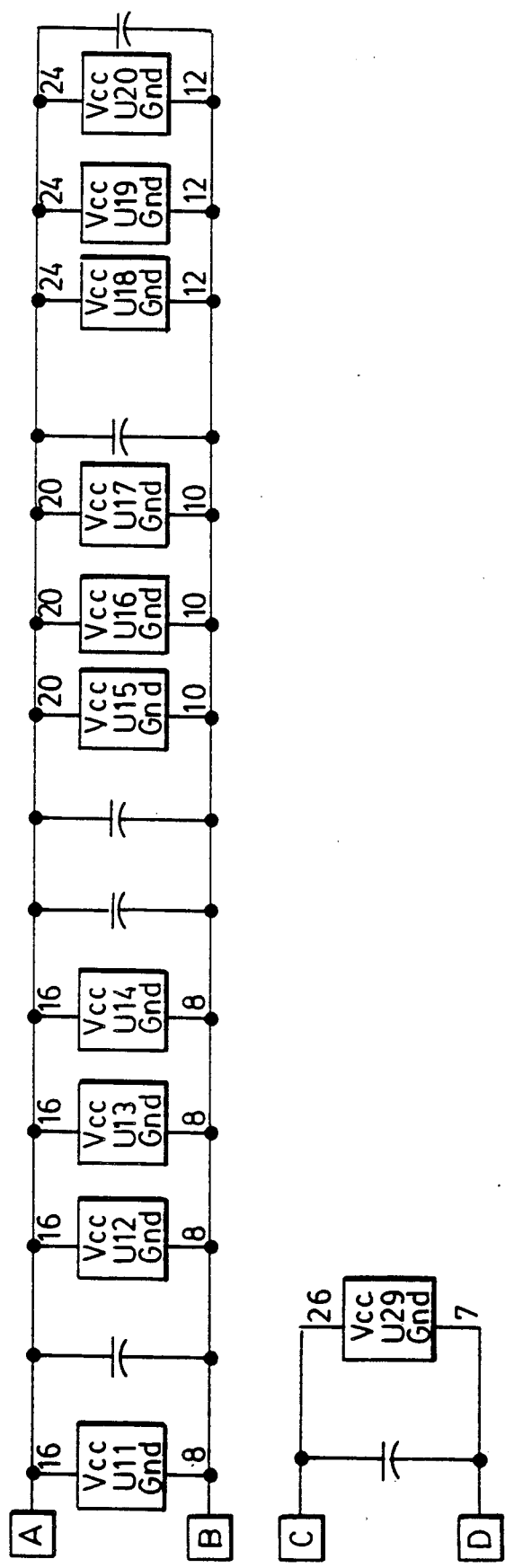

Power and signal bundle 86 provides power, control signals, and data transfer to and from the electronics 88 (described with reference to FIGS. 13–15).

Referring now more specifically to FIG. 4, the top plan view of FIG. 3 is shown with some parts shown in phantom. The rotation of rectangular mirror 48 of the first mirror assembly 46 is shown by dashed circle 90. Similarly, dashed circle 92 shows the rotation of rectangular mirror 46 of the second mirror assembly 49. Beam 18 is shown striking one edge of coded target 12 at 94. As the beam scans across the surface of target 12 it strikes various reflective areas. The light is reflected back toward mirror 48 where it causes the light detector to turn "ON". Beam 18 is shown at 96 at the opposite edge of target 12. Similarly, reference numerals 98 and 100 show beam 20 of the second mirror assembly hitting the same target 12.

Referring now to FIG. 5, a coded target (numerals 12 or 24 in FIG. 1) is comprised of a rectangular metal face area 102 measuring 75 mm wide and 125 mm high and 3/16 inch thick. The dimensions or material of the target are thought to be not critical as long as they are known values for use with the computer program. The top 104 of the target and the bottom 106 are slightly thicker, measuring 10 mm high and ⅜ inch thick. Top portion 104 is used for mounting hanging rod 108. The bottom portion 106 is used for balancing the target so that it hangs on true vertical. Hanging rod 108 is threaded at its top portion and screw 110 is used in combination with the clip (shown generally at 112 in FIGS. 7–9) to attach the target to the manufacturer-provided reference holes or other identified spots. An alternate top portion of hanging rod 108 eliminates screw 110 in favor of a spherical ball formed integrally with the hanging rod 108.

Face area 102 on the target has three reflective areas 114, 116, and 118 separated by non-reflective areas 120 and 122. The reflective areas are made of Reflexite prismatic reflex retro-reflector material obtained from Reflexite Co. Other reflective materials may be used but this is preferred. This material contains microscopic corner cube reflectors that will reflect light back towards its source. As long as the angle of incidence is less than 30° the light will be reflected back to its source. This allows some leeway in positioning the targets such that the laser beams can strike the target from a variety of angles and still be reflected back toward their respective sources. This also prevents the two laser beams from interfering with each other. The non-reflective areas 120 and 122 may be made of any material which does not reflect light, and may be tape strips, painted stripes, printed ink stripes, the absence of reflective material, or other materials which do not reflect light back toward its source. Reflective areas 114 and 118 vary in width over their length between the top and bottom of 102. Non-reflective areas 120 and 122 take the form of stripes of uniform width which are slanted with respect to face 102, at a slant of 26 mm per 125 mm of height in the preferred embodiment.

Referring now to FIG. 5, the back of a target is provided with an area 117 which can be labeled with a number or reference for ease of use.

Referring now to FIGS. 7–10 a clip shown generally at 112 attaches the coded target by inserting screw 110 into screw receptacle 124. With an alternate top portion of hanging rod 108, a ball receptacle substitutes for screw receptacle 124. Clip 112 is shown inserted into a manufacturer-provided reference hole in FIG. 8. FIG. 9 shows that data point 126 (the point for which the manufacturer gives spatial coordinates with respect to a reference plane) is directly above the center of screw 110 and hanging rod 108. FIG. 10 shows that clip 112 registers the data point 126 with the near edge of the reference hole 14. Other mounting arrangements and positioning of the targets may be used within the broad aspects of this invention.

Figure 11:
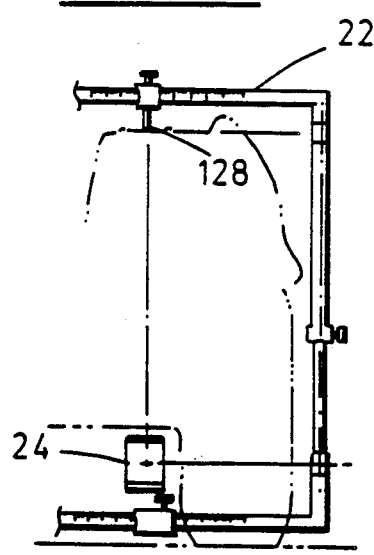
FIG. 11 is a fragmentary front elevation of a second embodiment of the invention.

Referring now to FIG. 11 (the second embodiment shown as a composite in FIG. 1) an alternative embodiment of the present invention uses coded targets 24 and a mechanical transfer system to transfer the coordinate information of point 128 using measuring assembly 22. The position of the target 24 may be determined with respect to the laser unit 16, thereby determining the spatial coordinates of any point on the unibody or top of the car by referring back to point 128 using the mechanical transfer assembly 22. The computer program referred to hereinbelow with reference to FIG. 16 may be modified easily to allow for the input of the various measurements provided by assembly 22. Modification allows the program to directly determine the displacement of point 128 from its normal position as determined by the manufacturers data concerning point 128.

Figure 12:
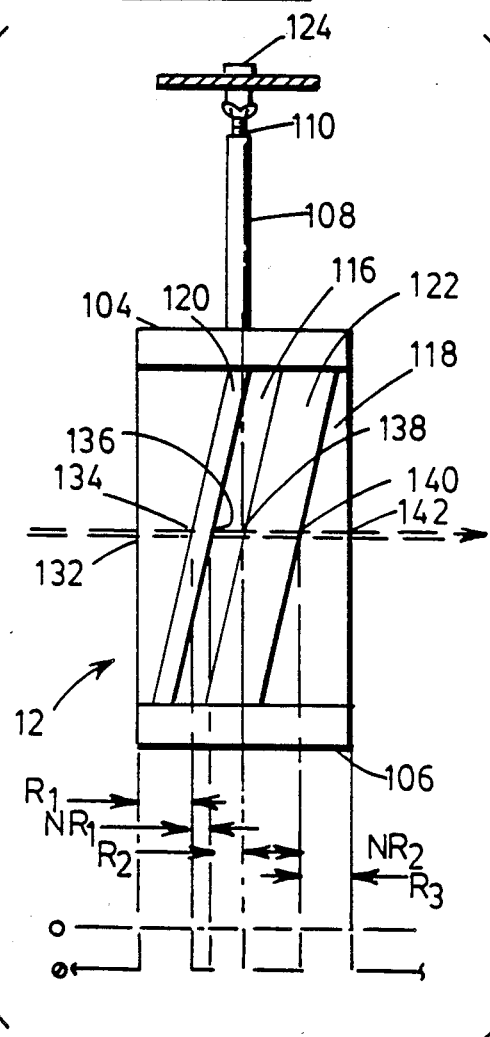
FIG. 12 is a diagram of a coded target, showing the sweep of laser beams.

Before referring to FIG. 12 and the coded targets in more detail, a brief explanation of the computer COUNTER is in order. The computer that runs the computer program referred to with reference to FIG. 16 runs at a set clock speed. This clock may be used to count increments of time, as is well known. As mirror mount assembly 47 or 49 rotates, sensors 50 (FIG. 3) determine the start of rotation of each by sensing the presence of stripe 51 as discussed with reference to FIG. 3. The computer program starts a COUNTER when it encounters this stripe 51 with this point being ABSOLUTE ZERO. The laser beam 18 (and 20) then strikes the leading edge of stripe 54 which turns "ON" detector 84. The total COUNTS from ABSOLUTE ZERO until this point in time are saved. When the laser beam leaves the stripe 54, detector 84 turns "OFF". The total COUNTS from ABSOLUTE ZERO until this point in time are saved as well. The two counts are added together and divided by two to determine the center of stripe 54. This variable is called CENTER. This determines RELATIVE ZERO which becomes the starting point of the 360° scan of the laser beams. The RELATIVE ZERO is used to minimize the effects of power fluctuations in the laser power. These fluctuations make the beam width diameter greater or smaller. Because a wider beam will reflect light sooner than a narrow beam, power fluctuations can affect the readings. By using RELATIVE ZERO, the unit compensates for these varying power fluctuations. Because detector 84 charges up to "ON" much faster than it discharges to "OFF" as the computer calculates the center of stripe 54 any power fluctuations are taken into account. The power will be the same for the rest of the scan of the 360° thereby in effect calibrating the unit for the entire 360° scan. These power fluctuations may also be minimized by letting the laser units warm up for at least 5 minutes before taking any measurements, with at least 15 minutes being preferred.

Referring now to FIG. 12, a front face view of a coded target is shown with a beam 18 (or 20) scanning across the face. The laser beam strikes the reflective edge of the target at 132 (which is the first reflective area 114), causing detector 84 to turn "ON". The computer program stores the number of COUNTS from ABSOLUTE ZERO in a variable called TARGET.BEG. When the laser beam reaches the edge of the first non-reflective stripe 120 at 134 detector 84 turns "OFF" due to lack of reflected light and the computer program stores the number of COUNTS from ABSOLUTE ZERO in a variable called BAR.BEG. The graph below FIG. 12 shows the period when detector 84 is "ON" as $R_1$. The end of the first non-reflective stripe and the start of the code area and second reflective stripe 116 is shown at 136 and the COUNTS are stored in a variable called CODE.BEG. Detector 84 is "OFF" as shown by $NR_1$. At 138 the laser beam strikes the edge of the second non-reflective stripe 122, and the computer program stores the COUNTS in a variable called CODE.END. $R_2$ shows that detector 84 was "ON" until this point. $NR_2$ shows that the detector 84 is "OFF" until the laser reaches the edge of the last reflective strip 116 at 140, where the computer stores the COUNTS in a variable called BAR.END. $R_3$ shows that the detector 84 is "ON" until the laser beam reaches the end of the target at 142 at which point the computer program stores the COUNTS in a variable called TARGET.END. When the laser beam completes its 360° sweep the total number of COUNTS that it took to complete the sweep are stored in a variable called ONE.REV.

The center of the target is computed by adding TARGET.BEG and TARGET.END together and dividing by 2 to get TARGET.CENTER. To compute the angle between the baseline (defined as the line between the center of the two mirrors 46 and 48) and the laser beam at TARGET.CENTER, the formula below is used:

$$((TARGET.CENTER - CENTER)/ONE.REV) * 360$$

This formula takes the number of COUNTS from ABSOLUTE ZERO until the center of the target is reached and substracts the number of counts between ABSOLUTE ZERO and RELATIVE ZERO to take calibration into account. That number is divided by the total number of COUNTS in one revolution then multiplied by 360 to determine the angle in degrees. This angle is called ANGLE1. The same process is performed for the second laser beam. The angle from the second mirror to the same target center is called ANGLE2.

Trigonometry is used to determine the "X" and "Y" coordinates of the target with respect to the laser unit. The center of mirror 48 on the first mirror assembly 47 is considered the origin. The formulas are shown below:

Width(X) = Baseline * Tan(ANGLE2)/(Tan(ANGLE2) − Tan(ANGLE1))

Length(Y) = X * Tan(ANGLE1)

The (X,Y) coordinate system is defined with X=0 being the center of mirror 48 on the first mirror assembly 47, and perpendicular to the Baseline between the two mirror centers. Y=0 is defined as the Baseline. Z=0 is the plane defined by the scanning laser beams.

The "Z" coordinate is calculated using the fact that the two non-reflective strips are slanted as shown on the face 102 of coded target 12 in FIG. 12. The non-reflective stripes are at a slant of 26 mm per 125 mm of height (varying width over height). This slant value can vary, with a greater slant increasing accuracy. The present value is the minimum slant required at present to achieve extreme accuracy. The ratio of the number of COUNTS represented by $R_1$ and the number of COUNTS represented by $R_3$, when compared to the total known height of the target will give the exact weight that the laser beam crossed the target. This number is then added to the known length of the hanging rod 108 clip assembly to get the exact "Z" coordinate of data point 126.

Each target is coded by varying the width of the second reflective stripe and the location of the second reflective stripe. The formulas used to calculate the target are:

(CODE.END − CODE.BEG)/(TARGET.END − TARGET.BEG) * 100

(CODE.BEG − BAR.BEG)/(BAR.END − CODE.END) * 100

The first formula compares the center reflective stripe 116 width to the total target width and converts it to a percent of the total target width. The second formula compares the first non-reflective stripe 114 to the last non-reflective stripe 118, and converts it to a percentage. The width of the second non-reflective stripe is varied in ⅛ inch increments. This allows 8 separate positions which allows for 36 different target codes. These numbers can be increased by changing the width of the second non-reflective stripe in smaller increments. Coded targets allow the user to hang any target from any reference hole 14, allowing the computer to determine which target is hanging where.

It is thought highly desirable to use two laser beams to determine the (X,Y,Z) coordinates of the data point 126. One laser beam may be used, but it has been found that by using triangulation with two laser beams a much more accurate reading of the coordinates is found.

Figure 13A:
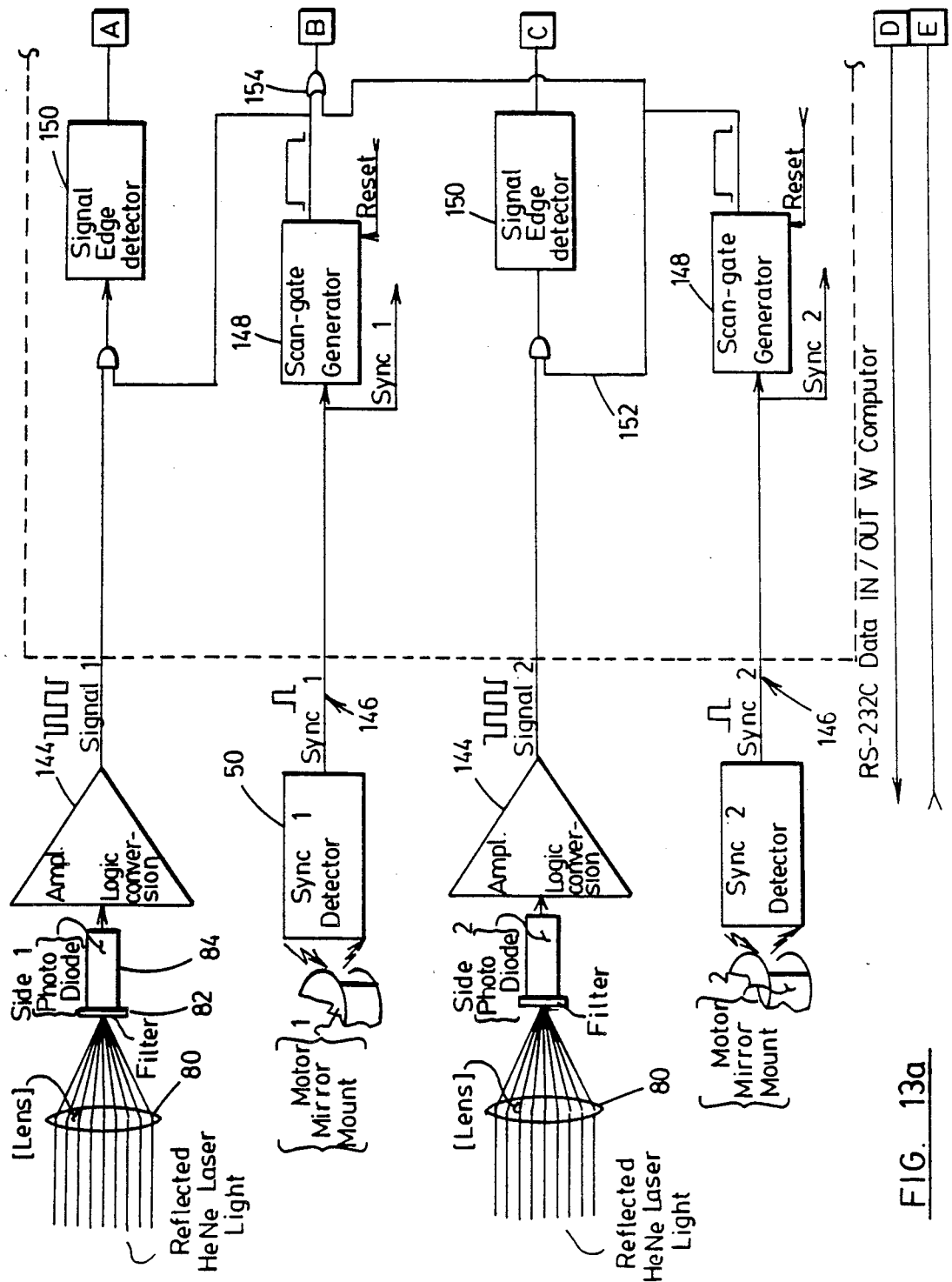
Figure 13B:
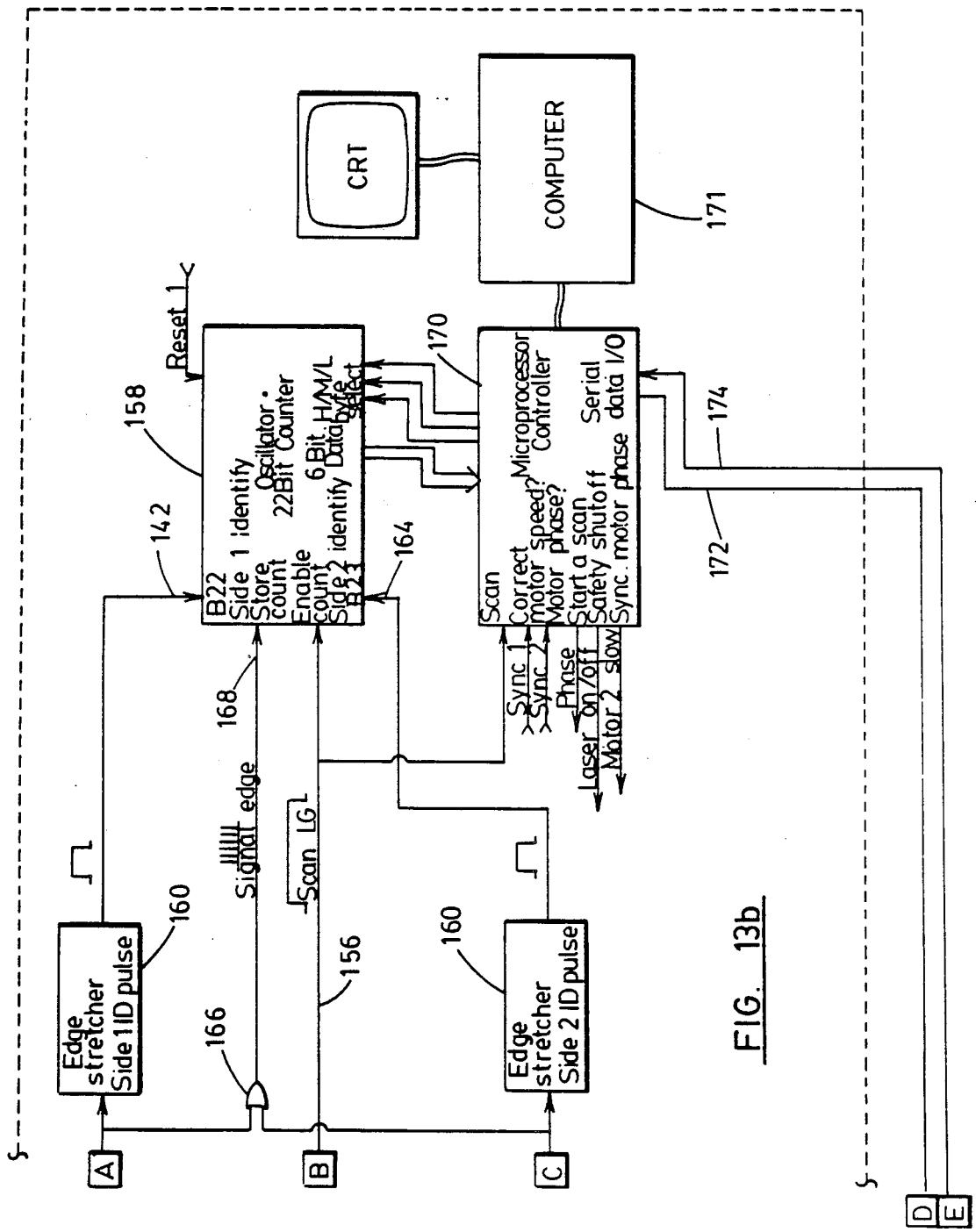
Figure 14A:
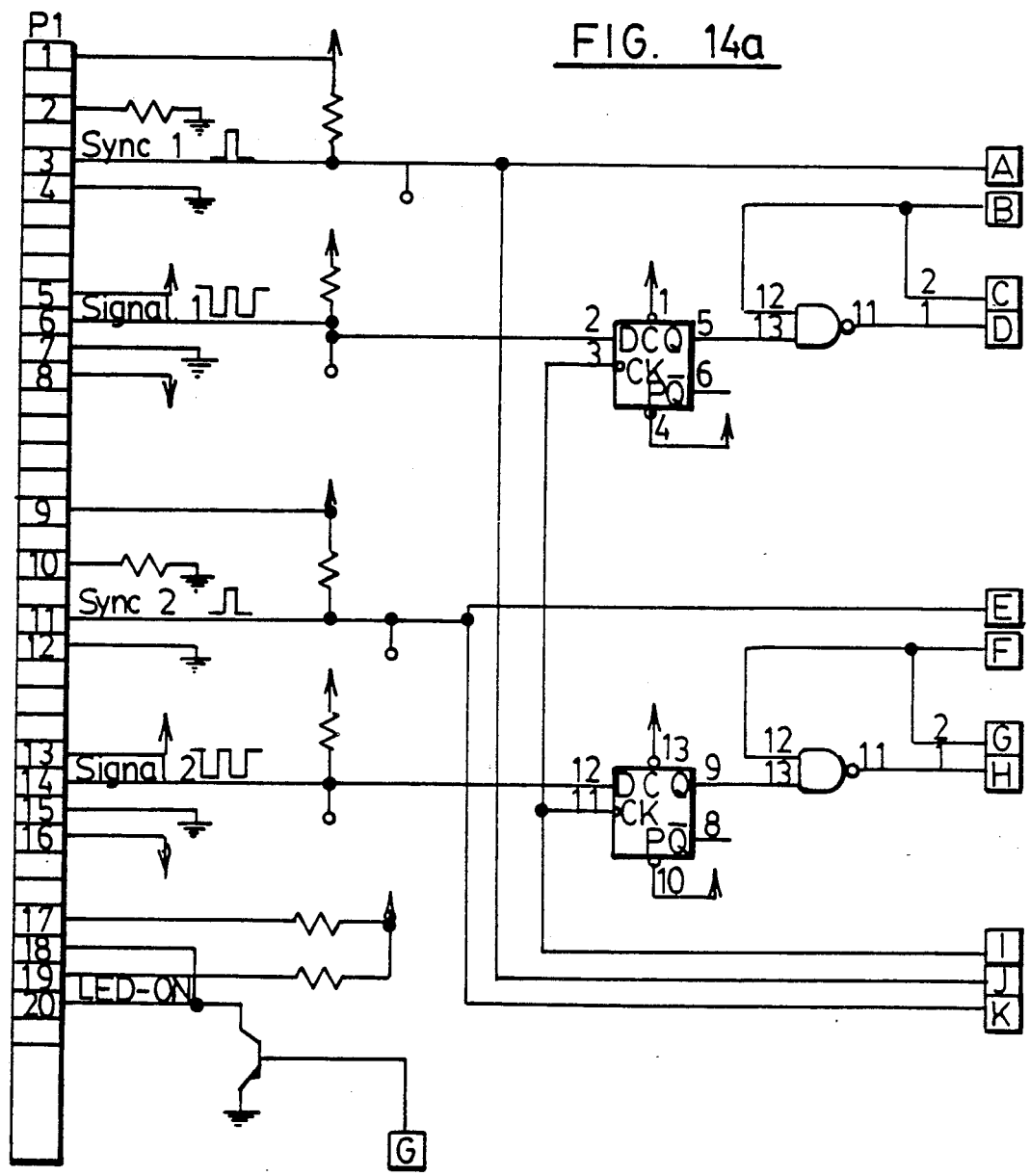
FIGS. 14 and 14a–14m are an electronic circuit diagram.
Figure 14B:
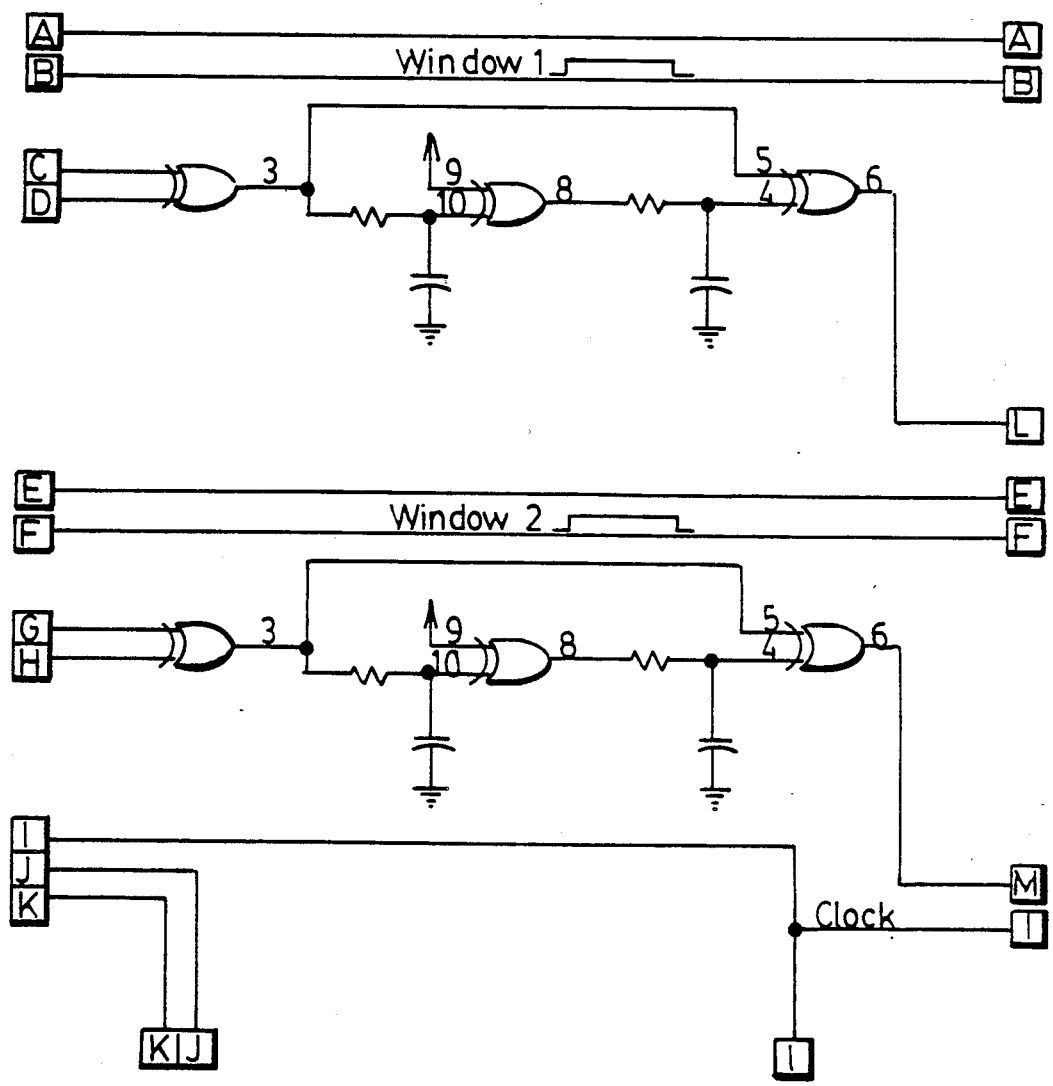
Figure 14C:
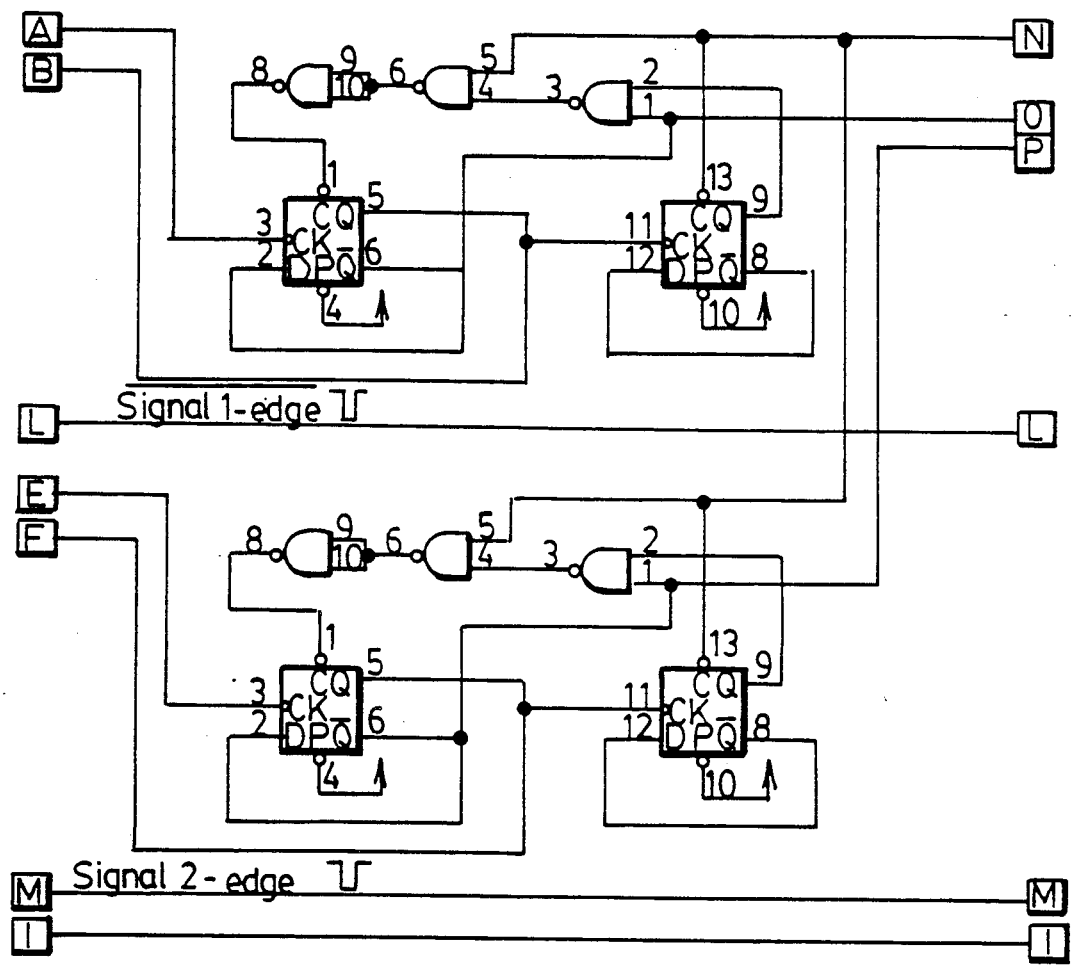
Figure 14D:
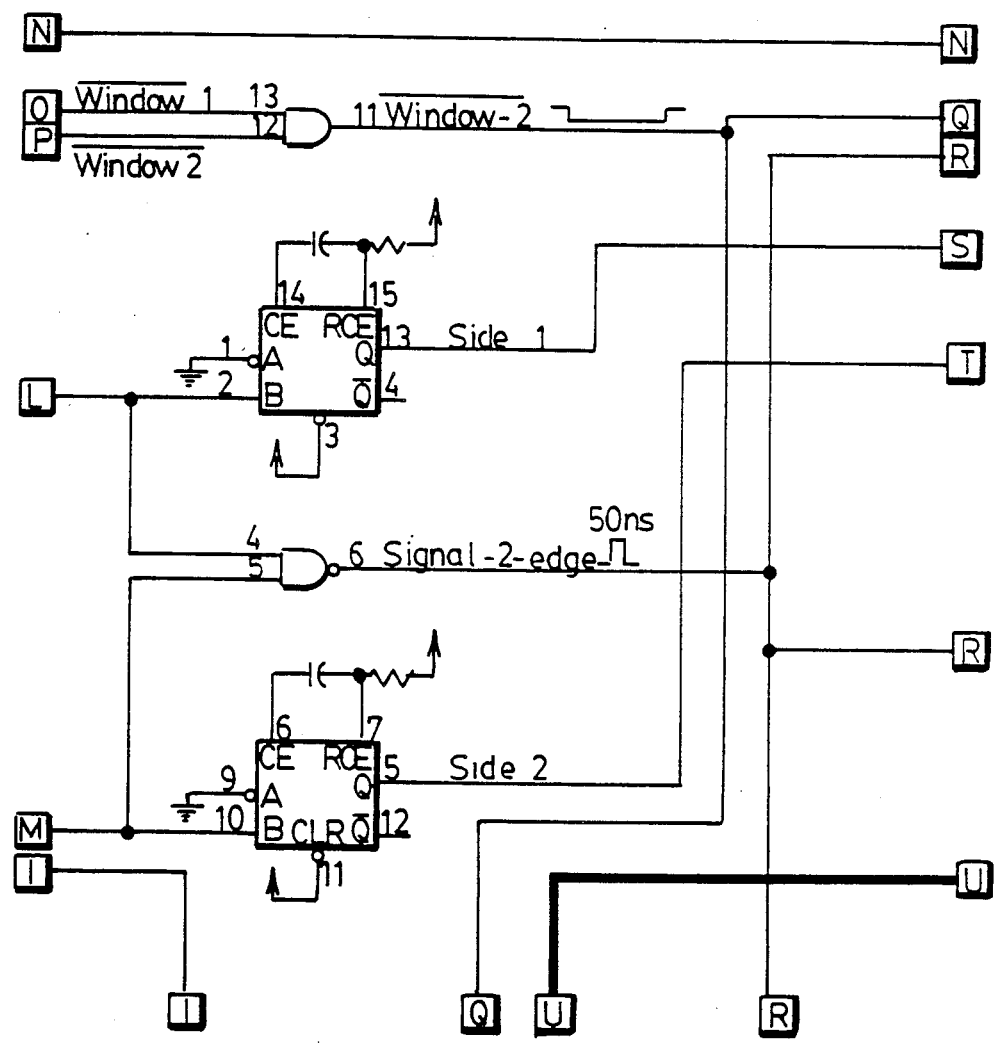
Figure 14E:
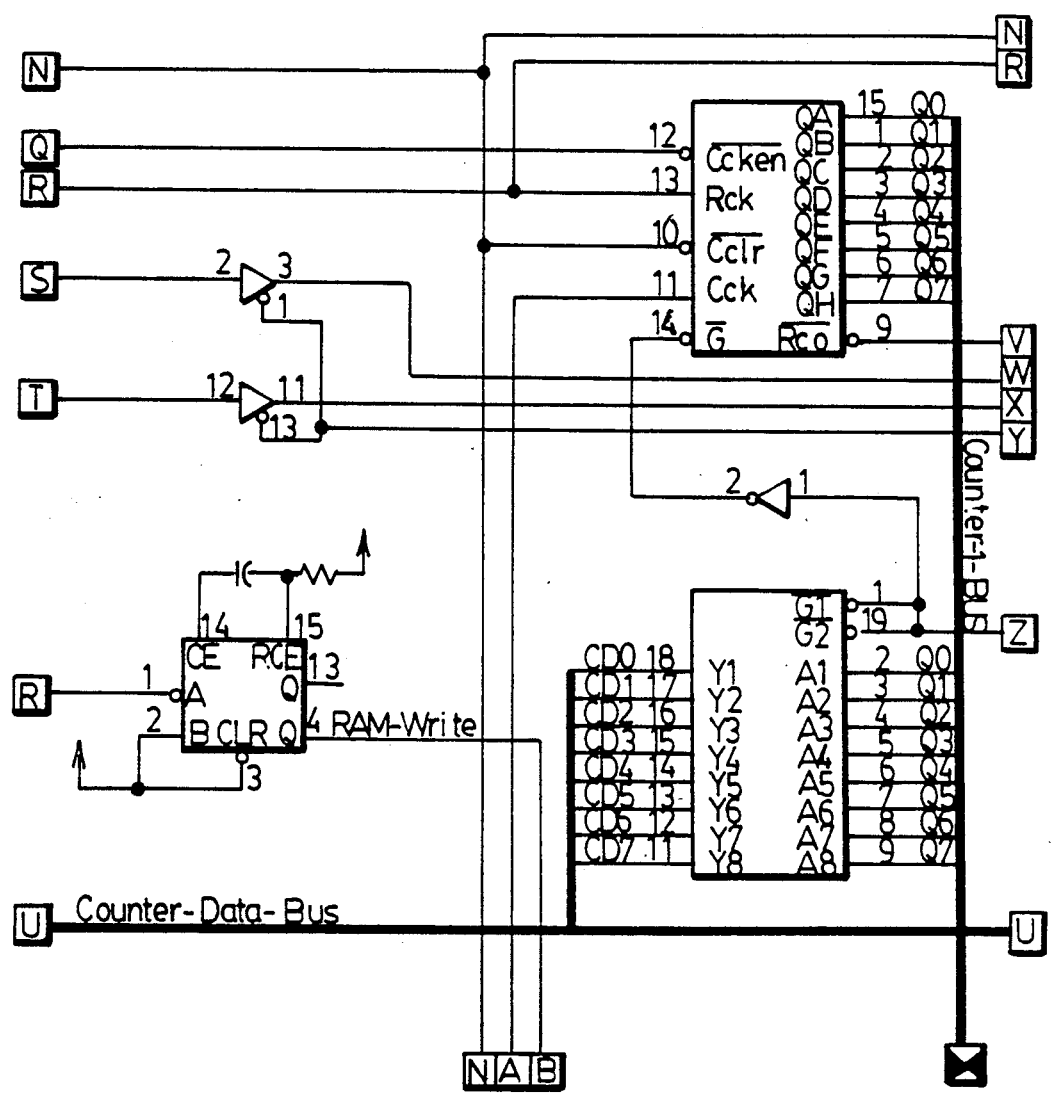
Figure 14F:
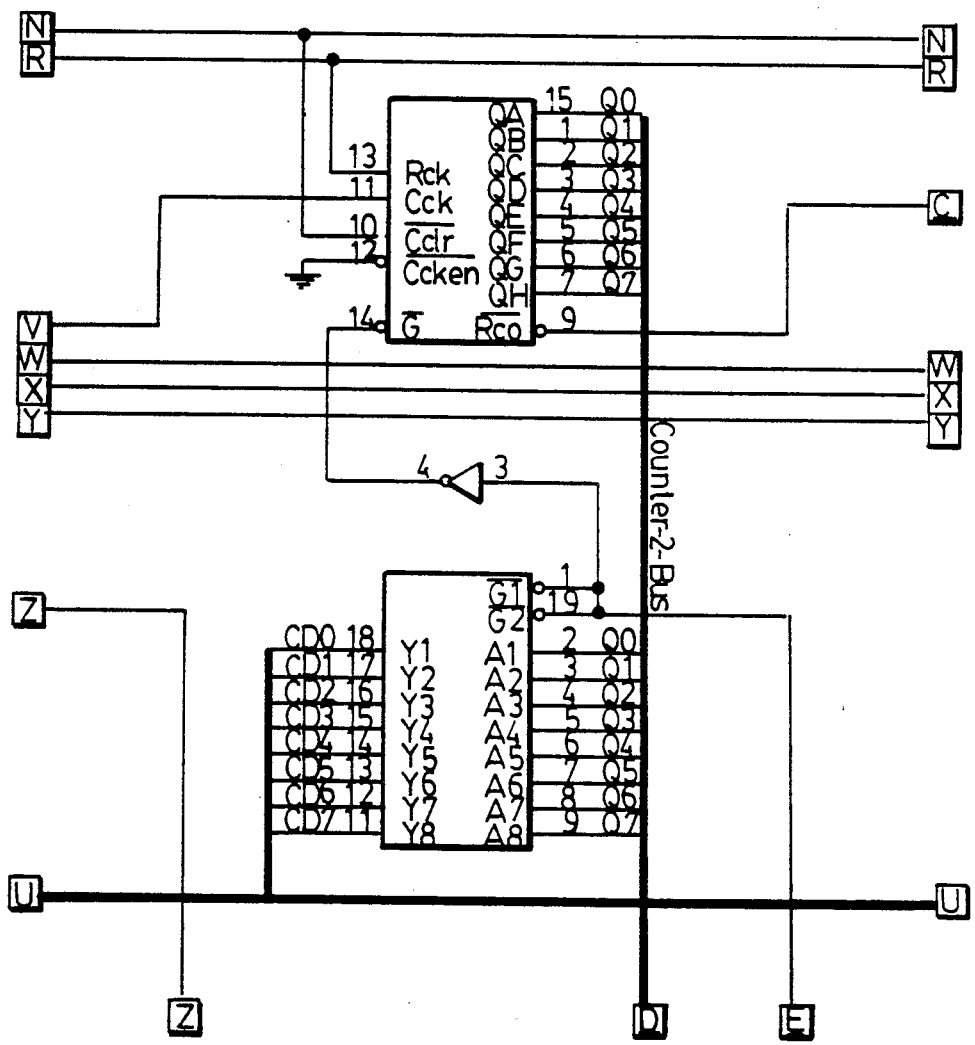
Figure 14G:
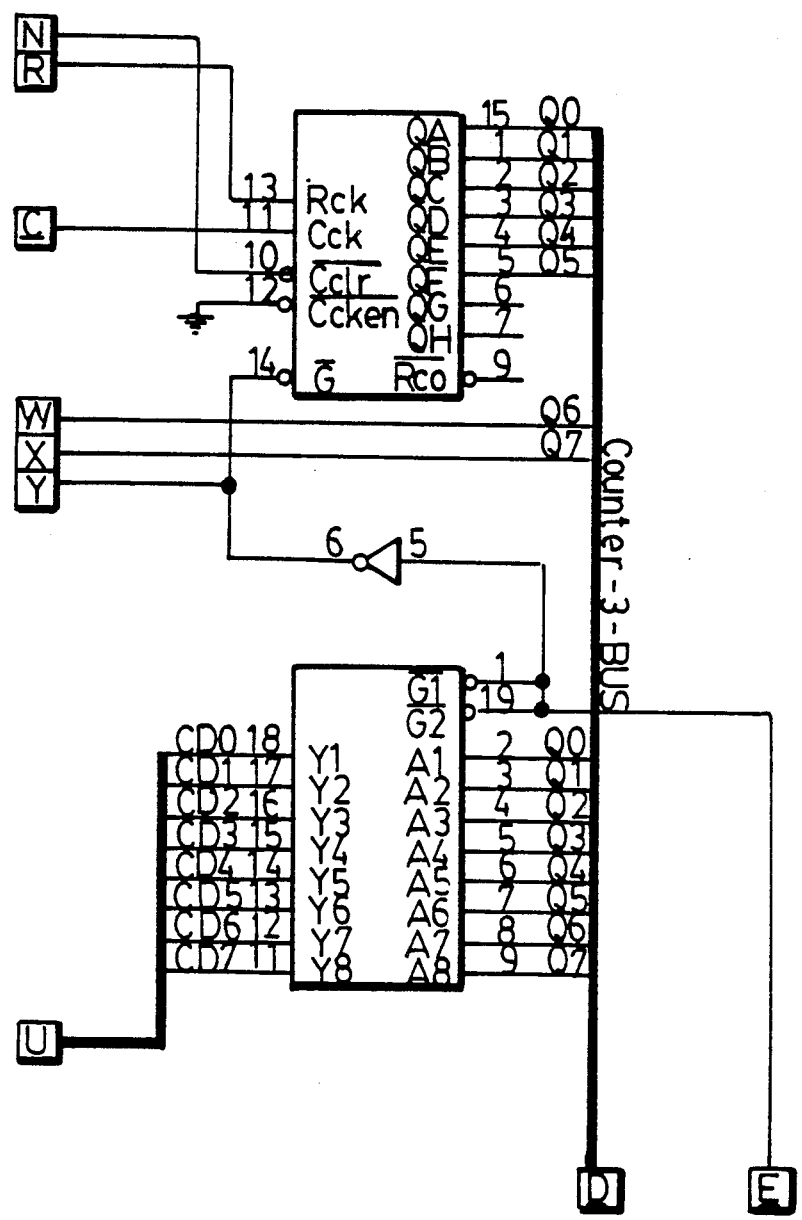
Figure 14H:
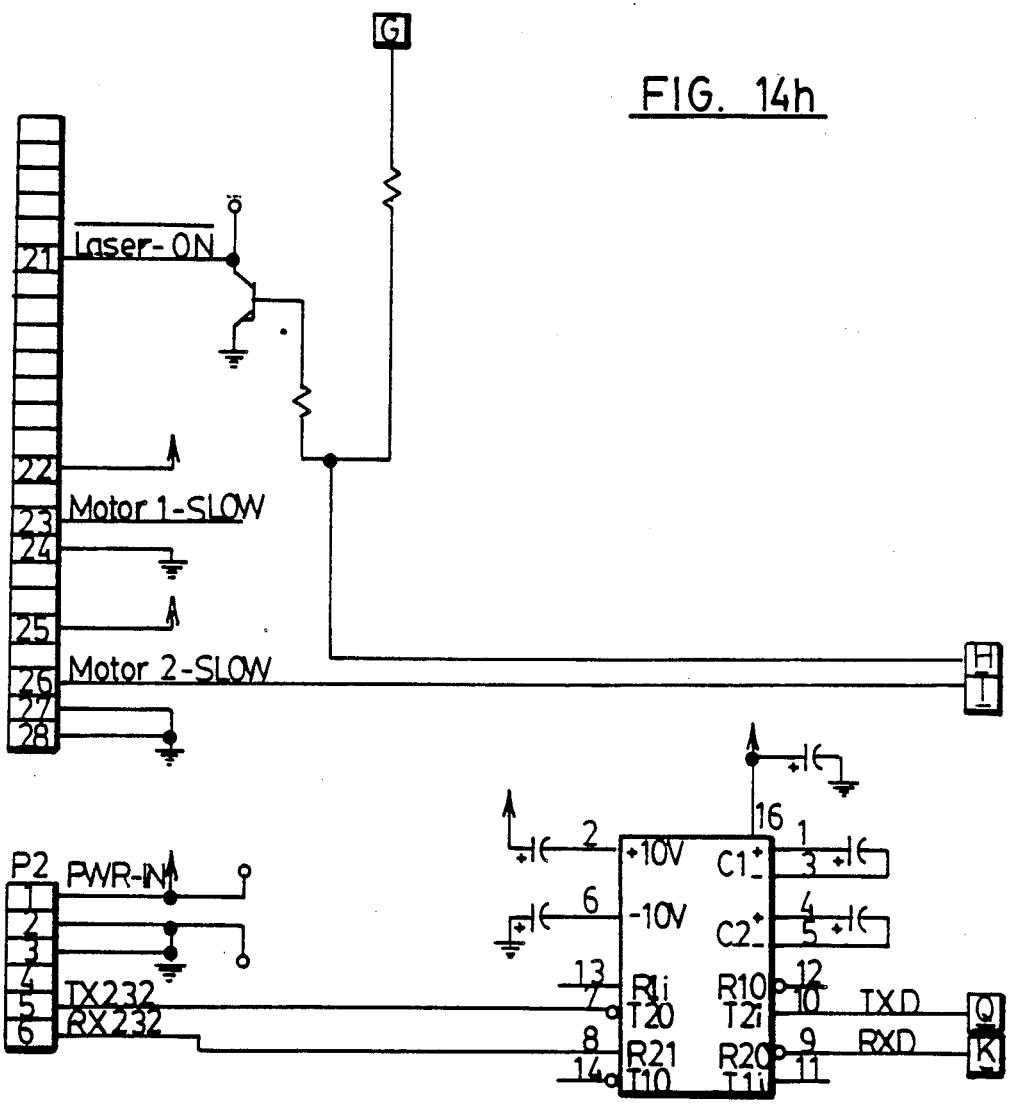
Figure 14I:
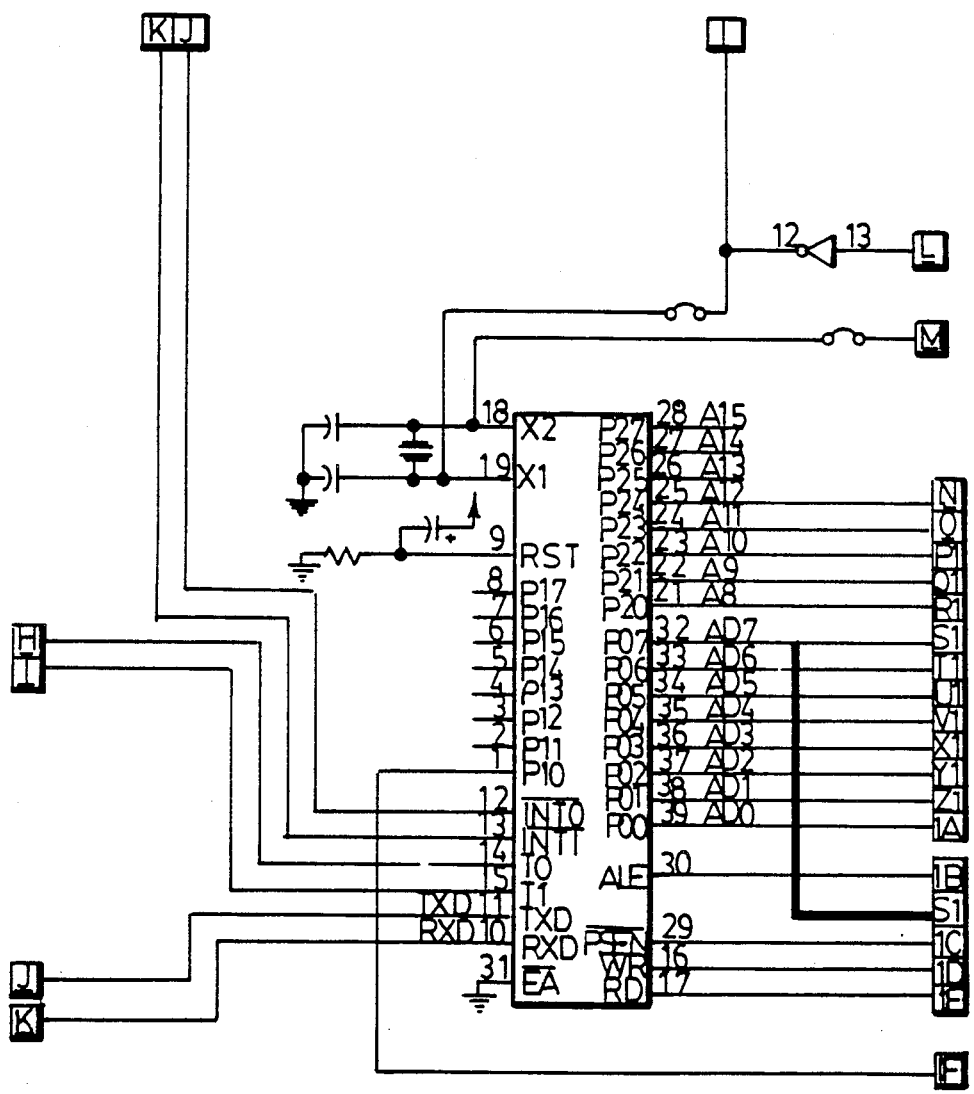
Figure 14J:
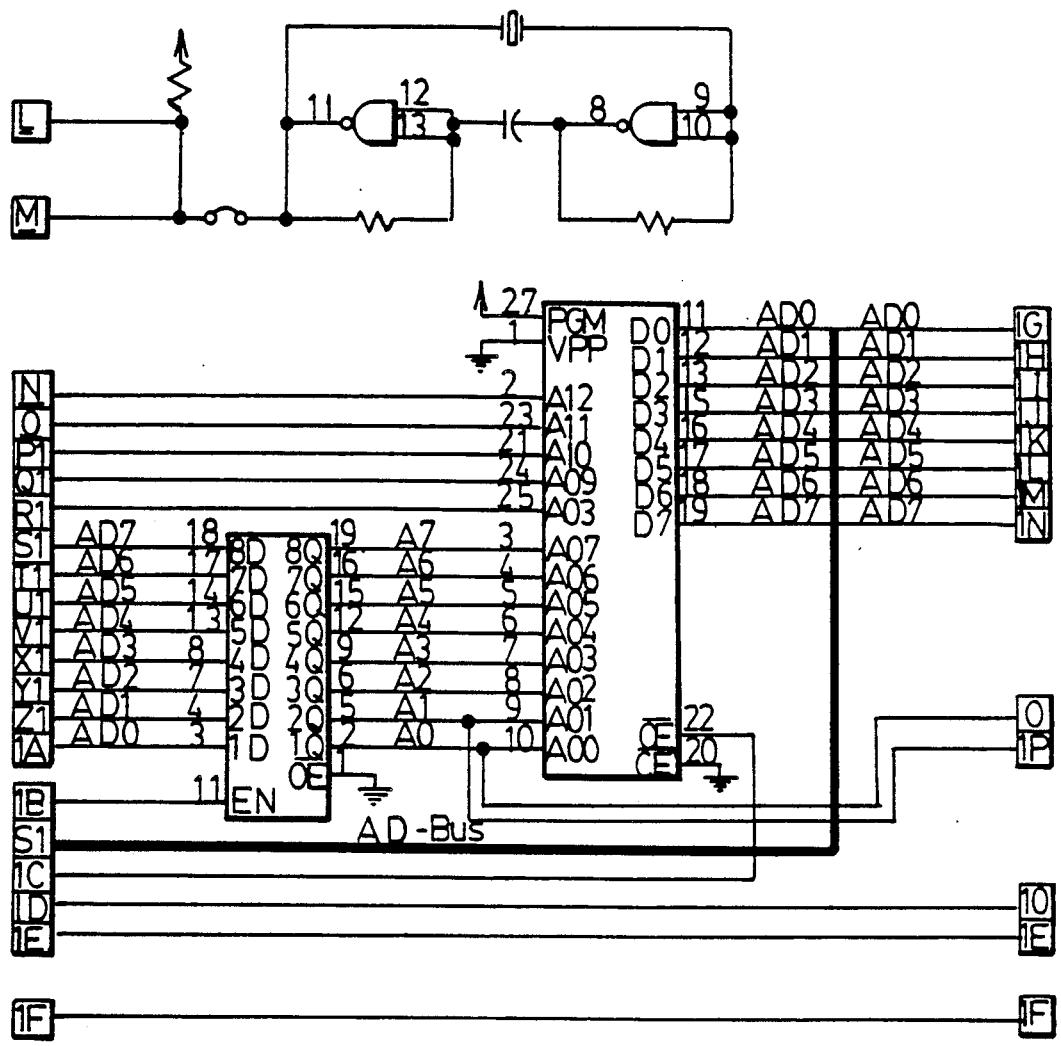
Figure 14K:
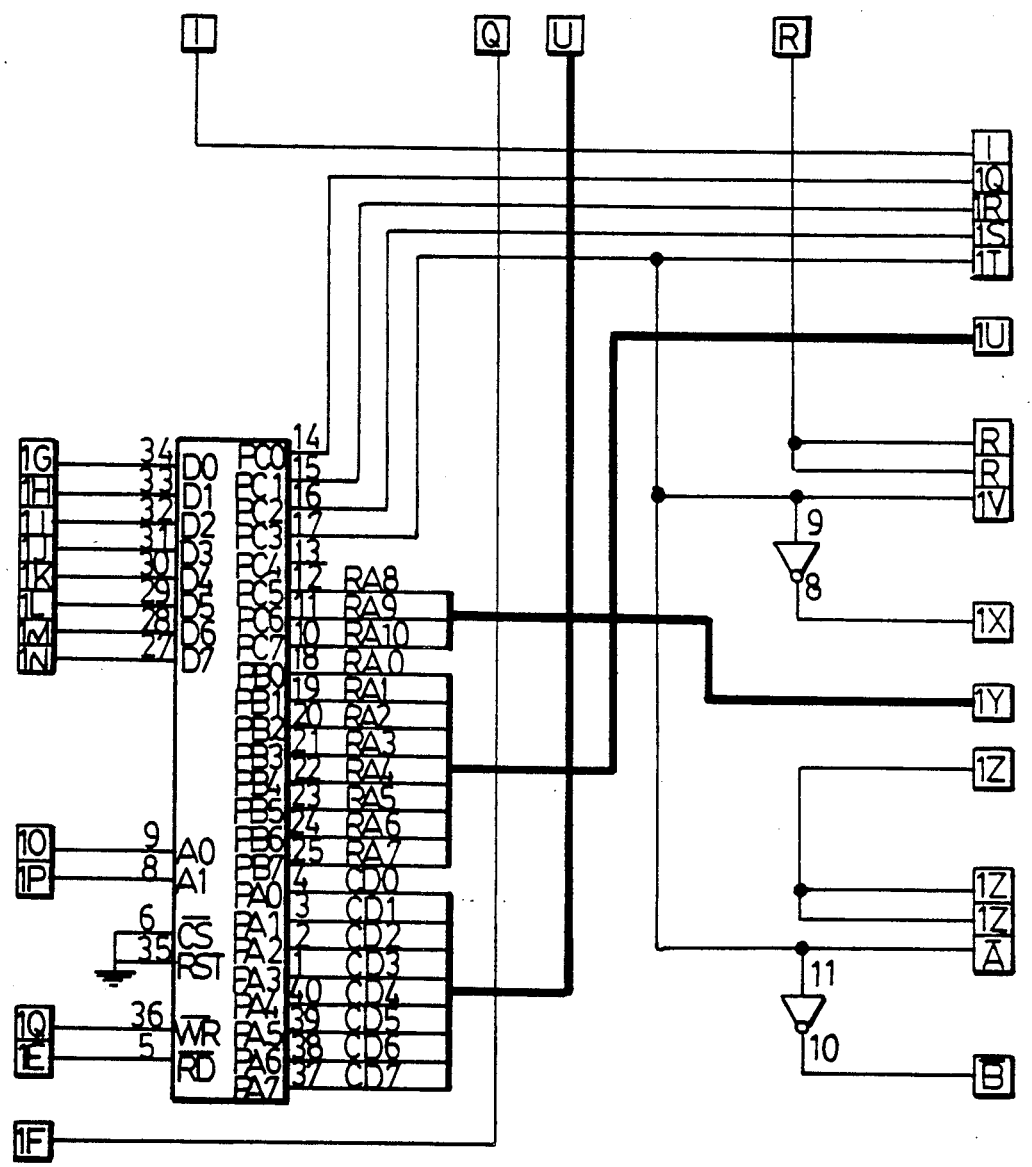
Figure 14I:
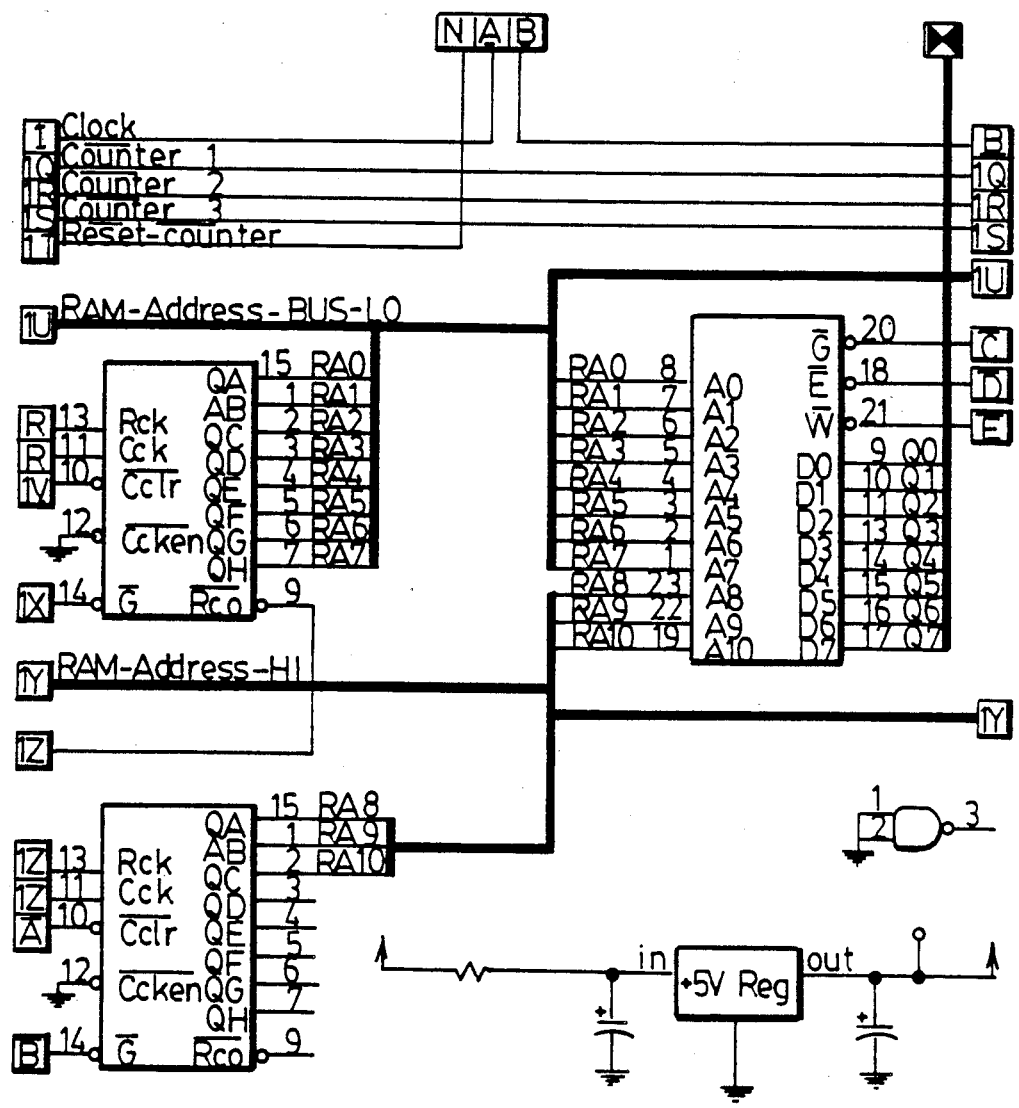
Figure 14M:
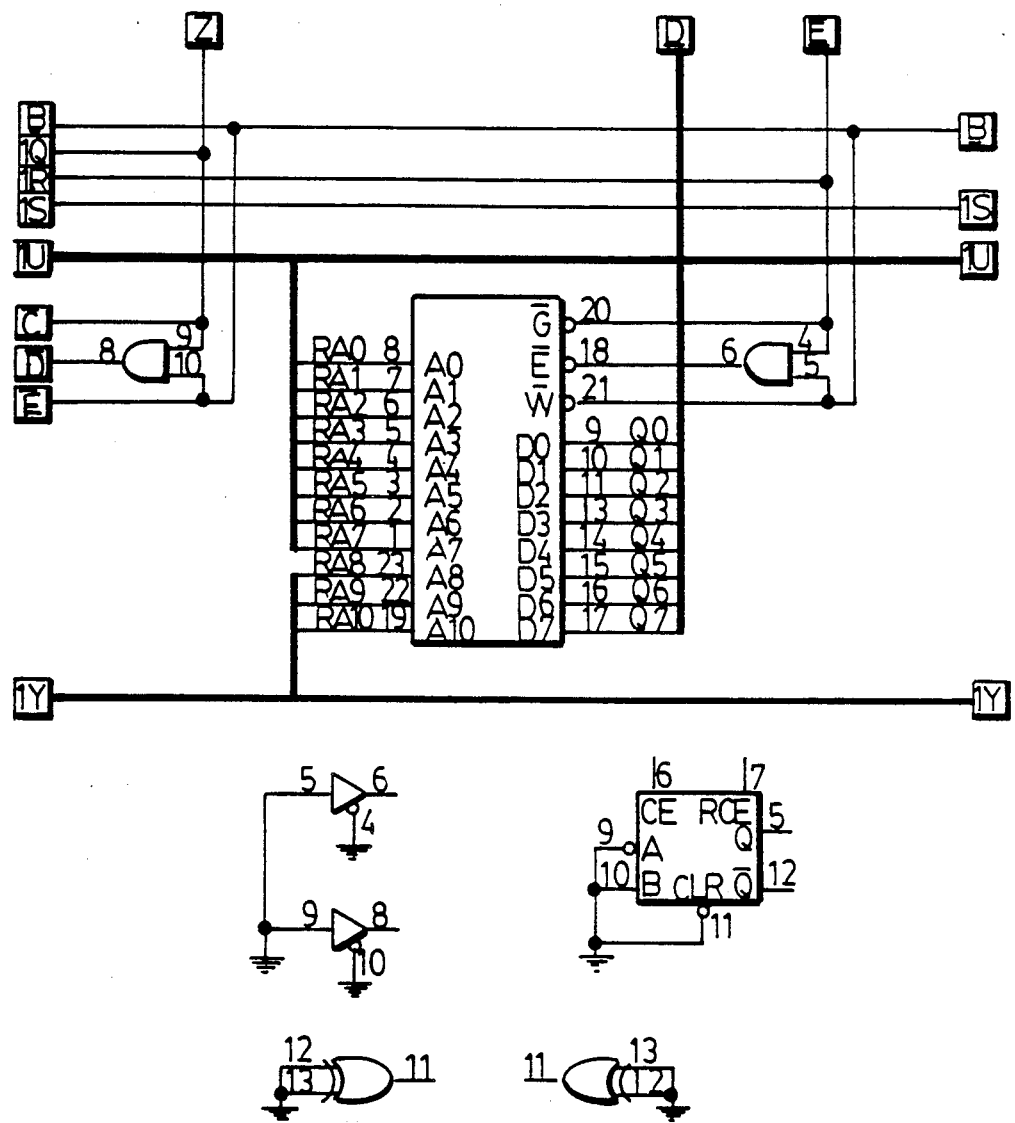
Figure 14N:
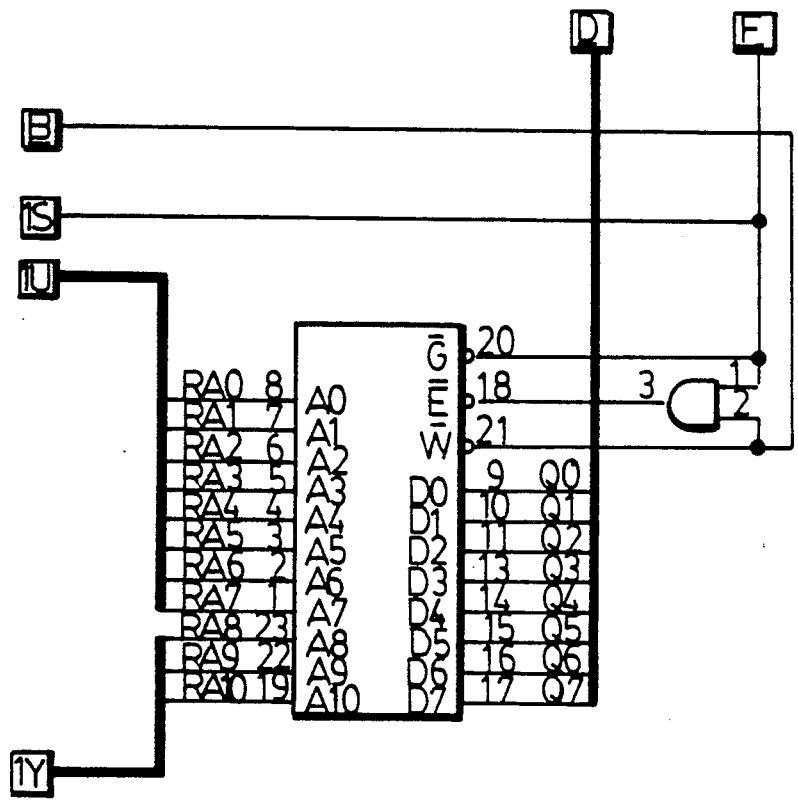

Referring now to FIGS. 13a and 13b, a generalized block diagram of the electronics 88 of FIG. 1 is shown. The corresponding detailed circuit diagrams are shown in FIGS. 14 and 15 (14a–n and 15a–b as shown on the figure summary sheet). In lieu of describing the invention's operation with respect to the detailed circuit diagrams, the following description will proceed with respect to the generalized block diagram of FIG. 13. The block diagram is split into two portions, one for each mirror assembly 47 and 49 (corresponding to Side 1 and Side 2 as indicated in the Figures). This description will only discuss one side, as the circuitry is the same for both. As both laser beams 18 and 20 scan a complete revolution, the laser light that is reflected from each of the various reflective portions of each of the various coded targets 12 or 24 is focused by lens 80 (shown in FIG. 3) and passed through an optical bandpass filter 82 which only allows the passage of light of wavelength 632.8 nm. As mentioned above, this filter reduces the interference effects of the two laser beams, and reduces the negative effects of the ambient light. The filtered light strikes a photodiode (detector 84) and creates a current that is proportional to the intensity of the light. This signal is amplified and converted to digital logic levels at 144 and sent to the rest of the circuit as signal 1.

Stripe 51 on the rotating mirror mount 42 is detected by optical sensor 50. Sensor output (Sync) indicated at 146 is a logic pulse that is used to mark the beginning of each complete rotation, and to determine if the motors are rotating properly. If either of the motors stop rotating or slow down by a predetermined amount, the laser beam is turned off. Motor sync pulse 146 is fed to the scan-gate circuit 148 which uses pulse 146 to generate a pulse that is the length of one complete revolution of the scanning motors 40. This microprocessor provided the reset pulse each time a measurement is to be made (this is determined by input from the operator). The scan-gate pulse is used to gate the incoming reflected light pulses into the edge detector circuit. This input to the edge detector circuit 150 from 148 is shown at 152. Both scan-gate circuits outputs are OR'ed together at 154 to provide a scan-length pulse 156 that is used to enable the Counter-Memory circuit 158. The scan-length pulse 156 is also monitored by the microprocessor to determine when both scans are finished. The edge detector circuit 150 produces a short pulse for each high-low and each low-high transition of the signal pulses. These transitions correspond to the edges of the reflective and non-reflective areas of the targets scanned by the laser beam. The edge pulses are sent to the edge stretcher circuit 160, which lengthens each edge pulse and sends it to the Counter-Memory circuit 158 where it is used to identify which side produced the pulse, shown respectively for Side 1 and Side 2 at 162 and 164. The edge pulses of Side 1 and Side 2 are also OR'ed together at 166 and sent to the Counter-Memory circuit 158 at 168.

The Counter-Memory circuit 158 is a 22 bit counter that can store 2048 24 bit values and which is reset at the beginning of each 360 measurement scan. The counter counts an 11 MHz oscillator, although higher frequency oscillators could be used. Each signal edge pulse causes the current counter value to be stored in 24 bit memory. The stretched side-identification pulse 162 or 164 is stored in memory bits 22 and 23. Three values are stored for the ABSOLUTE ZERO and RELATIVE ZERO measurements, six values are stored for each target, and one value is stored for the variable ONE-REV which signifies the end of a 360 scan. For 36 targets this only uses 220 of the 2048 memory addresses available; memory remains for additional targets, and if necessary a larger counter may be used.

The microprocessor controller circuit 170 receives and transmits serial RS-232C data with the main computer 171 via the serial data I/O line 172 and 174 (carried inside bundle 86). Once a 360 measurement scan is completed, the values stored in the Counter-Memory circuit 158 are transmitted to the computer for processing, where the actual spatial positions of all manufacturer-provided data points 126 are determined and displayed on a monitor together with the normal spatial positions of those same points. Controller circuit 170 also produces the pulse that resets the scan-gate generator 148 and the 22 bit counter 158 at the start of each measurement scan. Controller circuit 170 also monitors the scan so that the data may be sent to the computer for processing as soon as the scan is completed. Controller circuit 170 is also responsible for monitoring the motor sync pulses 50. If either of the motors stop rotating or slow down, the laser beam generator 56 is turned off to protect people from viewing the laser beam directly. The controller circuit 70 also synchronizes the phase of the motors 40 when the system is powered up. The motors will stay in phase until power is shut off. The phase of the motors is not critical to the operation of the system, and need only be approximately synchronous to function properly.

Referring now to FIG. 16, a flow chart of the program contained in appendixes I-III is shown. Appendix I contains the source code for the main driving program and is written in BASIC, although this program may be ported to any number of languages and run on any type of processor. Appendix II contains the source code for displaying the graphic of the vehicle body with the actual and normal coordinates shown in different colors (see FIG. 18). Appendix III contains the source code for printing the screen shown in FIG. 18 so that a permanent record may be made of the display. In lieu of describing the programs operation on a source code basis, the following description will proceed with respect to the flow chart of FIG. 16.

Figure 18:
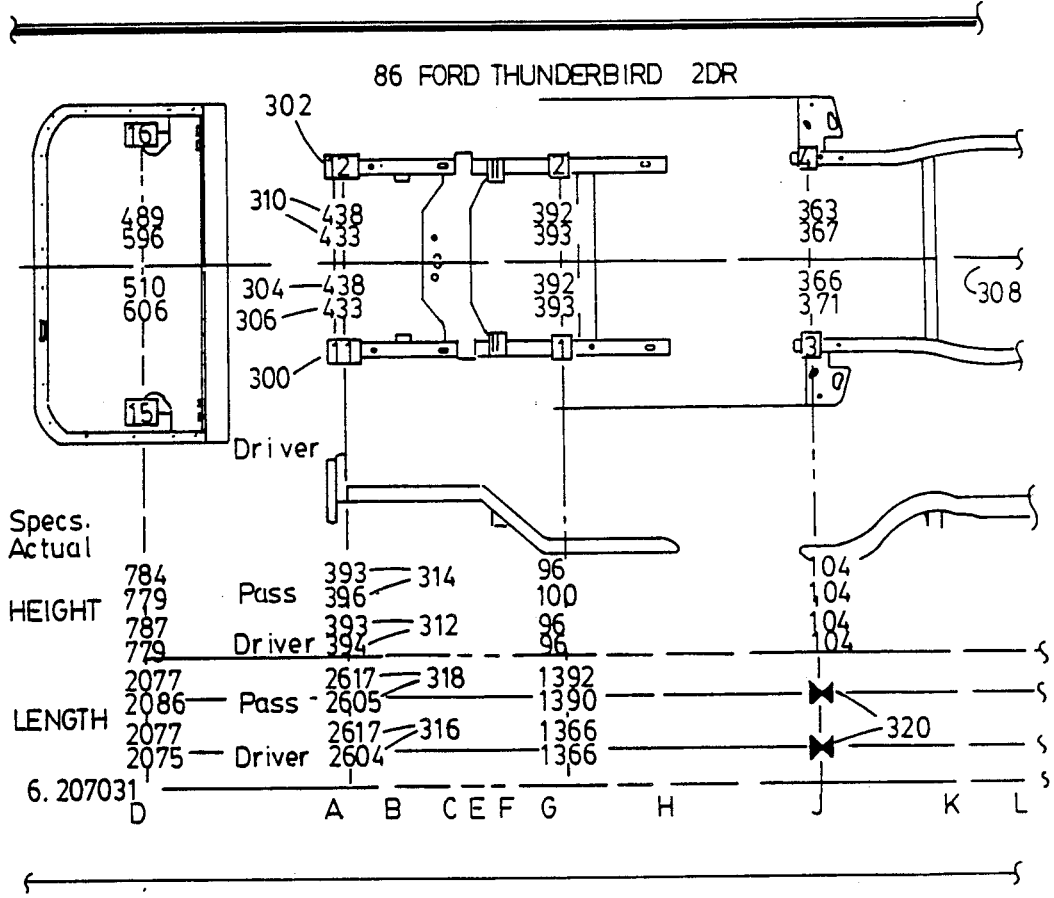
FIG. 18 is a diagram of a computer display.

Referring now to FIGS. 16–18, the start of the program is shown at 200. The program may be run on any computer, but in the preferred embodiment, an IBM AT compatible is to be used (not shown). The program checks to verify that the vehicle straightener measuring unit 16 (laser unit) is connected at 202. If after a predetermined number of checks the unit is not connected, the program terminates at 204. The program next requires the operator to complete the screen shown in FIG. 17 at 206 where various billing information and vehicle information is entered at 218 as exemplified by FIG. 17. If the customer is a repeat customer, the program will display the car information entered previously, shown in blocks 208–216. The operator then enters the Vehicle Identification Number or VIN at 220 (each vehicle has a unique VIN). The computer decodes the VIN and displays the rest of the vehicle information shown in FIG. 17 at 222, except the license number, which is entered by the operator. The computer contains a database of specification displays for every vehicle model. The specification for the particular model is accessed using the decoded VIN, and displayed on the screenb at 224, as exemplified in FIG. 18. Block 226 represents a menu where the operator next chooses what operation to perform. The operator by now has attached all the targets to the various points on the vehicle to be measured. The operator must pick three of the targets to define a reference plane. This operation is shown in subroutine number 4 shown at 228. This consists of inputting the target number, moving the cursor to the correct location on the screen via the cursor control keys or with a mouse, and assigning that target number to the point on the screen by striking the enter key. The operator tries to pick three targets located on a relatively undamaged portion of the vehicle. The positions of the other targets are computed relative to this reference plane. If all points on the vehicle are damaged, then any three points may be picked. The calculation is performed, the vehicle is straightened, three different points are chosen, the calculation is performed, and the vehicle is straightened again. Eventually, by repeating these steps several times, the entire vehicle is brought back into specification. Of course, it is extremely rare to find a vehicle damaged to such an extent. Normally, three undamaged points may be found to use as reference points.

The ReDo CenterLine option of menu 226 is shown at 229. A reference center line is determined at 231 by one of three methods (Natural, Average, or Third Reference Point), a subroutine is run at 233 to calculate the Centerline. This is used as a reference point for the "X" or width distance shown in FIG. 18. This menu option allows the user to fine tune the determination of this centerline.

The measurement option of menu 226 is shown at 230. The screen is blanked at 232 and a signal is sent to the unit 16 controller 170 to start the measurement process. The laser beams have been continuously scanning a 360 circle, but no measurements have been taken. The counter is reset as discussed above. At the start of the next rotation, all of the COUNTS discussed above are stored in the counter 158. These steps are shown at 234 and 236. The controller 170 sends the COUNTS information back to the computer and the program checks to see if there are enough counts (3 before the first target, 6 per target and one at the end of the 360 scan) at 238. If the number of COUNTS is wrong, the measurement is redone. The numbers are then converted into decimal, the six COUNTS per target are separated out and the target number, height, ANGLE1, and ANGLE2 are determined by the formulas discussed above. These steps are shown in blocks 240–246. The program next verifies that both laser beams have data for the same target numbers, at 248. This insures that all the targets are oriented within the 30 range with respect to both laser beams as discussed above. The program at 250 next calculates the (X,Y,Z) coordinates of each target with respect to the unit 16. The program then rotates these coordinates into the coordinate system defined by the manufacturer provide data at 252. The program then attempts to "fit" the actual coordinates of the reference hole with the manufacturer-provided reference hole data, at 254. If the actual coordinates are within a certain distance of the position of the closest manufacturer reference hole as defined by the data, then the program knows that it is comparing the correct two points. Blocks 256–260 show that the program is updating the screen shown in FIG. 18 with the target number shown at the correct location (calculated at 254) with the specification (normal) value shown in one color and the actual value shown in another color. The screen shown in FIG. 18 will be more fully described below.

The operator now performs straightening on the vehicle with methods well known in the art. The measurements are retaken by selecting the measure option 230 at 226. When the normal values match the actual values (within a predetermined amount of error) then the car has been straightened. The operator may now choose Continue at 226 which performs the subroutine numbered 5 shown at 262. This routine allows the operator to print a copy of FIG. 18 for the customers file, save the information to a customer file and prepare an invoice.

Subroutine number 6 shown at 264 allows the user to more closely monitor a particular portion of the vehicle. This allows the user to straighten a particular portion of the vehicle, measure, view the updated screen to see the effects of the straightening, and repeat if necessary.

Referring now to FIG. 18 a sample screen showing the actual spatial positions of the reference holes, and also compares them to the specification or normal spatial positions. Eight targets 12 are shown in FIG. 18, however, any number of targets may be used. Only targets 11 and 12 are discussed here since all that is said applies to the other targets. Targets 11 and 12 are shown on FIG. 18 at 300 and 302. The two numbers shown at 304 and 306 correspond to the measurement in millimeters of the width of "X" coordinate of the data point 126 corresponding to target 11 as measured from the centerline 308, calculated above. The number shown at 304 is displayed in one color and corresponds to the "normal" or "specification" value as provided by the manufacturer. The number shown at 306 is the "actual" width value as measured by the unit 16. The numbers shown at 310 represent the width deviation for target 12. Similarly, the "Z" or height, both actual and specification, is shown for targets 11 and 12 at 312 and 314 respectively. This represents the distance from the data point to the Z=0 plane as calculated above. The length or "Y" coordinate for targets 11 and 12 are shown at 316 and 318 respectively. The Y=0 point is shown at 320.

The operation of the program of Appendixes I-III is now described. Appendix IV is a source code for an alternate, preferred program which functions with minor variations in substantially the same manner as the program of Appendix I.

```
    a$ = INPUT$(LOC(1), #1) 'flush buffer first
    try = 0: numtries = 3
DO
    PRINT #1, "?";
    FOR i = 1 TO 4000: NEXT i: PRINT LOC(1) 'delay give
ULTRALINE a chance to respond
    IF LOC(1) <> 0 THEN
        a$ = INPUT$(1, #1)
    END IF
    try = try + 1
LOOP UNTIL a$ = "Y" OR try > numtries 15 IF try > numtries THEN
      PRINT
      PRINT "ULTRALINE NOT CONNECTED!"
      BEEP
      PRINT "Please Check Cable From Computer to Laser
Unit"
      PRINT "Press ( Q ) to Quit or Any Other Key to
Continue"
      BEEP
      DO
         k$ = INKEY$
      LOOP WHILE k$ = ""
      IF k$ = "Q" OR k$ = "q" THEN END
      IF k$ = "T" OR k$ = "t" THEN GOTO 20
      CLOSE
      GOTO 10

ELSE PRINT : PRINT "ULTRALINE is now ON-LINE..."

END IF a$ = INPUT$(LOC(1), #1) 'clear buffer 20    mor% = 1: ti% = 0: numsensors% = 16: back% = 9
      inc% = 10: XMAX% = 639: YMAX% = 349: 'starting
cursor position
      n40% = 22 * 2 + 4: n60% = 22 * 3 + 4

DIM T.ANGLE(n40%), T.HEIGHT(n40%), ANGLE.1#(n40%),
```

```
ANGLE.2#(n40%), Z.1(n40%), Z.2(n40%), x(n40%), Y(n40%),
z(n40%), X1(n40%), X2(n40%), X3(n40%), Y1(n40%),
Y2(n40%), Y3(n40%), z1(n40%), Z2(n40%), Z3(n40%)
    DIM count&(255)       '                    array to store
measured counts in
    DIM qa$(20), QR(20), QC(20), Q1(20)'quest. Rol Col
locations, max. len. of ans.
    DIM f$(255)
    DIM filex%(n40%), filey%(n40%), filez%(n40%),
cx%(n40%), cy%(n40%), cz%(n40%)
    DIM letter$(n40%), LN$(n40%)
    DIM FY%(n40%)
    DIM tap%(n60%), mx%(n60%), my%(n60%), mz%(n60%),
px%(n40%), py%(n40%)
    DIM cfm2%(120), cff2%(120), sfr%(120), sfc%(120)
    DIM l%(640), two%(8)
    DIM rod.length%(numsensors%), pat%(numsensors%)
    'dim transducer array
    x% = 35: Y% = 10: s = 4 + INT((x% * 4 + 7) / 8) *
Y%: DIM xdcr%(s)

x% = 6: Y% = 11: s = 4 + INT((x% * 4 + 7) / 8) * Y%:
DIM l.arrow%(s), r.arrow%(s)

'                           the lines above this need
only be done once ...
    '
40 SCREEN 9: WIDTH 80, 25: KEY OFF
    VL$ = CHR$(186): UL$ = CHR$(201): UR$ = CHR$(187): LL$
= CHR$(200): LR$ = CHR$(188)
    HLT$ = CHR$(185): HRT$ = CHR$(204)
    CLS : COLOR 10, 9: CLS
    s$ = STRING$(8, 32)
    LOCATE 1, 1: PRINT s$; UL$; STRING$(22, 205); UR$; s$;
    LOCATE 2, 1: PRINT UL$; STRING$(7, 205); HLT$; "   U
L T R A L I N E   ";
    PRINT HRT$; STRING$(7, 205); UR$;
    LOCATE 3, 1: PRINT VL$; STRING$(7, 32); LL$;
STRING$(22, 205); LR$;
    PRINT STRING$(7, 32); VL$;
    COLOR 10, 9
    LOCATE 4, 11: PRINT "CUSTOMER INFORMATION";
    LOCATE 5, 9: PRINT "Last              First"
    LOCATE 6, 2: PRINT "Name:                       ,";
    LOCATE 7, 2: PRINT "Address:";
    LOCATE 8, 2: PRINT "City:";
    LOCATE 9, 2: PRINT "State:";
    LOCATE 9, 12: PRINT "Zip:";
    LOCATE 10, 2: PRINT "Phone:";
    LOCATE 11, 2: PRINT "Insurance Co.:";
    LOCATE 13, 11: PRINT "VEHICLE INFORMATION";
    LOCATE 15, 2: PRINT "Year:";
    LOCATE 15, 15: PRINT "Make:";
    LOCATE 16, 2: PRINT "Model:";
    LOCATE 16, 21: PRINT "Type:";
    LOCATE 18, 2: PRINT "Color:";
    LOCATE 17, 2: PRINT "Odometer:";
    LOCATE 14, 2: PRINT "VIN #:";
    LOCATE 19, 2: PRINT "License #:";
    LOCATE 21, 2: PRINT "Repair Technician:";
    LOCATE 22, 2: PRINT "Repair Order #";
    LOCATE 25, 1: PRINT LL$; STRING$(12, 205);
```

```
    COLOR 15, 9
    PRINT "< CONTINUE >";
    COLOR 10, 9
    PRINT STRING$(14, 205); LR$;
    FOR i% = 3 TO 24: LOCATE i%, 1: PRINT VL$; : LOCATE
i%, 40: PRINT VL$; : NEXT i%

'get information section qnum = 19: q = 0         'number of questions +1 for
continue
    data.file$ = ""
    'read question info FOR i% = 1 TO qnum
       READ QR(i%), QC(i%), Ql(i%)
    NEXT i%
    '
    DATA 6,7,15,   6,23,10,    7,10,25,  8,7,20,   9,8,2,
9,16,9
    DATA 10,8,13,  11,16,20,   14,8,17,  15,7,6,
15,20,15,  16,8,12,   16,26,13
    DATA 17,11,6,  18,8,10,   19,12,8,  21,21,18,  22,17,7
    DATA 25,15,9

DATA A,B,C,D,E,F,G,H,J,K,L,M,N,O,P,R,S,T,U,V,W,X,Y,Z
    'move cursor and get the questions answer up = 1: dn = 2: q = 1: QUIT$ = " CONTINUE ":
qa$(qnum) = QUIT$
690 WHILE qa$(qnum) = QUIT$
    IF q = 1 THEN GOSUB 11500
700    help% = 10
    IF q = qnum AND after.use% > 0 THEN msg$ = " ":
GOSUB 4160
    LOCATE QR(q), QC(q)
    COLOR 12, 9
    IF q <> qnum THEN PRINT CHR$(219); ELSE PRINT "
CONTINUE";    ' LEFT$(qa$(q) + STRING$(QL(q), 32), QL(q));
    LOCATE QR(q), QC(q), 1: ' PRINT " ";
    qprev = q
    GOSUB 820 'get arrow key or answer
    IF go.search = 1 THEN
       GOSUB 11600
       IF x = 0 THEN GOTO 690 ELSE GOTO 700
    END IF
    IF qkey = up THEN q = q - 1: IF q < 1 THEN q = 1
    IF qkey = dn THEN q = q + 1: IF q > qnum THEN q =
qnum
    IF q = qprev THEN prnt.q = 0: GOTO 780
    LOCATE QR(qprev), QC(qprev): COLOR 15, 9
    PRINT LEFT$(qa$(qprev) + STRING$(Ql(qprev), 32),
Ql(qprev) + 1);
       IF qprev = 1 THEN
          le% = LEN(qa$(qprev)): IF le% > 15 THEN le% =
15
          LOCATE QR(qprev), QC(qprev) + le%: PRINT ",";
       END IF
       IF old.file = 1 THEN GOTO 780
```

```
        IF qprev = 9 AND qkey = dn THEN
            IF qa$(9) = "SCALE" THEN data.file$ = "SCALE":
GOTO 780
            CALL vins(qa$(), bad)
            IF bad = 1 THEN
                GOTO 19000
            ELSE GOSUB 975
            END IF
        END IF 770    IF qa$(qnum) = "END" THEN qa$(qnum) = QUIT$: q = q
- 1    ' try and get back into info loop from error

780 WEND
    GOTO 1080

820 IF prnt.q = 1 THEN qkey = dn: RETURN' Get arrow key
or answer
830 k$ = INKEY$: IF k$ = "" THEN 830
    IF LEN(k$) = 2 THEN 920        'function key was
pressed 'non-function key processing
    IF q = qnum AND k$ = CHR$(13) THEN qa$(qnum) = "END":
GOTO 960
    IF k$ = CHR$(13) THEN qkey = dn: GOTO 960
    LOCATE QR(q), QC(q): PRINT STRING$(Ql(q), 32);
'erase old info
    LOCATE QR(q), QC(q): PRINT UCASE$(k$); : LINE INPUT ;
KA$: qkey = dn
    qa$(q) = UCASE$(k$) + UCASE$(KA$): IF q = 10 AND
LEN(qa$(10)) > 2 THEN qa$(10) = RIGHT$(qa$(10),
LEN(qa$(10)) - 2)
    IF old.file = 1 THEN
        look.for$ = qa$(q)
        go.search = 1
    END IF
    IF qkey = up THEN q = q + 2
    GOTO 960
920 'function key processing
    k$ = RIGHT$(k$, 1): qkey = 0
    IF k$ = "H" THEN qkey = up
    IF k$ = "P" THEN qkey = dn
960 RETURN
975 ' print qa$(9)--qa$(13)
        FOR q = 10 TO 13
        LOCATE QR(q), QC(q): COLOR 15, 9
        PRINT LEFT$(qa$(q) + STRING$(Ql(q), 32), Ql(q));
        LOCATE QR(q), QC(q), 1: ' PRINT " ";
        qprev = q
        NEXT q
    RETURN 1080 prnt.q = 0
    'end of custinfo section
    IF qa$(9) = "SCALE" THEN data.file$ = "SCALE"
    IF data.file$ = "GENERIC" THEN
        f$ = "82bu1.klm"
        numplaces% = 22
        GOTO 1110
```

```
    ELSEIF data.file$ = "SCALE" THEN f1$ = "88": GOTO
1100
    END IF

CALL dfile(qa$(), data.file$, f1$)

IF LEFT$(f1$, 1) <> "0" AND VAL(f1$) < 82 THEN f1$ =
"82"

1100 f$ = "c:\info\specs\" + f1$ + "\" + data.file$    ' 
read file info here

OPEN f$ FOR INPUT AS #2
    IF EOF(2) = -1 THEN
       msg$ = "No File Data"
       GOSUB 4160
       RESTORE: CLOSE #2
       GOTO 40
    END IF INPUT #2, numplaces%
    FOR i% = 1 TO numplaces%
      INPUT #2, filex%(i%)
    NEXT i%

FOR i% = 1 TO numplaces%
      INPUT #2, filey%(i%)
    NEXT i%

FOR i% = 1 TO numplaces%
      INPUT #2, filez%(i%)
    NEXT i%

INPUT #2, f$
    CLOSE #2
1110 f$ = "c:\info\pd\" + f$
    OPEN f$ FOR INPUT AS #2
    IF EOF(2) = -1 THEN
       msg$ = "No Picture Data"
       GOSUB 4160
       RESTORE: CLOSE #2
       GOTO 40
    END IF FOR i% = 1 TO numplaces%
      INPUT #2, px%(i%)
    NEXT i%

FOR i% = 1 TO numplaces%
      INPUT #2, py%(i%)
      tap%(i%) = 0
    NEXT i%

FOR i% = 1 TO numplaces%
      INPUT #2, cx%(i%)
    NEXT i%

INPUT #2, rdx%, strut1%, lff%
    INPUT #2, rpx%, strut2%, rff%
```

```
    FOR i% = 1 TO (numplaces% - 4) / 2
      READ letter$(i%)
    NEXT i%

INPUT #2, f$

CLOSE #2

FOR i% = 1 TO numplaces%
    cy%(i%) = cx%(i%)
    cz%(i%) = cx%(i%)
    NEXT i% rdy% = 39: rpy% = 36
    rdz% = 33: rpz% = 30

KEY OFF: SCREEN 9: WIDTH 80, 43: COLOR 4, 11
     WIDTH "lpt1:", 255

CLS fore% = 4: back% = 11'       sets foreground to red
,background to lt blue help% = 20
    'display frame picture at this point f$ = "c:\info\pict\" + f$
    SHELL "ega5 " + f$ ' get file info
     COLOR 1, back%: LINE (80, 283)-(630, 283), 1'
     LINE (80, 283)-(630, 283), 1: LINE (80, 307)-(630,
307), 1
     ctitle$ = qa$(10) + SPACE$(1) + qa$(11) + SPACE$(1)
+ qa$(12) + SPACE$(1) + qa$(13)
     c = 40 - LEN(ctitle$) / 2: LOCATE 1, c: PRINT
ctitle$; : COLOR fore%, back%
      a$ = " Pass ": LOCATE 30, 17: PRINT a$; : LOCATE 36,
17: PRINT a$;
      a$ = " Driver ": LOCATE 22, 17: PRINT a$; : LOCATE
33, 17: PRINT a$; : LOCATE 39, 17: PRINT a$;
      LOCATE 31, 1: PRINT " HEIGHT "; : LOCATE 37, 1:
PRINT " LENGTH ";
      LOCATE 26, 1: COLOR 1, back%: PRINT " Specs.":
LOCATE 27, 1: COLOR fore%, back%: PRINT " Actual"
     '
     rod.length%(1) = 130: rod.length%(2) = 130:
rod.length%(3) = 130: rod.length%(4) = 130
     rod.length%(5) = 230: rod.length%(6) = 230:
rod.length%(7) = 230: rod.length%(8) = 230
     rod.length%(9) = 80: rod.length%(10) = 80:
rod.length%(11) = 330: rod.length%(12) = 330

'sensors
1510 '   draw datum line
     LINE (80, 323)-(630, 323), 1: LINE (80, 265)-(630,
265), 1
```

```
    FOR i% = numplaces% / 2 + 1 TO numplaces%'  put in
all dimension lines.
        IF i% > numplaces% - 2 THEN
            LINE (px%(i%), py%(i%))-(px%(i%), 265)
        ELSE
            LINE (px%(i%), py%(i%))-(px%(i%), 323)
        END IF
        NEXT i%

FOR i% = 1 TO (numplaces% - 4) / 2'    write letters
at bottom of screen
            LOCATE 42, cy%(i%): PRINT letter$(i%);
            NEXT i%

'  make arrowheads
        LINE (10, 10)-(5, 15), 1: LINE -(10, 20), 1: LINE
-(10, 10), 1: PAINT (8, 15), 1, 1
        GET (5, 10)-(10, 20), l.arrow%: PUT (5, 10),
l.arrow%
        LINE (5, 10)-(10, 15), 1: LINE -(5, 20), 1: LINE
-(5, 10), 1: PAINT (8, 15), 1, 1
        GET (5, 10)-(10, 20), r.arrow%: PUT (5, 10),
r.arrow% ctr% = 0
        '  main menu
1580 msg$ = "Place Targets ( P ), Measure ( M ), Continue
( C ), Redo Centerline ( R )": GOSUB 4150
        LOCATE 41, 2: PRINT TIMER - start;
1585 contin = 0
1590 k$ = INKEY$: IF k$ = "" THEN 1590
        IF k$ = "C" OR k$ = "c" THEN 3300
        IF k$ = "M" OR k$ = "m" THEN
            start = TIMER
            GOTO 1930
        END IF
        IF k$ = "P" OR k$ = "p" THEN stp% = 0: GOSUB 1640:
GOSUB 1620: GOTO 1580
        IF k$ = "R" OR k$ = "r" THEN GOSUB 1600: GOTO 1580
        BEEP: GOTO 1580

1600 msg$ = "Average Centerline ( A ), Use Third
Reference ( T ), Natural ( N )": GOSUB 4150
1610 k$ = INKEY$: IF k$ = "" THEN GOTO 1610
        IF k$ = "A" OR k$ = "a" THEN c.line% = 0
        IF k$ = "T" OR k$ = "t" THEN c.line% = 1
        IF k$ = "N" OR k$ = "n" THEN c.line% = 2
        RETURN 1620 msg$ = "Type In The Height Setting Of The Strut
Gauge": GOSUB 4150
        INPUT ; a$
        IF a$ = "" THEN RETURN
        IF ASC(a$) < 48 OR ASC(a$) > 57 THEN BEEP: GOTO 1620
        strut.rod% = VAL(a$) - 160
        IF strut.rod% < 0 THEN strut.rod% = 0
        RETURN 1640 SOUND 0, 0'
        IF sp% = 0 THEN
```

```
            GOSUB 4380
            GOSUB 6190                          'print select
target message
        ELSEIF sp% = 1 THEN GOSUB 6260          'input
target #
        END IF
        IF stp% = 1 THEN
            LOCATE 23, 7
            PRINT SPACE$(LEN(a$) + 1)
'remove # from screen
            RETURN
        END IF 'Get the key from the
keyboard
1720 k$ = INKEY$: IF k$ = "" THEN 1720
        IF LEN(k$) = 2 THEN
            GOTO 1790                   'it was a function key 'process non-function keys
        ELSEIF k$ = " " OR k$ = CHR$(13) THEN    'check for
sensor/place matches IF ABS(x% - 54) <= sxsize% AND ABS(Y% - 174) <=
sysize% THEN
            SOUND 800, 2
            SOUND 500, 2                ' get rid of typing
error
            PUT (x%, Y%), xdcr%
            FOR stall = 1 TO 500
            NEXT stall
            GOTO 4360
        ELSE
            FOR i% = 1 TO numplaces%
            IF ABS((x% + sxsize% / 2) - px%(i%)) > 10 THEN
4350
            IF ABS((Y% + sysize% / 2) - py%(i%)) > 10 THEN
4350
                                                '+++++++
match found
            mp% = i%
            i% = numplaces% + 2
            SOUND 800, 2
            SOUND 500, 2
            FOR stall = 1 TO 500
            NEXT stall
            PUT (x%, Y%), xdcr%, XOR
'erase xdcr
            PUT (px%(mp%) - sxsize% / 2, py%(mp%) - sysize%
/ 2), xdcr%, PSET'make place for sensor
            PUT (px%(mp%) - sxsize% / 2, py%(mp%) - sysize%
/ 2), xdcr%, OR'place sensor
            IF tap%(mp%) <> 0 THEN GOSUB 6340        ' reuse
target
            tap%(mp%) = ms%                          ' save
target at position (mp%)
            pat%(ms%) = mp%                          '
pos. at target # (ms%)
            GOSUB 6440                               ' see
if target # has been used
```

```
            GOSUB 5240                 ' determine target loc.
 of 3 reference points
   4350      NEXT i%
             IF i% <= numplaces% + 1 THEN BEEP: GOTO 1720
         END IF
      ELSE BEEP: GOTO 1720
      END IF
 4360 IF sp% = 1 THEN RETURN ELSE GOTO 1640

1790 ' process function keys
      k$ = RIGHT$(k$, 1)
      '
      PUT (x%, Y%), xdcr%, XOR                         'process
 function key
      IF k$ = "H" THEN Y% = Y% - inc%: IF Y% < 0 THEN Y% =
 0         'Up
      IF k$ = "P" THEN Y% = Y% + inc%: IF Y% > YMAX% -
 sysize% THEN Y% = YMAX% - sysize%'Down
      IF k$ = "K" THEN x% = x% - inc%: IF x% < 0 THEN x% =
 0          'Left
      IF k$ = "M" THEN x% = x% + inc%: IF x% > XMAX% -
 sxsize% THEN x% = XMAX% - sxsize%'Right
      PUT (x%, Y%), xdcr%, XOR                         'place
 object at new location

GOTO 1720

1930 first.time% = 0         'make measurements here
 1941      '
      msg$ = " ": GOSUB 4150
      '              erase width measurements from screen
      FOR n% = 1 TO numplaces% / 2
      IF (tap%(n%)) = 0 THEN 1945
      LOCATE rdx%, cx%(n%): PRINT SPACE$(4);
      LOCATE rdy%, cy%(n%): PRINT SPACE$(4);
      LOCATE rdz%, cz%(n%): PRINT SPACE$(4);
      LOCATE rdx% - 1, cx%(n%): PRINT SPACE$(4);
      LOCATE rdy% - 1, cy%(n%): PRINT SPACE$(4);
      LOCATE rdz% - 1, cz%(n%): PRINT SPACE$(4);

1945 NEXT n%

FOR n% = numplaces% / 2 + 1 TO numplaces%
      IF (tap%(n%)) = 0 THEN 1946
      LOCATE rpx%, cx%(n%): PRINT SPACE$(4);
      LOCATE rpy%, cy%(n%): PRINT SPACE$(4);
      LOCATE rpz%, cz%(n%): PRINT SPACE$(4);
      LOCATE rpx% - 1, cx%(n%): PRINT SPACE$(4);
      LOCATE rpy% - 1, cy%(n%): PRINT SPACE$(4);
      LOCATE rpz% - 1, cz%(n%): PRINT SPACE$(4);

1946 NEXT n%
 1959 LINE (180, 283)-(630, 283), 1: LINE (190, 307)-(630,
 307), 1'
      ' erase arrow heads
      IF pszp% <> 0 THEN PUT (px%(pszp%) + 1, 283 - 5),
 l.arrow%: PUT (px%(pszp%) - 6, 283 - 5), r.arrow%: ' pass
 side
      IF dszp% <> 0 THEN PUT (px%(dszp%) - 6, 307 - 5),
 r.arrow%: PUT (px%(dszp%) + 1, 307 - 5), l.arrow%: '
 drivers side
```

```
      IF only.one% = 1 THEN RETURN
2100 IF dszero% = 0 OR pszero% = 0 OR zzero% = 0 THEN
msg$ = " 1 of the 3 Reference Points is Missing. Type
P.": GOSUB 4150: GOTO 1585
      target.over% = 0
2105 mistake% = 0
      side$ = "1"
      GOSUB 2600
      IF mistake% = 1 THEN GOTO 2105
      msg$ = "Measuring": GOSUB 4150
      FOR tn% = 1 TO numsensors%
      ANGLE.1#(tn%) = 0
      IF T.ANGLE(tn%) = 0 GOTO 2170
      ADJUST.1 = 2.42: ADJUST.2 = 2.385
      ANGLE.1#(tn%) = (ADJUST.1 + T.ANGLE(tn%)) * 3.141593
/ 180
      Z.1(tn%) = T.HEIGHT(tn%)
2170 NEXT tn%
      side$ = "2"
      GOSUB 2600
      IF mistake% = 1 THEN GOTO 2105
      FOR n% = 1 TO numplaces%
      IF tap%(n%) = 0 THEN mx%(tap%(n%)) = 0:
my%(tap%(n%)) = 0: mz%(tap%(n%)) = 0
      NEXT n%
      FOR tn% = 1 TO numsensors%
      x(tn%) = 0: Y(tn%) = 0: z(tn%) = 0: X3(tn%) = 0:
Y3(tn%) = 0: Z3(tn%) = 0:
      ANGLE.2#(tn%) = 0
      IF ANGLE.1#(tn%) = 0 GOTO 2260
      IF T.ANGLE(tn%) = 0 THEN msg$ = "TARGET #" +
STR$(tn%) + "SIDE 2": GOSUB 4150: GOTO 2100
      GOTO 2280
2260 IF T.ANGLE(tn%) = 0 GOTO 2330
      msg$ = "TARGET #" + STR$(tn%) + "SIDE 1": GOSUB
4150: GOTO 2100
2280 Z.2(tn%) = T.HEIGHT(tn%)
      ANGLE.2#(tn%) = (ADJUST.2 + T.ANGLE(tn%)) * 3.141593
/ 180
      x(tn%) = 750.5 * TAN(ANGLE.2#(tn%)) /
(TAN(ANGLE.2#(tn%)) - TAN(ANGLE.1#(tn%)))
      Y(tn%) = x(tn%) * TAN(ANGLE.1#(tn%))
      z(tn%) = (Z.1(tn%) + Z.2(tn%)) / 2 +
rod.length%(tn%)
2330 NEXT tn%
      M1 = ((x(pszero%) + x(dszero%)) - (filex%(pszp%) -
filex%(dszp%))) / 2
      n = (Y(pszero%) + Y(dszero%)) / 2: r1 = z(dszero%) -
filez%(dszp%)
'                                    rotate x-y
      OSET = ATN((Y(pszero%) - Y(dszero%)) / (x(pszero%) -
x(dszero%)))
      FOR tn% = 1 TO numsensors%
      IF Y(tn%) = 0 THEN GOTO 2420
      X1(tn%) = (x(tn%) - M1) * COS(OSET) + (Y(tn%) - n) *
SIN(OSET)
      Y1(tn%) = (Y(tn%) - n) * COS(OSET) - (x(tn%) - M1) *
SIN(OSET)
```

```
        z1(tn%) = z(tn%) - r1
2420 NEXT tn%
    '                              rotate x-z
        ZXOSET = ATN((z1(pszero%) - z1(dszero%)) /
(X1(pszero%) - X1(dszero%)))
        FOR tn% = 1 TO numsensors%
        IF Y(tn%) = 0 THEN GOTO 2490 ELSE Y2(tn%) = Y1(tn%)
        X2(tn%) = X1(tn%) * COS(ZXOSET) + z1(tn%) *
SIN(ZXOSET)
        Z2(tn%) = z1(tn%) * COS(ZXOSET) - (X1(tn%) -
X1(dszero%)) * SIN(ZXOSET)
2490 NEXT tn%
    '                              rotate y-z
        ZYOSET = ATN((Z2(zzero%) + (filez%(dszp%) -
filez%(pat%(zzero%))) - Z2(dszero%)) / (Y2(zzero%) -
Y2(dszero%)))
        FOR tn% = 1 TO numsensors%
        IF Y(tn%) = 0 THEN GOTO 2570 ELSE X3(tn%) = X2(tn%)
        Y3(tn%) = Y2(tn%) * COS(ZYOSET) + Z2(tn%) *
SIN(ZYOSET)
        Z3(tn%) = Z2(tn%) * COS(ZYOSET) - Y2(tn%) *
SIN(ZYOSET)
        mx%(tn%) = CINT(X3(tn%)): my%(tn%) = CINT(Y3(tn%)):
mz%(tn%) = CINT(Z3(tn%))
2570 NEXT tn%
        GOTO 3230
2600 tn% = 1 'Measure a scan IF side$ = "1" THEN a$ = INPUT$(LOC(1), #1)'clear the
buffer IF side$ = "1" THEN
    a$ = INPUT$(LOC(1), #1)'clear the buffer
    PRINT #1, "0";
    FOR i = 1 TO 2500: NEXT i
    code2 = (CODE.BEG& - BAR.BEG&) / (BAR.END& -
CODE.END&) * 100
    CODE.PCT = ((CODE.END& - CODE.BEG&) / T.WIDTH&) *
100: GOSUB 3130
    IF T.ANGLE(CN%) <> 0 THEN msg$ = "TWO TARGETS # " +
STR$(CN%): GOSUB 4150: mistake% = 1: GOTO 3070
    T.HEIGHT = 125 * .5 - (125 * (T.ANGLE& -
BAR.CENTER&) / T.WIDTH&) / .353333
    T.ANGLE(CN%) = T.ANGLE& / M& * 360: T.HEIGHT(CN%) =
T.HEIGHT
    tn% = tn% + 1
3060 NEXT n%
3070 RETURN 3130 ' lookup target #
    IF CODE.PCT < 8.375 THEN GOTO 3221
    IF CODE.PCT < 13.13 THEN GOTO 3222
    IF CODE.PCT < 16.91 THEN CN% = 3: GOTO 3220
    IF CODE.PCT < 21.23 THEN CN% = 4: GOTO 3220
    IF CODE.PCT < 25.7 THEN CN% = 5: GOTO 3220
    IF CODE.PCT < 29.94 THEN CN% = 6: GOTO 3220
    IF CODE.PCT < 34.03 THEN CN% = 7: GOTO 3220
    CN% = 8
```

```
3220 RETURN

3221 IF code2 > 381 THEN CN% = 1: RETURN
     IF code2 > 220 THEN CN% = 9: RETURN
     IF code2 > 142 THEN CN% = 10: RETURN
     IF code2 > 97 THEN CN% = 11: RETURN
     IF code2 > 65 THEN CN% = 12: RETURN
     IF code2 > 42 THEN CN% = 13: RETURN
     IF code2 > 26 THEN CN% = 14: RETURN
     CN% = 15: RETURN 3222 IF code2 > 333 THEN CN% = 2: RETURN
     CN% = 16: RETURN 3230 'END OF GLEN'S PROGRAM ==================
     'display measurements
     GOSUB 4500
     IF second% = 1 THEN second% = 0: GOTO 1930
     '
     GOTO 1580
     '
3300 'print menu
3310 msg$ = "Print estimate ( P ), Quit ( Q ), Return ( R ), Save ( S ), Next Screen ( N )": GOSUB 4150
3320 k$ = INKEY$: IF k$ = "" THEN 3320
     IF k$ = "Q" OR k$ = "q" THEN
         msg$ = "Do You Want To Save These Measurements ? ( Y ) or ( N )": GOSUB 4150
         DO
         k$ = INKEY$: k$ = UCASE$(k$)
         IF k$ <> "" AND k$ <> "N" AND k$ <> "Y" THEN BEEP
         LOOP WHILE k$ <> "N" AND k$ <> "Y"
         IF k$ = "Y" THEN msg$ = "Saving": GOSUB 4150: GOSUB 11700: END
         END
     END IF
     IF k$ = "P" OR k$ = "p" THEN 3370
     IF k$ = "R" OR k$ = "r" THEN 1580
     IF k$ = "S" OR k$ = "s" THEN msg$ = "Saving": GOSUB 4150: GOSUB 11700: GOTO 3310
     IF k$ = "N" OR k$ = "n" THEN GOSUB 7500: GOTO 1580
     BEEP: GOTO 3310
     '
3370 '
     IF dszero% <> 0 THEN GOTO 3390

3375 msg$ = "Print Out Original Or Last Measurements. ( O ) or ( L ) ": GOSUB 4150
     DO
     k$ = INKEY$
     LOOP WHILE k$ = ""
     IF k$ = "O" OR k$ = "o" THEN p.file$ = cv.first: GOTO 3380
     IF k$ = "L" OR k$ = "l" THEN p.file$ = cv.last: GOTO 3380
     BEEP: GOTO 3375
3380 msg$ = "": GOSUB 4150
     GOSUB 11800
```

```
3390 '
    msg$ = "": GOSUB 4150'clear status line
    'Program name="EST" -- Estimate printer
    '
    ESC$ = CHR$(27): BOLD$ = ESC$ + "G": NOBOLD$ = ESC$ + "H"
    BIG$ = ESC$ + "W1": NORMAL$ = ESC$ + "W0" + CHR$(18) + ESC$ + "p"
    VL$ = CHR$(186): VX$ = CHR$(197): UT$ = CHR$(193): dt$ = CHR$(194): UL$ = CHR$(201): UR$ = CHR$(187): LL$ = CHR$(200): LR$ = CHR$(188)
    HLT$ = CHR$(185): HRT$ = CHR$(204)
    BN$ = "ULTRALINE Auto Body"
    AD1$ = "Box 133"
    AD2$ = "Benson, MN 56215"
    PH$ = "(612)843-2665"
    'printing starts here
    le = 26'left edge
    LPRINT ESC$; "E"
    LPRINT TAB(le); UL$; STRING$(27, 205); UR$
    LPRINT TAB(le); VL$; "     "; BOLD$; BN$; NOBOLD$; TAB(56); VL$
    LPRINT TAB(le); VL$; "              "; AD1$; TAB(54); VL$
    LPRINT TAB(le); VL$; "       "; AD2$; TAB(54); VL$
    LPRINT TAB(le); VL$; "        "; PH$; TAB(54); VL$
    LPRINT TAB(le); LL$; STRING$(27, 205); LR$
    '
    LPRINT STRING$(8, 32); UL$; STRING$(60, 205); UR$
    LPRINT STRING$(8, 205); HLT$; BIG$; BOLD$; "      Frame Repair Estimate    "; NOBOLD$; NORMAL$; HRT$; STRING$(8, 205)
    LPRINT STRING$(8, 32); LL$; STRING$(60, 205); LR$
    LPRINT
    IF dszero% <> 0 THEN
        LPRINT TAB(le - 10); BOLD$; "Date: "; NOBOLD$; DATE$; BOLD$; "     Time: "; NOBOLD$;
        hour = VAL(TIME$)
        IF hour <= 12 THEN
            LPRINT STR$(hour); MID$(TIME$, 3, 3);
            IF hour < 12 THEN LPRINT " AM" ELSE LPRINT " PM"
        ELSE LPRINT STR$(hour - 12); MID$(TIME$, 3, 3); " PM"
        END IF
    ELSE
        LPRINT TAB(le - 10); BOLD$; "Date: "; NOBOLD$; M$; BOLD$; "     Time: "; NOBOLD$;
        hour = VAL(hr$)
        IF hour <= 12 THEN
            LPRINT STR$(hour); RIGHT$(M1$, 3);
            IF hour < 12 THEN LPRINT " AM" ELSE LPRINT " PM"
        ELSE LPRINT STR$(hour - 12); RIGHT$(M1$, 3); " PM"
        END IF
    END IF
    LPRINT
    LPRINT TAB(10); BOLD$; "--- Customer Information
```

```
     ---"; TAB(45); "--- Vehicle Information ---"; NOBOLD$
     LPRINT ESC$; "F"'emphasized off
     qa$(10) = LTRIM$(qa$(10))
     LPRINT TAB(11); BOLD$; "Name: "; NOBOLD$; qa$(2) +
SPACE$(1) + qa$(1); TAB(46); BOLD$; "Vehicle: "; NOBOLD$;
"19"; qa$(10); " "; qa$(11); " "; qa$(12)
     LPRINT TAB(8); BOLD$; "Address: "; NOBOLD$; qa$(3);
TAB(48); BOLD$; "Color: "; NOBOLD$; qa$(15)
     LPRINT TAB(17); qa$(4); ", "; qa$(5); " "; qa$(6);
TAB(43); BOLD$; "Odometer: "; NOBOLD$; qa$(14)
     LPRINT TAB(10); BOLD$; "Phone: "; NOBOLD$; qa$(7);
TAB(48); BOLD$; "VIN #: "; NOBOLD$; qa$(9)

LPRINT TAB(7); BOLD$; "Ins. Co.: "; NOBOLD$; qa$(8);
TAB(44); BOLD$; "License #: "; NOBOLD$; qa$(16)
     LPRINT
     LPRINT TAB(5); BOLD$; "Repair Order #: "; NOBOLD$;
qa$(18); TAB(44); BOLD$; "Repair Technician: "; NOBOLD$;
qa$(17)
     LPRINT
     LPRINT STRING$(80, 205)
     LPRINT
     '
     'print screen here
     GOSUB print.screen
     '
     LPRINT STRING$(80, 205)
     LPRINT CHR$(12);              'form feed '
     GOTO 3300 ' go back to Print,Quit,Return
     '
     'Subroutines....
     '
4150 'bottom line message printer
     cmsg% = 40 - LEN(msg$) / 2
     LOCATE 43, 1: COLOR 1, back%: PRINT SPACE$(80); :
LOCATE 43, cmsg%: PRINT " " + msg$ + " "; : COLOR fore%,
back%
     RETURN
4160 'bottom line message printer
     cmsg% = 20 - LEN(msg$) / 2: after.use% = after.use%
+ 1
     LOCATE 25, 1: COLOR 15, back%: PRINT SPACE$(80); :
LOCATE 25, cmsg%: PRINT " " + msg$ + " "; : COLOR fore%,
back%
     RETURN '
     '
4380 'print select sensor message
     msg$ = " Type Target Number to Place. Then ENTER. (
 0 ) to Stop ": GOSUB 4150
     RETURN
     '
     'print select sensor message
4430 msg$ = "Use Arrow Keys to Locate Target #.  Hit
<SPACEBAR> to Mark position.": GOSUB 4150
     RETURN
     '
```

```
       sfc%(FST%) = c%
       IF M% = 0 THEN GOSUB 4490: GOTO 4465
       LOCATE r%, c%: PRINT LTRIM$(STR$(M%));
4465   cff2%(FST%) = M1%
       IF M1% = 0 THEN GOTO 4495
       COLOR 1, back%
       LOCATE r% - 1, c%: PRINT LTRIM$(STR$(M1%));
       COLOR fore%, back%
       RETURN
       '
4490   LOCATE r%, c%: PRINT "    ";  'erase length
measurements from screen
4495   LOCATE r% - 1, c%: PRINT "    ";
       RETURN 4500   'adjust centerline IF mx%(zzero%) <= 0 THEN
           IF mx%(tap%(pat%(zzero%) + numplaces% / 2)) <> 0
AND c.line% = 0 THEN
               adj.cen% = (mx%(zzero%) +
mx%(tap%(pat%(zzero%) + numplaces% / 2))) / 2
           ELSE adj.cen% = mx%(zzero%) +
filex%(pat%(zzero%))
           END IF ELSE
           IF mx%(tap%(pat%(zzero%) - numplaces% / 2)) <> 0
AND c.line% = 0 THEN
               adj.cen% = (mx%(zzero%) +
mx%(tap%(pat%(zzero%) - numplaces% / 2))) / 2
           ELSE adj.cen% = mx%(zzero%) -
filex%(pat%(zzero%))
           END IF
       END IF
  /    oset1 = ATN(adj.cen% / my%(zzero%))
       IF ABS(adj.cen%) > 25 OR c.line% = 2 THEN GOTO 4510
       FOR tn% = 1 TO numsensors%
       IF mx%(tn%) = 0 THEN GOTO 4505
       my%(tn%) = my%(tn%) * COS(oset1) + mx%(tn%) *
SIN(oset1)
       mx%(tn%) = mx%(tn%) * COS(oset1) - my%(tn%) *
SIN(oset1)
4505   NEXT tn%
       'IF contin = 1 THEN GOTO measr'
       '
4510   GOSUB 5660 '    try to find location of targets
       IF first.time% = 1 THEN GOTO 1930'
         ' erase dimension lines not used
       FOR n% = numplaces% / 2 + 1 TO numplaces%
       IF tap%(n%) <> 0 OR tap%(n% - numplaces% / 2) <> 0
THEN GOTO 4570
       LINE (px%(n%), py%(n%))-(px%(n%), 323), 0
4570   NEXT n%
       '
       FOR n% = numplaces% / 2 + 1 TO numplaces%
       IF tap%(n%) = 0 AND tap%(n% - numplaces% / 2) = 0
THEN GOTO 4588
       IF n% > numplaces% - 2 THEN
```

```
           LINE (px%(n%), py%(n%))-(px%(n%), 265)'redraw
lines
      ELSE
           LINE (px%(n%), py%(n%))-(px%(n%), 323)'redraw
lines
      END IF
4588 NEXT n%
      LWH% = 0    '                  print width measurements
to screen
      FOR n% = 1 TO numplaces%
      IF (tap%(n%)) = 0 THEN 4680
      M% = ABS(mx%(tap%(n%)))
      IF n% < numplaces% / 2 + 1 THEN r% = rdx%: GOTO 4650
      r% = rpx%
4650 c% = cx%(n%)
      M1% = filex%(n%): GOSUB 4460
4680 NEXT n%
      IF once% = 0 THEN once% = 1: second% = 1: RETURN
      GOSUB 6670    '           print length measurements
to screen
      '            compute length measurements and columns
of used positions
      LWH% = 40
      FOR n% = 1 TO numplaces%
      IF n% < numplaces% / 2 + 1 THEN GOTO 4840
'goto drivers side
      IF n% = pszp% THEN PUT (px%(n%) + 1, 283 - 5),
l.arrow%, PSET: PUT (px%(n%) - 6, 283 - 5), r.arrow%,
PSET: GOTO 4890 ' pass side
      IF (tap%(n%)) = 0 THEN GOTO 4890
      IF n% > numplaces% - 2 THEN GOTO 4890
      M% = ABS(my%(tap%(n%)))
      M1% = FY%(n%)
      r% = rpy%
      c% = cy%(n%)
      GOSUB 4460
      GOTO 4890
4840 IF n% = dszp% THEN PUT (px%(n%) - 6, 307 - 5),
r.arrow%, PSET: PUT (px%(n%) + 1, 307 - 5), l.arrow%,
PSET: GOTO 4890 ' drivers side
      IF (tap%(n%)) = 0 THEN GOTO 4890
      IF n% > numplaces% / 2 - 2 THEN GOTO 4890
      M% = ABS(my%(tap%(n%)))
      M1% = FY%(n%)
      r% = rdy%
      c% = cy%(n%)
      GOSUB 4460
4890 NEXT n%
5110 '
      ' print height measurements to screen
      LWH% = 80
      FOR n% = 1 TO numplaces%
      IF (tap%(n%)) = 0 THEN GOTO 5210
      M% = mz%(tap%(n%))
      IF n% = strut1% OR n% = strut2% THEN M% = M% +
strut.rod%
      IF n% < numplaces% / 2 + 1 THEN r% = rdz%: GOTO 5180
      r% = rpz%
5180 c% = cz%(n%)
```

```
        M1% = filez%(n%): GOSUB 4460
5210 NEXT n%
     RETURN

5240 '
     ctr% = ctr% + 1: IF ctr% <> 3 GOTO 5340         '
determine target locations of 3 reference points
     FOR n% = 1 TO numplaces%
     IF tap%(n%) <> 0 AND tap%(n% + numplaces% / 2) <> 0
THEN dszero% = tap%(n%): dszp% = n%: pszero% = tap%(n% +
numplaces% / 2): pszp% = n% + numplaces% / 2: GOTO 5310
     IF tap%(n%) <> 0 AND tap%(n%) = pszero% THEN GOTO
5310
     IF tap%(n%) <> 0 AND tap%(n%) = dszero% THEN GOTO
5310
     IF tap%(n%) <> 0 THEN zzero% = tap%(n%)
5310 NEXT n%
     '
     stp% = 1
5340 RETURN
     '
5660 '
     '                       self locate targets
     rng = 75'
     FOR T% = 1 TO numsensors%
     IF T% = dszero% OR T% = pszero% OR T% = zzero% THEN
GOTO 5900
     IF mx%(T%) = 0 THEN GOTO 5900
     FOR CN% = 1 TO numplaces%
     IF tap%(CN%) = T% THEN GOTO 5900         ' already
found position
     NEXT CN%
     IF mx%(T%) < 0 THEN GOTO 5930            ' drivers side
     '
     FY% = 0                     ' pass side ,in front of
zero line
     FOR PN% = pszp% TO numplaces% / 2 + 2 STEP -1
     FY% = FY% + filey%(PN%)
     IF FY% > my%(T%) - rng AND FY% < my%(T%) + rng AND
ABS(mx%(T%)) > filex%(PN% - 1) - rng AND ABS(mx%(T%)) <
filex%(PN% - 1) + rng THEN tap%(PN% - 1) = T%: snsr% =
PN% - 1: GOSUB 6080: GOTO 5900
     NEXT PN%
     FY% = 0    ' pass side in back of zero line
     FOR PN% = pszp% + 1 TO numplaces%
     FY% = FY% - filey%(PN%)
     IF FY% > my%(T%) - rng AND FY% < my%(T%) + rng AND
ABS(mx%(T%)) > filex%(PN%) - rng AND ABS(mx%(T%)) <
filex%(PN%) + rng THEN tap%(PN%) = T%: snsr% = PN%:
GOSUB 6080: GOTO 5900
     NEXT PN%
     msg$ = "Use Arrow Keys to Place Target #" + STR$(T%)
+ ". Hit <SPACEBAR> to Mark Position.": GOSUB 4150'
couldn't find position
     ms% = T%: LOCATE 23, 7: PRINT ms%; : IF ms% > 9 THEN
l = 2 ELSE l = 1
     stp% = 0: sp% = 1: nn% = 1: GOSUB 1640: sp% = 0:
stp% = 0: nn% = 0' have operator place target
5900 NEXT T%
     RETURN
```

```
5930 FY% = 0     '     drivers side in front of zero line
     FOR PN% = dszp% TO 2 STEP -1
     FY% = FY% + filey%(PN%)
     IF FY% > my%(T%) - rng AND FY% < my%(T%) + rng AND
ABS(mx%(T%)) > filex%(PN% - 1) - rng AND ABS(mx%(T%)) <
filex%(PN% - 1) + rng THEN tap%(PN% - 1) = T%: snsr% =
PN% - 1: GOSUB 6080: GOTO 5900
     NEXT PN%
     FY% = 0     ' drivers side in back of zero line
     FOR PN% = dszp% + 1 TO numplaces% / 2
     FY% = FY% - filey%(PN%)
     IF FY% > my%(T%) - rng AND FY% < my%(T%) + rng AND
ABS(mx%(T%)) > filex%(PN%) - rng AND ABS(mx%(T%)) <
filex%(PN%) + rng THEN tap%(PN%) = T%: snsr% = PN%: GOSUB
6080: GOTO 5900
     NEXT PN%
     msg$ = "Use Arrow Keys to Place Target #" + STR$(T%)
+ ". Hit <SPACEBAR> to Mark Position.": GOSUB 4150'
couldn't find position
     ms% = T%: LOCATE 23, 7: PRINT ms%; : IF ms% > 9 THEN
l = 2 ELSE l = 1
     stp% = 0: sp% = 1: nn% = 1: GOSUB 1640: sp% = 0:
stp% = 0: nn% = 0' have operator place target
     GOTO 5900
     '     self place target numbers on positions
6080 IF nn% = 0 THEN LOCATE 23, 7: PRINT T%: pat%(T%) =
snsr%
     a$ = STR$(T%): IF LEN(a$) - 1 = 2 THEN GOTO 6120
     DRAW "c4 bm54,174 r10 d10 L10 u10": PAINT (55, 175),
7, 4
     sxsize% = 10: sysize% = 10: GOTO 6140
6120 DRAW "c4 bm54,174 r18 d10 L18 u10": PAINT (55, 175),
7, 4
     sxsize% = 18: sysize% = 10
6140 x% = 54: Y% = 174: GET (x%, Y%)-(x% + sxsize%, Y% +
sysize%), xdcr%
6150 PUT (x%, Y%), xdcr%
     PUT (px%(snsr%) - sxsize% / 2, py%(snsr%) - sysize%
/ 2), xdcr%, PSET
     RETURN
     '
6190 '     input target number to place
     IF sp% = 1 THEN stp% = 1
6210 IF stp% = 1 THEN
        RETURN
     ELSE
        a$ = ""
        LOCATE 23, 7: PRINT "#";
6215    k$ = INKEY$: IF k$ = "" THEN GOTO 6215
        IF LEN(k$) = 2 THEN GOTO 6225
        IF k$ = CHR$(13) THEN GOTO 6225
        IF ASC(k$) < 48 OR ASC(k$) > 57 THEN GOTO 6215
        a$ = a$ + k$: LOCATE 23, 8: PRINT a$;
        k$ = ""
     END IF
     GOTO 6215

6225 l = LEN(a$): IF l > 2 THEN BEEP: LOCATE 23, 7: PRINT
```

```
SPACE$(1 + 1): GOTO 6210
    IF a$ = "0" THEN stp% = 1: LOCATE 23, 7: PRINT
SPACE$(1 + 1): RETURN
    ms% = VAL(a$): IF ms% = 0 THEN BEEP: LOCATE 23, 7:
PRINT SPACE$(1 + 1): GOTO 6210
    IF ms% > numsensors% THEN BEEP: LOCATE 23, 7: PRINT
SPACE$(1 + 1): GOTO 6210
6260 IF nn% = 0 THEN GOSUB 4430
    IF l = 2 THEN GOTO 6300
    DRAW "c4 bm54,174 r10 d10 L10 u10": PAINT (55, 175),
7, 4
    sxsize% = 10: sysize% = 10: GOTO 6320
6300 DRAW "c4 bm54,174 r18 d10 L18 u10": PAINT (55, 175),
7, 4
    sxsize% = 18: sysize% = 10
6320 x% = 54: Y% = 174: GET (x%, Y%)-(x% + sxsize%, Y% +
sysize%), xdcr%
    RETURN
6340 '
    ' Re-assign a target to a position
    FOR n% = 1 TO numsensors%
    IF n% = ms% THEN GOTO 6380
    IF tap%(mp%) = n% THEN GOSUB 6390
6380 NEXT n%
    RETURN
6390 IF ctr% < 3 THEN ctr% = ctr% - 1: GOTO 6430
    IF tap%(mp%) = dszero% THEN dszero% = ms%
    IF tap%(mp%) = pszero% THEN pszero% = ms%
    IF tap%(mp%) = zzero% THEN zzero% = ms%
    mx%(n%) = 0: my%(n%) = 0: mz%(n%) = 0
6430 RETURN
6440 '
    '
    FOR n% = 1 TO numplaces%
    IF n% = mp% THEN GOTO 6490
    IF tap%(n%) = ms% THEN GOSUB 6520
6490 NEXT n%
    RETURN
    '
6520 IF ctr% < 3 THEN ctr% = ctr% - 1: GOTO 6560
    IF tap%(n%) = dszero% THEN dszero% = tap%(mp%)
    IF tap%(n%) = pszero% THEN pszero% = tap%(mp%)
    IF tap%(n%) = zzero% THEN zzero% = tap%(mp%)
6560 nn% = 1: snsr% = n%: T% = ms%: GOSUB 6080: nn% = 0:
snsr% = 0 '  erase old target #
    SOUND 0, 0
    msg$ = " Keep Old Measurements or Discard Old
Measurements ? ( K or D )": GOSUB 4150
8010 k$ = INKEY$: IF k$ = "" THEN GOTO 8010
    IF k$ = "K" OR k$ = "k" THEN GOTO 6570
    IF k$ = "D" OR k$ = "d" THEN only.one% = 1: keep% =
n%: GOSUB 1941: only.one% = 0: tap%(keep%) = 0: GOTO 6580
    BEEP: GOTO 8010
    '
6570 ti% = ti% + 1: p% = tap%(n%): tap%(n%) =
numsensors% + ti%: Y(tap%(n%)) = 1: mx%(tap%(n%)) =
mx%(p%): my%(tap%(n%)) = my%(p%): mz%(tap%(n%)) = mz%(p%)
6580 RETURN
```

```
6670 '
     '                                add the length
measurements together
     FOR n% = 1 TO numplaces%
     IF n% > numplaces% / 2 GOTO 6840   ' pass side
     IF n% = dszp% THEN GOTO 7000
     IF n% < dszp% THEN GOTO 6790
     FY% = 0                            'drivers side rear
     FOR PN% = dszp% + 1 TO n%
     FY% = FY% + filey%(PN%)
     NEXT PN%
     GOTO 6990
     '                                  drivers side front
6790 FY% = 0
     FOR PN% = n% + 1 TO dszp%
     FY% = FY% + filey%(PN%)
     NEXT PN%
     GOTO 6990
6840 '
     FY% = 0                            ' pass side
     IF n% = pszp% THEN GOTO 7000
     IF n% < pszp% THEN GOTO 6930
     FY% = 0                            'pass side rear
     FOR PN% = pszp% + 1 TO n%
     FY% = FY% + filey%(PN%)
     NEXT PN%
     GOTO 6990
6930 '
     FY% = 0                            'pass side front
     FOR PN% = n% + 1 TO pszp%
     FY% = FY% + filey%(PN%)
     NEXT PN%
     '
6990 FY%(n%) = FY%
7000 NEXT n%
     RETURN 7500 ' program ' SC '
     fore% = 1: back% = 3
     SCREEN 9, 1, 1: WIDTH 80, 43: COLOR fore%, back%
     FOR i = 1 TO 1000: NEXT i
     SCREEN 9, 0, 0
RETURN
'
print.screen:

SHELL "prtscn 0"
RETURN
'
10999
        IF ERR = 52 OR ERR = 53 OR ERR = 54 OR ERR = 64
OR ERR = 75 OR ERR = 76 THEN
            CLOSE #2
            IF help% = 10 THEN RESUME 19000 ELSE ON ERROR
GOTO 0
        ELSEIF ERR = 57 THEN
            RESUME 2105
        ELSEIF ERR = 62 THEN
            RESUME NEXT
```

```
            ELSEIF ERR = 24 OR ERR = 57 OR ERR = 68 THEN
                try = numtries + 1
                RESUME 15
            ELSE
                PRINT "Some kind of ERROR has occurred!"; ERR;
    ERL; "-"
                ON ERROR GOTO 0
            END IF
            END 11500   '
        LOCATE 9, 45: PRINT "Retrieve An Old File,"
        LOCATE 10, 45: PRINT "Or Start A New File? "
        LOCATE 11, 45: PRINT " ( O ) or ( N ) "
11510 DO
        k$ = INKEY$
        LOOP WHILE k$ = ""
        k$ = UCASE$(k$)
        FOR i = 0 TO 3
        LOCATE 8 + i, 45: PRINT SPACE$(22)
        NEXT i
         IF k$ <> "O" AND k$ <> "N" THEN BEEP: GOTO 11500
        IF k$ = "N" THEN old.file = 0: GOTO 11550
       old.file = 1
11550 RETURN 11600      '
        f$(0) = "": x = 0
        SHELL "dir c:\perm\*.rec>c:\perm\sortdat"
        OPEN "c:\perm\sortdat" FOR INPUT AS #3
        DO
        LINE INPUT #3, a$
        b$ = LEFT$(a$, 1)
        IF b$ <> "." AND b$ <> "" AND b$ <> " " THEN
           a.file$ = LEFT$(a$, 8) + "." + MID$(a$, 10, 3)
           GOSUB 11650
           IF look.for$ = RTRIM$(qa$(q)) THEN
              x = x + 1
              f$(x) = a.file$
              LOCATE x, 45: PRINT x; " "; qa$(1); ", ";
    qa$(2); " "; qa$(10); " "; qa$(12);
           END IF
        END IF
        LOOP WHILE NOT EOF(3)
        CLOSE #3
        go.search = 0:   q = 1
        IF x = 0 THEN
           prnt.q = 0
           LOCATE 8, 45: PRINT "No Match Found.";
           FOR i% = 1 TO qnum - 1
           qa$(i%) = ""
           NEXT i%
        ELSE prnt.q = 1
        END IF
        IF f$(x) = "" THEN GOTO 11620
           LOCATE x + 2, 45: PRINT "Enter The Number ";
           LOCATE x + 3, 45: PRINT "Of File To Use";
11610      LOCATE x + 3, 59: INPUT ; xa$
           IF VAL(xa$) < 1 OR VAL(xa$) > x THEN
```

```
                BEEP
                LOCATE x + 3, 56: PRINT SPACE$(LEN(xa$) + 2);
                GOTO 11610
            ELSE
                FOR i = 1 TO x + 3
                LOCATE i, 45: PRINT SPACE$(34);
                NEXT i
            END IF
        a.file$ = f$(VAL(xa$))
        GOSUB 11650

11620   '
        RETURN

11650   '
            OPEN "c:\perm\" + a.file$ FOR RANDOM AS #4 LEN =
LEN(cv)
            GET #4, 1, cv
        qa$(1)  = RTRIM$(cv.lname)
        qa$(2)  = RTRIM$(cv.fname)
        qa$(3)  = RTRIM$(cv.addr)
        qa$(4)  = RTRIM$(cv.city)
        qa$(5)  = RTRIM$(cv.st)
        qa$(6)  = RTRIM$(cv.zip)
        qa$(7)  = RTRIM$(cv.phone)
        qa$(8)  = RTRIM$(cv.ins)
        qa$(9)  = RTRIM$(cv.vin)
        qa$(10) = RTRIM$(cv.yr)
        qa$(11) = RTRIM$(cv.make)
        qa$(12) = RTRIM$(cv.model)
        qa$(13) = RTRIM$(cv.typ)
        qa$(14) = RTRIM$(cv.miles)
        qa$(15) = RTRIM$(cv.col)
        qa$(16) = RTRIM$(cv.plate)
        qa$(17) = RTRIM$(cv.tech)
        qa$(18) = RTRIM$(cv.ro)
        first.file$ = RTRIM$(cv.first)
        last.file$ = RTRIM$(cv.last)
            CLOSE #4
RETURN

11660   ' cv.lname = qa$(1)
        cv.fname = qa$(2)
        cv.addr = qa$(3)
        cv.city = qa$(4)
        cv.st = qa$(5)
        cv.zip = qa$(6)
        cv.phone = qa$(7)
        cv.ins = qa$(8)
        cv.vin = qa$(9)
        cv.yr = qa$(10)
        cv.make = qa$(11)
        cv.model = qa$(12)
        cv.typ = qa$(13)
        cv.miles = qa$(14)
        cv.col = qa$(15)
        cv.plate = qa$(16)
        cv.tech = qa$(17)
        cv.ro = qa$(18)
```

RETURN

11700 '

```
        GOSUB 11660

IF a.file$ = "" THEN
        a.file$ = LEFT$(qa$(1), 5)
        SHELL "dir c:\perm\" + a.file$ + "*.rec
|sort>c:\perm\sdat"
        OPEN "c:\perm\sdat" FOR INPUT AS #3
        DO WHILE NOT EOF(3)
        LINE INPUT #3, a$
        LOOP
        b = VAL(MID$(a$, 6, 3))
        b = b + 1
        b$ = LTRIM$(STR$(b))
        b$ = "00" + b$
        b$ = RIGHT$(b$, 3)
        a.file$ = LEFT$(qa$(1), 5) + b$ + ".rec"
        CLOSE #3
    END IF IF first.file$ = "" THEN
        cv.first = LEFT$(a.file$, 9) + "ONE"
        OPEN "c:\perm\" + a.file$ FOR RANDOM AS #4 LEN =
LEN(cv)
        PUT #4, 1, cv
        CLOSE #4
        OPEN "c:\perm\" + cv.first FOR RANDOM AS #5 LEN
= LEN(orf)
        FOR i% = 1 TO 120
        orf.measurements = cfm2%(i%)
        orf.filenums = cff2%(i%)
        orf.rws = sfr%(i%)
        orf.clms = sfc%(i%)
        PUT #5, i%, orf
        NEXT i%
        dt$ = LEFT$(DATE$, 2) + MID$(DATE$, 4, 2)
        orf.measurements = VAL(dt$)
        orf.filenums = VAL(RIGHT$(DATE$, 2))
        orf.rws = VAL(LEFT$(TIME$, 2))
        orf.clms = VAL(MID$(TIME$, 4, 2))
        PUT #5, 121, orf
        CLOSE #5
    END IF
    IF last.file$ = "" THEN
        cv.last = LEFT$(a.file$, 9) + "TWO"
        OPEN "c:\perm\" + a.file$ FOR RANDOM AS #4 LEN =
LEN(cv)
        PUT #4, 1, cv
        CLOSE #4
    END IF OPEN "c:\perm\" + cv.last FOR RANDOM AS #5 LEN =
LEN(orf)
        FOR i% = 1 TO 120
        orf.measurements = cfm2%(i%)
        orf.filenums = cff2%(i%)
        orf.rws = sfr%(i%)
```

```
            orf.clms = sfc%(i%)
            PUT #5, i%, orf
            NEXT i%
            dt$ = LEFT$(DATE$, 2) + MID$(DATE$, 4, 2)
            orf.measurements = VAL(dt$)
            orf.filenums = VAL(RIGHT$(DATE$, 2))
            orf.rws = VAL(LEFT$(TIME$, 2))
            orf.clms = VAL(MID$(TIME$, 4, 2))
            PUT #5, 121, orf
            CLOSE #5

RETURN

11800 '

OPEN "c:\perm\" + p.file$ FOR RANDOM AS #5 LEN = LEN(orf)
            FOR i% = 1 TO numplaces%
            GET #5, i%, orf
            M% = orf.measurements
            M1% = orf.filenums
            r% = orf.rws
            c = orf.clms
            IF M1% <> 0 THEN GOSUB 11880
            NEXT i%
            FOR i% = 41 TO 40 + numplaces%
            GET #5, i%, orf
            M% = orf.measurements
            M1% = orf.filenums
            r% = orf.rws
            c = orf.clms
            IF M1% <> 0 THEN GOSUB 11880
            NEXT i%
            FOR i% = 81 TO 80 + numplaces%
            GET #5, i%, orf
            M% = orf.measurements
            M1% = orf.filenums
            r% = orf.rws
            c = orf.clms
            IF M1% <> 0 THEN GOSUB 11880
            NEXT i%
            GET #5, 121, orf
            f.date = orf.measurements
            s.date = orf.filenums
            f.time = orf.rws
            s.time = orf.clms
            z$ = LTRIM$(STR$(f.date))
            IF LEN(z$) = 3 THEN z$ = LEFT$(z$, 1) ELSE z$ = LEFT$(z$, 2)
            M$ = z$ + "-" + RIGHT$(STR$(f.date), 2) + "-" + LTRIM$(STR$(s.date))
            w$ = LTRIM$(STR$(s.time))
            IF LEN(w$) = 1 THEN w$ = "0" + w$
            hr$ = STR$(f.time)
            M1$ = hr$ + ":" + w$
            LOCATE 23, 2: PRINT M$
            LOCATE 24, 2: PRINT M1$
            CLOSE #5

RETURN
```

```
11880 '
    LOCATE r%, c: PRINT LTRIM$(STR$(M%));
    COLOR 1, back%
    LOCATE r% - 1, c: PRINT LTRIM$(STR$(M1%));
    COLOR fore%, back%
    RETURN 19000 '
    LOCATE 8, 47: PRINT "There is no file on";
    LOCATE 9, 47: PRINT "record for the car you";
    LOCATE 10, 47: PRINT "entered.  If you wish to";
    LOCATE 11, 47: PRINT "change the vehicle ";
    LOCATE 12, 47: PRINT "information type ' C '.";
    LOCATE 14, 47: PRINT " to use Generic vehicle ";
    LOCATE 15, 47: PRINT "information type ' G ',";
    LOCATE 16, 47: PRINT "to enter the make and model";
    LOCATE 17, 47: PRINT "type ' M '.";
    DO
        k$ = INKEY$
    LOOP WHILE k$ = ""
    FOR l% = 8 TO 17
        LOCATE l%, 47: PRINT SPACE$(30);
    NEXT l%

IF k$ = "C" OR k$ = "c" THEN
        q = q - 1
        print.q = 0
        GOTO 770
    END IF
    IF k$ = "G" OR k$ = "g" THEN
        data.file$ = "GENERIC"
        prnt.q = 0
        GOTO 770
    END IF
    IF k$ = "M" OR k$ = "m" THEN
        prnt.q = 0
        GOTO 770
    ELSE BEEP: GOTO 19000
    END IF SUB dfile (qa$(), data.file$, f1$)

' Program for naming spec. files f1$ = "": f2$ = "": f3$ = "": f4$ = ""

' qa$(11) = UCASE$(qa$(11))
    qa$(12) = UCASE$(qa$(12))
    qa$(13) = UCASE$(qa$(13))

' f1$ = qa$(10)
    f1$ = LTRIM$(f1$)
```

```
        IF LEN(f1$) > 2 THEN f1$ = "0" + MID$(f1$, 2, 1)
        f2$ = LEFT$(qa$(11), 5)

f3$ = LEFT$(qa$(12), 3)

typ$ = LEFT$(qa$(13), 1)
        IF typ$ = "2" THEN
              IF LEN(qa$(13)) > 11 THEN f3$ = "3DR": GOTO
10020
              f4$ = "2DR": GOTO 10020
              END IF IF typ$ = "3" THEN f4$ = "3DR": GOTO 10020

IF typ$ = "4" THEN
              IF LEN(qa$(13)) > 11 THEN f4$ = "5DR": GOTO
10020
              f4$ = "4DR": GOTO 10020
              END IF IF typ$ = "5" THEN f4$ = "5DR": GOTO 10020

IF typ$ = "C" THEN f4$ = "CON": GOTO 10020

IF typ$ = "W" OR typ$ = "S" THEN f4$ = "WAG": GOTO
10020

IF typ$ = "L" THEN f4$ = "LIM"

10020   data.file$ = f2$ + f3$ + "." + f4$

END SUB

SUB vins (qa$(), bad)

bad = 0
   FOR i% = 10 TO 13
   qa$(i%) = ""
   NEXT i%

IF LEN(qa$(9)) < 10 THEN bad = 1: GOTO 11000
   vin$ = UCASE$(qa$(9))
   ten$ = MID$(vin$, 10, 1)
   IF ASC(ten$) < 74 THEN qa$(10) = LTRIM$(STR$(ASC(ten$)
+ 15)) ELSE qa$(10) = LTRIM$(STR$(ASC(ten$) + 14))
   ff$ = "c:\info\vins\" + LEFT$(qa$(10), 2) + "MAKES"

OPEN ff$ FOR INPUT AS #2
   INPUT #2, title$
   WHILE NOT (EOF(2))
      a% = 1
      INPUT #2, CODE$, make$
      FOR a% = 1 TO 3
      b$ = MID$(CODE$, a%, 1)
      d$ = MID$(vin$, a%, 1)
      IF b$ = "*" OR b$ = d$ THEN GOTO 10104
```

```
        GOTO 10105
10104   NEXT a%
        GOTO 10120
10105   '
    WEND
10120 CLOSE #2
    IF LEN(make$) > 8 THEN make$ = LEFT$(make$, 8)
    mod.file$ = "c:\info\vins\" + make$ + ".MOD"
    OPEN mod.file$ FOR INPUT AS #2
    INPUT #2, qa$(11), title$
    WHILE NOT (EOF(2))
    a% = 1
    INPUT #2, CODE$, mod$, typ$
    FOR a% = 4 TO 9
    b$ = MID$(CODE$, a% - 3, 1)
    d$ = MID$(vin$, a%, 1)
    IF b$ = "*" OR b$ = d$ THEN GOTO 10204
    GOTO 10205
10204 NEXT a%
    qa$(12) = mod$: qa$(13) = typ$: GOTO 10220

10205   '

WEND
10220 CLOSE #2
    GOTO 11000

11000 END SUB
```

APPENDIX II

```
;EGA5.8 -- display .PCX file on screen (fast!?)

jmp entry hline     db 80 dup 0cc
vaddr     dw 0
color     db 1
bytecnt   db 0
endcnt    db 0
char      db 0
vmode     db   ?
fhand     dw   ?
disktable db 512 dup ?
bytesegaseg    dw ?
dataseg   dw ?
entry:
;    push cs
;    pop ds
;    mov   ah,0f           ;save current video mode
;    int   010
;    mov   vmode,al ;    mov ax,010            ;set video mode EGA 640 x 350 16 colors
     cld                   ;set for forward string moves if !nocolor
;    int 010               ;---****
#endif
```

```
        mov ax,0a000          ;set es to start of ega ram
        mov es, ax
        mov ax, 0
        mov al,[080]          ;get length of file name
        add al, 81
        mov si, ax
        mov byte 0+[si],0     ;add 0 byte to end of file name
        mov dx,082            ;point to file name
        mov al,0              ;read mode
        mov ah,03d            ;open file
        int 33
        jnc OK                ; .pcx file opened o.k.
        jmp quit              ; file not there, quit.

OK:     mov bx,ax             ;put file handle in bx
        mov fhand,bx          ;save file handle in fhand lea dx,disktable      ;throw away .pcx header
        mov cx, 128
        mov ah,03f
        int 33 mov di,0              ;point es:di to ega

L0:     mov al, 2
        mov dx,03c4 if !nocolor
        out dx,al             ;temp commented out
endif mov dx,03c5
        mov al,color if !nocolor
        out dx,al             ;temp commented out
endif call get                              ;char is left in al
by get
        and  al,0c0
        cmp  al,0c0           ;test for repeat
        jne  L6               ;no repeat, just output the char.

L1:     mov al, char
        and al,03f            ;strip off high bites XX00 0000
        mov endcnt, al call get
l10:    mov bl, bytecnt
        add bl, endcnt
        cmp bl, 80
        ja t1
        mov al, char
        mov ch, 0
        mov cl, endcnt
        repe stosb
        mov bytecnt, bl
        mov endcnt, 0
        jmp t2
```

```
t1:     mov al, 80
        sub al,bytecnt
        sub endcnt,al
        mov ch, 0
        mov cl, al
        mov al, char
        repe stosb
        jmp t3

L2:     dec endcnt
L6:     mov al, char
        stosb           ;put the char into hline+bytecnt
        inc bytecnt
t2:     cmp bytecnt, 80
        jb  L4          ;if below 80, don't output hline t3:     rol color,1
        sub di,050
        cmp color,16
        jne L3
        mov color,1
        add vaddr, 50
        add di, 50
L3:     mov bytecnt, 0
L4;     cmp endcnt, 0
        jnz l11
        cmp vaddr, 351 * 50
        je L5
        jmp L0
L5:     mov ah,03e      ;close file
        int 33

;#if !norestore
;       mov  al,vmode   ;restore video mode
;       mov  ah,0
;       int  010
;#endif QUIT:
        mov ax,04c00    ;go to DOS -- end of program
        int 33 l11:    mov al, 2
        mov dx,03c4 if !nocolor
        OUT dx, al
endif mov dx,03c5
        mov al,color if !nocolor
        OUT dx, al
endif
        jmp l10
```

```
Get                         ;calls read
    jnz 19
        call read19:    inc bp
        dec bytes       lea si,disktable
    mov al, (bp + si)
    mov char, al
    ret read                        ;pointed to in bx. stores it
in disktable.
    mov bx, fhand
    mov cx, 512
    lea dx, disktable
        mov ah,03f
        int 33
        mov bytes     mov bp,0ffff
    ret
```

APPENDIX III

PRTSCR.8 - Program
```
    jmp entry

COLOR1   equ    1              ;dark blue
        COLOR2   equ    4              ;dark red
        origin   dw     0              ;offset in ega
ram to start of page
        pline1   db     27,"A",8,27,"2"   ;line to set
printer to 8 dots/line
        pline2   db     27,"*",6,128,2    ;line to set
printer to 640 dots/line
        crlf     db     13,0a
        pline3   db     27,"A",12,27,"2"  ;line to
reset printer
        pline4   db     "      "
        line     db     640 dup ?         ;buffer to temp.
store 1 line of dots.
        ypos     dw     0                 ;ega Y position
0-349
        xpos     dw     0                 ;ega X position
0-639
        pins     db     0                 ;temp storage
byte for graphics char
        bytecnt  db     0                 ;count of number
of vertical dots in a line
        count    db     0                 ;number of times
printer is not ready
        noprinter       db 7," Printer not ready. Press
a key when ready.$"

entry:
    cmp     b[082],"1"              ;test parameter
area for a 1 if it is
                                    ;a 1, print out
page 1 else page 0.

jne     pgzero              ;not a one, =page
zero
        mov     origin,08000        ;= page 1
```
;calls read       cmp w bytes

```
pgzero: mov     ax,0a000
        mov es, ax
            mov     dx,3ce              ;index register
            mov     al,5                ;mode register number
        OUT dx, al
        inc dx
            mov     al,8                ;set bit 3 for read mode 1
        OUT dx, al mov     cx,5                ;number of chars to send
        lea bx, pline1
            call    print               ;print out the string pline1 to lpt1:

nxtln:
            mov     ah,0b               ;set up for control C check
            int     021
            call    readln              ;read in a line into the LINE buffer mov cx, 5
        lea bx, pline4
            call    print mov cx, 5
            lea     bx,pline2           ;set printer to 640 dots per hline
            call.   print mov cx, 640
            lea     bx,line
            call    print               ;print out the graphics line mov cx, 2
        lea bx, crlf
            call    print               ;print a cr cmp ypos, 349
            jb      nxtln               ;not past end of screen loop again mov cx, 2
        lea bx, crlf
            call    print mov cx, 5
        lea bx, pline3
            call    print               ;reset printer to defaults quit:
            mov     dx,3ce              ;index register
            mov     al,5                ;mode register number
        OUT dx, al
```

```
        inc dx
        mov     al,0                    ;reset the read mode to zero
        OUT dx, al mov     ax,04c00
        int     33                      ;return to dos print:  ;subroutine to print to lpt1: called with bx pointing to the string
        ; of cx bytes to print. currently does no error handling
        mov     dx,0                    ;lpt1
nxtchr: mov ah, 0
    mov al, (bx)
        int     017
    test ah, 8
        jnz     prnt            inc     bx
        loop    nxtchr
    ret prnt        cmp     count,3             ;test for 3 times no printer
        je      quit                    ;if so, exit
        inc     count                   ;bump count
        lea     dx,noprinter            ;point to printerr message
        mov     ah,9                    ;dos string output
        int     021                     ;do it
        mov     ax,0c07                 ;dos console buffer clear, then char input
        int     021                     ;do it
        jmp     nxtchr                  ;attempt to send to printer again readln: ;subroutine to read a line from the ega screen 8 pixels high by 640 wide
        ; to be placed in the buffer LINE. uses PINS to keep track of the
        ;vertical column of 8 bits that represent the 8 pixels at any x position
        ;on a line. once the LINE buffer is stored this way it is simply
        ;printed to the printer to output it.

mov xpos, 0
nxtpel: call    getpel                  ;get the pixel
    jnc L3
        or      pins,1
L3:     inc ypos
    inc bytecnt
    cmp bytecnt, 8
    je putpin
        rol     pins,1                  ;shift the pins to the top/left
    jmp nxtpel
```

```
putpin: lea     bx,line
        add bx, xpos
        mov al, pins
        mov     b [bx],al               ;put the pins value into LINE buffer at
                                        ;xpos mov bytecnt, 0
        sub     ypos,8
        mov pins, 0
        inc xpos
        cmp xpos, 639
        jb nxtpel
        add ypos, 8
        ret getpel:         ;subroutine to test a pixel for a match to COLOR1 or COLOR2
                ;routine returns carry set if match clear if no match
                ;es needs to be set to start of video page and
                ;ega read mode 1 should be set before calling
                ;these criteria are not set in this routine to speed it up.

mov     dx,03ce                 ;index register
        mov     al,2                    ;address of color compare register
        OUT dx, al
        inc dx
        mov al, COLOR1
        out     dx,al                   ;put COLOR1 in color compare register mov ax, ypos
        mov bx, xpos
        mov     cl,bl                   ;cl = low order byte of x
        mov dx, 80
        mul dx
        shr bx, 1
        shr bx, 1
        shr     bx,1                    ;bx = x/8
        add     bx,ax                   ;bx=(y*80)+(x/8)
        add bx, origin
        and     cl,7                    ;mask off all but the remainder of x/8
        xor     cl,7                    ;cl = number of bits to shift left
        mov ah, 1
        mov     al,es:[bx]              ;get the byte containing the pixel in al
        rol     ah,cl                   ;make the pixel mask
        and     al,ah                   ;mask off all but the one pixel
        jnz     hit                     ;if non zero, return carry set
```

```
        mov     dx,03ce             ;index register
        mov     al,2                ;register for color
compare register
        OUT dx, al
        inc dx
        mov     al,COLOR2           ;put COLOR2 in color
compare register
        OUT dx, al mov     al,es:[bx]          ;get the byte in al
        and     al,ah               ;use same bit mask as
before
        jz      miss                ;if zero return with
carry clear hit:    stc                         ;set carry
        ret miss:   clc                         ;clear carry
        ret
```

```
    'Program name="Ultra3"  --  4/10/89
DECLARE SUB dfile (qa$(), data.file$, f1$)
DECLARE SUB vins (qa$(), bad)

TYPE custfile
    lname AS STRING * 15
    fname AS STRING * 10
    addr AS STRING * 25
    city AS STRING * 20
    st AS STRING * 2
    zip AS STRING * 9
    phone AS STRING * 13
    ins AS STRING * 20
    vin AS STRING * 17
    yr AS STRING * 2
    make AS STRING * 15
    model AS STRING * 12
    typ AS STRING * 13
    miles AS STRING * 6
    col AS STRING * 10
    plate AS STRING * 8
    tech AS STRING * 18
    ro AS STRING * 7
    first AS STRING * 12
    last AS STRING * 12
END TYPE TYPE origfile
    measurements AS INTEGER
    filenums AS INTEGER
    rws AS INTEGER
    clms AS INTEGER
END TYPE DIM orf AS origfile
DIM cv AS custfile

ON ERROR GOTO 10999

REM see if ULTRALINE unit is there

10  OPEN "COM1:19200,n,8,1,rb2048" FOR RANDOM AS #1 LEN = 2048

'see if ULTRALINE is on line...
```

```
      a$ = INPUT$(LOC(1), #1) 'flush buffer first
      try = 0: numtries = 3
   DO
      PRINT #1, "?";
      FOR i = 1 TO 4000: NEXT i: PRINT LOC(1)'delay give ULTRALINE a chance to respo
nd
      IF LOC(1) <> 0 THEN
        .a$ = INPUT$(1, #1)
      END IF
      try = try + 1
   LOOP UNTIL a$ = "Y" OR try > numtries 15 IF try > numtries THEN
         PRINT
         PRINT "ULTRALINE NOT CONNECTED!"
         BEEP
         PRINT "Please Check Cable From Computer to Laser Unit"
         PRINT "Press ( Q ) to Quit or Any Other Key to Continue"
         BEEP
         DO
            k$ = INKEY$
         LOOP WHILE k$ = ""
         IF k$ = "Q" OR k$ = "q" THEN END
         IF k$ = "T" OR k$ = "t" THEN GOTO 20
         CLOSE
         GOTO 10

ELSE PRINT : PRINT "ULTRALINE is now ON-LINE..."

END IF a$ = INPUT$(LOC(1), #1)'clear buffer 20    mor% = 1: ti% = 0: numsensors% = 16: back% = 9
      inc% = 10: XMAX% = 639: YMAX% = 349: 'starting cursor position
      n40% = 22 * 2 + 4: n60% = 22 * 3 + 4

DIM T.ANGLE(n40%), T.HEIGHT(n40%), ANGLE.1#(n40%), ANGLE.2#(n40%), Z.1(n40%
), Z.2(n40%), x(n40%), Y(n40%), z(n40%), X1(n40%), X2(n40%), X3(n40%), Y1(n40%),
  Y2(n40%), Y3(n40%), z1(n40%), Z2(n40%), Z3(n40%)
        DIM count&(255)       '                    array to store measured counts in
        DIM qa$(20), QR(20), QC(20), Q1(20)'quest. Rol Col locations, max len. of a
ns.
        DIM f$(255)
        DIM filex%(n40%), filey%(n40%), filez%(n40%), cx%(n40%), cy%(n40%), cz%(n40
%)

DIM letter$(n40%), LN$(n40%)
        DIM FY%(n40%)
        DIM tap%(n60%), mx%(n60%), my%(n60%), mz%(n60%), px%(n40%), py%(n40%)
        DIM cfm2%(120), cff2%(120), sfr%(120), sfc%(120)
        DIM l%(640), two%(8)
        DIM rod.length%(numsensors%), pat%(numsensors%)
        'dim transducer array
        x% = 35: Y% = 10: s = 4 + INT((x% * 4 + 7) / 8) * Y%: DIM xdcr%(s)

x% = 6: Y% = 11: s = 4 + INT((x% * 4 + 7) / 8) * Y%: DIM l.arrow%(s), r.arr
ow%(s)

'                       the lines above this need only be done once ...
      '
40 SCREEN 9: WIDTH 80, 25: KEY OFF
      VL$ = CHR$(186): UL$ = CHR$(201): UR$ = CHR$(187): LL$ = CHR$(200): LR$ = CHR
$(188)
      HLT$ = CHR$(185): HRT$ = CHR$(204)
      CLS : COLOR 10, 9: CLS
      s$ = STRING$(8, 32)
      LOCATE 1, 1: PRINT s$; UL$; STRING$(22, 205); UR$; s$;
       LOCATE 2, 1: PRINT UL$; STRING$(7, 205); HLT$; "   U L T R A L I N E   ";
       PRINT HRT$; STRING$(7, 205); UR$;
       LOCATE 3, 1: PRINT VL$; STRING$(7, 32); LL$; STRING$(22, 205); LR$;
       PRINT STRING$(7, 32); VL$;
       COLOR 10, 9
       LOCATE 4, 11: PRINT "CUSTOMER INFORMATION";
```

```
   LOCATE 5, 9: PRINT "Last              First"
   LOCATE 6, 2: PRINT "Name:                   ,";
   LOCATE 7, 2: PRINT "Address:";
   LOCATE 8, 2: PRINT "City:";
   LOCATE 9, 2: PRINT "State:";
   LOCATE 9, 12: PRINT "Zip:";
   LOCATE 10, 2: PRINT "Phone:";
   LOCATE 11, 2: PRINT "Insurance Co.:";
   LOCATE 13, 11: PRINT "VEHICLE INFORMATION";
   LOCATE 15, 2: PRINT "Year:";
   LOCATE 15, 15: PRINT "Make:";
   LOCATE 16, 2: PRINT "Model:";
   LOCATE 16, 21: PRINT "Type:";
   LOCATE 18, 2: PRINT "Color:";
   LOCATE 17, 2: PRINT "Odometer:";
   LOCATE 14, 2: PRINT "VIN #:";
   LOCATE 19, 2: PRINT "License #:";
   LOCATE 21, 2: PRINT "Repair Technician:";
   LOCATE 22, 2: PRINT "Repair Order #";
   LOCATE 25, 1: PRINT LL$; STRING$(12, 205);

COLOR 15, 9
   PRINT "< CONTINUE >";
   COLOR 10, 9
   PRINT STRING$(14, 205); LR$;
   FOR i% = 3 TO 24: LOCATE i%, 1: PRINT VL$; : LOCATE i%, 40: PRINT VL$; : NEX
T i%

'get information section qnum = 19: q = 0         'number of questions +1 for continue
   data.file$ = ""
   'read question info FOR i% = 1 TO qnum
      READ QR(i%), QC(i%), Ql(i%)
   NEXT i%
   '
   DATA 6,7,15,   6,23,10,    7,10,25,   8,7,20,   9,8,2,   9,16,9
   DATA 10,8,13,  11,16,20,   14,8,17,   15,7,6,   15,20,15,   16,8,12,   16,26,13
   DATA 17,11,6,  18,8,10,    19,12,8,   21,21,18,  22,17,7
   DATA 25,15,9

DATA A,B,C,D,E,F,G,H,J,K,L,M,N,O,P,R,S,T,U,V,W,X,Y,Z
   'move cursor and get the questions answer up = 1: dn = 2: q = 1: QUIT$ = " CONTINUE ": qa$(qnum) = QUIT$
690 WHILE qa$(qnum) = QUIT$
   IF q = 1 THEN GOSUB 11500
700   help% = 10
   IF q = qnum AND after.use% > 0 THEN msg$ = " ": GOSUB 4160
   LOCATE QR(q), QC(q)
   COLOR 12, 9
   IF q <> qnum THEN PRINT CHR$(219);  ELSE PRINT " CONTINUE";  ' LEFT$(qa$(q
) + STRING$(QL(q), 32), QL(q));
   LOCATE QR(q), QC(q), 1: ' PRINT " ";
   qprev = q
   GOSUB 820 'get arrow key or answer
   IF go.search = 1 THEN
      GOSUB 11600
      IF x = 0 THEN GOTO 690 ELSE GOTO 700
   END IF          /
   IF qkey = up THEN q = q - 1: IF q < 1 THEN q = 1
   IF qkey = dn THEN q = q + 1: IF q > qnum THEN q = qnum
   IF q = qprev THEN prnt.q = 0: GOTO 780
   LOCATE QR(qprev), QC(qprev): COLOR 15, 9
   PRINT LEFT$(qa$(qprev) + STRING$(Ql(qprev), 32), Ql(qprev) + 1);
   IF qprev = 1 THEN
      le% = LEN(qa$(qprev)): IF le% > 15 THEN le% = 15
      LOCATE QR(qprev), QC(qprev) + le%: PRINT ",";
   END IF
   IF old.file = 1 THEN GOTO 780
   IF qprev = 9 AND qkey = dn THEN
      IF qa$(9) = "SCALE" THEN data.file$ = "SCALE": GOTO 780
      CALL vins(qa$(), bad)
      IF bad = 1 THEN
```

```
            GOTO 19000
        ELSE GOSUB 975
        END IF
    END IF

770 'IF qa$(qnum) = "END" THEN qa$(qnum) = QUIT$: q = q - 1  ' try and get back
 into info loop from error

780 WEND
    GOTO 1080

820 IF prnt.q = 1 THEN qkey = dn: RETURN' Get arrow key or answer
830 k$ = INKEY$: IF k$ = "" THEN 830
    IF LEN(k$) = 2 THEN 920         'function key was pressed 'non-function key processing
    IF q = qnum AND k$ = CHR$(13) THEN qa$(qnum) = "END": GOTO 960
    IF k$ = CHR$(13) THEN qkey = dn: GOTO 960
    LOCATE QR(q), QC(q): PRINT STRING$(Q1(q), 32);        'erase old info
    LOCATE QR(q), QC(q): PRINT UCASE$(k$); : LINE INPUT ; KA$: qkey = dn
    qa$(q) = UCASE$(k$) + UCASE$(KA$): IF q = 10 AND LEN(qa$(10)) > 2 THEN qa$(1
0) = RIGHT$(qa$(10), LEN(qa$(10)) - 2)
    IF old.file = 1 THEN
        look.for$ = qa$(q)
        go.search = 1
    END IF
    IF qkey = up THEN q = q + 2
    GOTO 960
920 'function key processing
    k$ = RIGHT$(k$, 1): qkey = 0
    IF k$ = "H" THEN qkey = up
    IF k$ = "P" THEN qkey = dn
960 RETURN 975 ' print qa$(9)--qa$(13)
        FOR q = 10 TO 13
        LOCATE QR(q), QC(q): COLOR 15, 9
        PRINT LEFT$(qa$(q) + STRING$(Q1(q), 32), Q1(q));
        LOCATE QR(q), QC(q), 1: ' PRINT " ";
        qprev = q
        NEXT q
    RETURN 1080 prnt.q = 0
    'end of custinfo section
    IF qa$(9) = "SCALE" THEN data.file$ = "SCALE"
    IF data.file$ = "GENERIC" THEN
        f$ = "82bu1.klm"
        numplaces% = 22
        GOTO 1110
    ELSEIF data.file$ = "SCALE" THEN f1$ = "88": GOTO 1100
    END IF CALL dfile(qa$(), data.file$, f1$)

IF LEFT$(f1$, 1) <> "0" AND VAL(f1$) < 82 THEN f1$ = "82"

1100 f$ = "c:\info\specs\" + f1$ + "\" + data.file$     ' read file info here

OPEN f$ FOR INPUT AS #2
    IF EOF(2) = -1 THEN
        msg$ = "No File Data"
        GOSUB 4160
        RESTORE: CLOSE #2
        GOTO 40
    END IF INPUT #2, numplaces%
    FOR i% = 1 TO numplaces%
        INPUT #2, filex%(i%)
    NEXT i%

FOR i% = 1 TO numplaces%
        INPUT #2, filey%(i%)
    NEXT i%
```

```
     FOR i% = 1 TO numplaces%
        INPUT #2, filez%(i%)
     NEXT i%

INPUT #2, f$
     CLOSE #2

1110 f$ = "c:\info\pd\" + f$
     OPEN f$ FOR INPUT AS #2
     IF EOF(2) = -1 THEN
        msg$ = "No Picture Data"
        GOSUB 4160
        RESTORE: CLOSE #2
        GOTO 40
     END IF FOR i% = 1 TO numplaces%
        INPUT #2, px%(i%)
     NEXT i%

FOR i% = 1 TO numplaces%
        INPUT #2, py%(i%)
        tap%(i%) = 0
     NEXT i%

FOR i% = 1 TO numplaces%
        INPUT #2, cx%(i%)
     NEXT i%

INPUT #2, rdx%, strut1%, lff%
     INPUT #2, rpx%, strut2%, rff%

FOR i% = 1 TO (numplaces% - 4) / 2
        READ letter$(i%)
     NEXT i%

INPUT #2, f$

CLOSE #2

FOR i% = 1 TO numplaces%
     cy%(i%) = cx%(i%)
     cz%(i%) = cx%(i%)
     NEXT i% rdy% = 39: rpy% = 36
     rdz% = 33: rpz% = 30

KEY OFF: SCREEN 9: WIDTH 80, 43: COLOR 4, 11
     WIDTH "lpt1:", 255

CLS fore% = 4: back% = 11'         sets foreground to red ,background to lt blue help% = 20

'display frame picture at this point f$ = "c:\info\pict\" + f$
     SHELL "ega5 " + f$ 1505 k$ = INKEY$: IF k$ = "" THEN GOTO 1505
          ' get file info
     COLOR 1, back%: LINE (80, 283)-(630, 283), 1'
     LINE (80, 283)-(630, 283), 1: LINE (80, 307)-(630, 307), 1
     ctitle$ = qa$(10) + SPACE$(1) + qa$(11) + SPACE$(1) + qa$(12) + SPACE$(1) +
qa$(13)
     c = 40 - LEN(ctitle$) / 2: LOCATE 1, c: PRINT ctitle$; : COLOR fore%, back%
     a$ = " Pass ": LOCATE 30, 17: PRINT a$; : LOCATE 36, 17: PRINT a$;
```

```
        a$ = " Driver ": LOCATE 22, 17: PRINT a$; : LOCATE 33, 17: PRINT a$; : LOCA
TE 39, 17: PRINT a$;
        LOCATE 31, 1: PRINT " HEIGHT "; : LOCATE 37, 1: PRINT " LENGTH ";
        LOCATE 26, 1: COLOR 1, back%: PRINT " Specs.": LOCATE 27, 1: COLOR fore%, b
ack%: PRINT " Actual"

rod.length%(1) = 130: rod.length%(2) = 130: rod.length%(3) = 130: rod.lengt
h%(4) = 130
        rod.length%(5) = 230: rod.length%(6) = 230: rod.length%(7) = 230: rod.lengt
h%(8) = 230
        rod.length%(9) = 80: rod.length%(10) = 80: rod.length%(11) = 330: rod.lengt
h%(12) = 330

'sensors
1510 '    draw datum line
        LINE (80, 323)-(630, 323), 1: LINE (80, 265)-(630, 265), 1

FOR i% = numplaces% / 2 + 1 TO numplaces%'  put in all dimension lines
        IF i% > numplaces% - 2 THEN
            LINE (px%(i%), py%(i%))-(px%(i%), 265)
        ELSE
            LINE (px%(i%), py%(i%))-(px%(i%), 323)
        END IF
        NEXT i%

FOR i% = 1 TO (numplaces% - 4) / 2'    write letters at bottom of screen
        LOCATE 42, cy%(i%): PRINT letter$(i%);
        NEXT i%

'   make arrowheads
        LINE (10, 10)-(5, 15), 1: LINE -(10, 20), 1: LINE -(10, 10), 1: PAINT (8, 1
5), 1, 1

GET (5, 10)-(10, 20), l.arrow%: PUT (5, 10), l.arrow%
        LINE (5, 10)-(10, 15), 1: LINE -(5, 20), 1: LINE -(5, 10), 1: PAINT (8, 15)
, 1, 1
        GET (5, 10)-(10, 20), r.arrow%: PUT (5, 10), r.arrow% ctr% = 0
        ' main menu
1580 msg$ = "Place Targets ( P ), Measure ( M ), Continue ( C ), Redo Centerline
( R )": GOSUB 4150
        LOCATE 41, 2: PRINT TIMER - start;
1585 contin = 0
1590 k$ = INKEY$: IF k$ = "" THEN 1590
        IF k$ = "C" OR k$ = "c" THEN 3300
        IF k$ = "M" OR k$ = "m" THEN
           start = TIMER
           GOTO 1930
        END IF
        IF k$ = "P" OR k$ = "p" THEN stp% = 0: GOSUB 1640: GOSUB 1620: GOTO 1580
        IF k$ = "R" OR k$ = "r" THEN GOSUB 1600: GOTO 1580
        BEEP: GOTO 1580

1600 msg$ = "Average Centerline ( A ), Use Third Reference ( T ), Natural ( N )"
: GOSUB 4150
1610 k$ = INKEY$: IF k$ = "" THEN GOTO 1610
        IF k$ = "A" OR k$ = "a" THEN c.line% = 0
        IF k$ = "T" OR k$ = "t" THEN c.line% = 1
        IF k$ = "N" OR k$ = "n" THEN c.line% = 2
        RETURN 1620 msg$ = "Type In The Height Setting Of The Strut Gauge": GOSUB 4150
        INPUT ; a$
        IF a$ = "" THEN RETURN
        IF ASC(a$) < 48 OR ASC(a$) > 57 THEN BEEP: GOTO 1620
        strut.rod% = VAL(a$) - 160
        IF strut.rod% < 0 THEN strut.rod% = 0
        RETURN

1640 SOUND 0, 0'
```

```
IF sp% = 0 THEN
   GOSUB 4380
   GOSUB 6190 ,                           'print select target message
ELSEIF sp% = 1 THEN GOSUB 6260            'input target #
END IF
IF stp% = 1 THEN
   LOCATE 23, 7

PRINT SPACE$(LEN(a$) + 1)                    'remove # from screen
      RETURN
   END IF 'Get the key from the keyboard
1720 k$ = INKEY$: IF k$ = "" THEN 1720
     IF LEN(k$) = 2 THEN
        GOTO 1790                    'it was a function key 'process non-function keys
     ELSEIF k$ = " " OR k$ = CHR$(13) THEN    'check for sensor/place matches IF ABS(x% - 54) <= sxsize% AND ABS(Y% - 174) <= sysize% THEN
           SOUND 800, 2
           SOUND 500, 2              ' get rid of typing error
           PUT (x%, Y%), xdcr%
           FOR stall = 1 TO 500
           NEXT stall
           GOTO 4360
        ELSE
           FOR i% = 1 TO numplaces%
           IF ABS((x% + sxsize% / 2) - px%(i%)) > 10 THEN 4350
           IF ABS((Y% + sysize% / 2) - py%(i%)) > 10 THEN 4350
                                         '++++++++ match found
           mp% = i%
           i% = numplaces% + 2
           SOUND 800, 2
           SOUND 500, 2
           FOR stall = 1 TO 500
           NEXT stall
           PUT (x%, Y%), xdcr%, XOR              'erase xdcr
           PUT (px%(mp%) - sxsize% / 2, py%(mp%) - sysize% / 2), xdcr%, PSET'make
place for sensor
           PUT (px%(mp%) - sxsize% / 2, py%(mp%) - sysize% / 2), xdcr%, OR'place
sensor
           IF tap%(mp%) <> 0 THEN GOSUB 6340     ' reuse target
           tap%(mp%) = ms%                       ' save target at position (mp%)
           pat%(ms%) = mp%                         ' pos. at target # (ms%)
           GOSUB 6440                              ' see if target # has been us
ed GOSUB 5240                    ' determine target loc. of 3 reference points
4350       NEXT i%
           IF i% <= numplaces% + 1 THEN BEEP: GOTO 1720
        END IF
     ELSE BEEP: GOTO 1720
     END IF
4360 IF sp% = 1 THEN RETURN ELSE GOTO 1640
```

```
1790 ' process function keys
     k$ = RIGHT$(k$, 1)
     '
     PUT (x%, Y%), xdcr%, XOR                        'process function key
     IF k$ = "H" THEN Y% = Y% - inc%: IF Y% < 0 THEN Y% = 0            'Up
     IF k$ = "P" THEN Y% = Y% + inc%: IF Y% > YMAX% - sysize% THEN Y% = YMAX% -
sysize%'Down
     IF k$ = "K" THEN x% = x% - inc%: IF x% < 0 THEN x% = 0            'Left
     IF k$ = "M" THEN x% = x% + inc%: IF x% > XMAX% - sxsize% THEN x% = XMAX% -
sxsize%'Right
     PUT (x%, Y%), xdcr%, XOR                        'place object at new location

GOTO 1720

1930 first.time% = 0          'make measurements here
1941    '
     msg$ = " ": GOSUB 4150
     '                  erase width measurements from screen
     FOR n% = 1 TO numplaces% / 2
     IF (tap%(n%)) = 0 THEN 1945
     LOCATE rdx%, cx%(n%): PRINT SPACE$(4);
     LOCATE rdy%, cy%(n%): PRINT SPACE$(4);
     LOCATE rdz%, cz%(n%): PRINT SPACE$(4);
     LOCATE rdx% - 1, cx%(n%): PRINT SPACE$(4);
     LOCATE rdy% - 1, cy%(n%): PRINT SPACE$(4);
     LOCATE rdz% - 1, cz%(n%): PRINT SPACE$(4);

1945 NEXT n%

FOR n% = numplaces% / 2 + 1 TO numplaces%
     IF (tap%(n%)) = 0 THEN 1946
     LOCATE rpx%, cx%(n%): PRINT SPACE$(4);
     LOCATE rpy%, cy%(n%): PRINT SPACE$(4);
     LOCATE rpz%, cz%(n%): PRINT SPACE$(4);
     LOCATE rpx% - 1, cx%(n%): PRINT SPACE$(4);
     LOCATE rpy% - 1, cy%(n%): PRINT SPACE$(4);
     LOCATE rpz% - 1, cz%(n%): PRINT SPACE$(4);

1946 NEXT n%

1959 LINE (180, 283)-(630, 283), 1: LINE (190, 307)-(630, 307), 1'
     '  erase arrow heads
     IF pszp% <> 0 THEN PUT (px%(pszp%) + 1, 283 - 5), l.arrow%: PUT (px%(pszp%)
 - 6, 283 - 5), r.arrow%: ' pass side
     IF dszp% <> 0 THEN PUT (px%(dszp%) - 6, 307 - 5), r.arrow%: PUT (px%(dszp%)
 + 1, 307 - 5), l.arrow%: ' drivers side '
     IF only.one% = 1 THEN RETURN
2100 IF dszero% = 0 OR pszero% = 0 OR zzero% = 0 THEN msg$ = " 1 of the 3 Refere
nce Points is Missing. Type P.": GOSUB 4150: GOTO 1585
     target.over% = 0
2105 mistake% = 0
     side$ = "1"
     GOSUB 2600
     IF mistake% = 1 THEN GOTO 2105
     msg$ = "Measuring": GOSUB 4150
     FOR tn% = 1 TO numsensors%
     ANGLE.1#(tn%) = 0
     IF T.ANGLE(tn%) = 0 GOTO 2170
     ADJUST.1 = 2.42: ADJUST.2 = 2.385
     ANGLE.1#(tn%) = (ADJUST.1 + T.ANGLE(tn%)) * 3.141593 / 180
     Z.1(tn%) = T.HEIGHT(tn%)
2170 NEXT tn%
     side$ = "2"
     GOSUB 2600
     IF mistake% = 1 THEN GOTO 2105
     FOR n% = 1 TO numplaces%
     IF tap%(n%) = 0 THEN mx%(tap%(n%)) = 0: my%(tap%(n%)) = 0: mz%(tap%(n%)) =
0
     NEXT n%
```

```
        FOR tn% = 1 TO numsensors%
         x(tn%) = 0: Y(tn%) = 0: z(tn%) = 0: X3(tn%) = 0: Y3(tn%) = 0: Z3(tn%) = 0:
        ANGLE.2#(tn%) = 0
        IF ANGLE.1#(tn%) = 0 GOTO 2260
        IF T.ANGLE(tn%) = 0 THEN msg$ = "TARGET #" + STR$(tn%) + "SIDE 2": GOSUB 41
50: GOTO 2100
        GOTO 2280
2260    IF T.ANGLE(tn%) = 0 GOTO 2330
        msg$ = "TARGET #" + STR$(tn%) + "SIDE 1": GOSUB 4150: GOTO 2100
2280    Z.2(tn%) = T.HEIGHT(tn%)
        ANGLE.2#(tn%) = (ADJUST.2 + T.ANGLE(tn%)) * 3.141593 / 180
        x(tn%) = 750.5 * TAN(ANGLE.2#(tn%)) / (TAN(ANGLE.2#(tn%)) - TAN(ANGLE.1#(tn
%)))

Y(tn%) = x(tn%) * TAN(ANGLE.1#(tn%))
        z(tn%) = (Z.1(tn%) + Z.2(tn%)) / 2 + rod.length%(tn%)
2330    NEXT tn%
        M1 = ((x(pszero%) + x(dszero%)) - (filex%(pszp%) - filex%(dszp%))) / 2
        n = (Y(pszero%) + Y(dszero%)) / 2: rl = z(dszero%) - filez%(dszp%)
        '                               rotate x-y
        OSET = ATN((Y(pszero%) - Y(dszero%)) / (x(pszero%) - x(dszero%)))
        FOR tn% = 1 TO numsensors%
        IF Y(tn%) = 0 THEN GOTO 2420
        X1(tn%) = (x(tn%) - M1) * COS(OSET) + (Y(tn%) - n) * SIN(OSET)
        Y1(tn%) = (Y(tn%) - n) * COS(OSET) - (x(tn%) - M1) * SIN(OSET)
        z1(tn%) = z(tn%) - rl
2420    NEXT tn%
        '                               rotate x-z
        ZXOSET = ATN((z1(pszero%) - z1(dszero%)) / (X1(pszero%) - X1(dszero%)))
        FOR tn% = 1 TO numsensors%
        IF Y(tn%) = 0 THEN GOTO 2490 ELSE Y2(tn%) = Y1(tn%)
        X2(tn%) = X1(tn%) * COS(ZXOSET) + z1(tn%) * SIN(ZXOSET)
        Z2(tn%) = z1(tn%) * COS(ZXOSET) - (X1(tn%) - X1(dszero%)) * SIN(ZXOSET)
2490    NEXT tn%
        '                               rotate y-z
        ZYOSET = ATN((Z2(zzero%) + (filez%(dszp%) - filez%(pat%(zzero%))) - Z2(dsze
ro%)) / (Y2(zzero%) - Y2(dszero%)))
        FOR tn% = 1 TO numsensors%
        IF Y(tn%) = 0 THEN GOTO 2570 ELSE X3(tn%) = X2(tn%)
        Y3(tn%) = Y2(tn%) * COS(ZYOSET) + Z2(tn%) * SIN(ZYOSET)
        Z3(tn%) = Z2(tn%) * COS(ZYOSET) - Y2(tn%) * SIN(ZYOSET)
        mx%(tn%) = CINT(X3(tn%)): my%(tn%) = CINT(Y3(tn%)): mz%(tn%) = CINT(Z3(tn%)
)
2570    NEXT tn%
        GOTO 3230
2600    tn% = 1  'Measure a scan IF side$ = "1" THEN a$ = INPUT$(LOC(1), #1) 'clear the buffer IF side$ = "1" THEN
        a$ = INPUT$(LOC(1), #1) 'clear the buffer
        PRINT #1, "0";
        FOR i = 1 TO 2500: NEXT i
END IF
IF LOC(1) = 0 THEN
        msg$ = "Laser Unit Is Unpluged. Press Any Key To Continue. ": GOSUB 4150
        DO
        k$ = INKEY$
        LOOP WHILE k$ = ""
        IF k$ = "Q" OR k$ = "q" THEN END
        msg$ = " ": GOSUB 4150
        GOTO 2600
        side$ = "1"
END IF
INPUT #1, a$: num.counts% = VAL(a$)

NC = (num.counts% - 4) / 6
        IF NC <> INT(NC) THEN
                       mistake% = 1
                       IF NC - INT(NC) < 0 THEN
                          msg1$ = "Targets Overlapping"
                       ELSE msg1$ = " Extra Reflections"
                       END IF
                       msg$ = "Side " + side$ + "-" + msg1$
                       GOSUB 4150: GOTO 3070
```

```
      END IF b$ = INPUT$(num.counts% * 3 + 2, #1)
  FOR i% = 0 TO num.counts% - 1
    T& = 0
    T& = T& + ASC(MID$(b$, i% * 3 + 2, 1))
    T& = T& + ASC(MID$(b$, i% * 3 + 3, 1)) * 256&
    T& = T& + ASC(MID$(b$, i% * 3 + 4, 1)) * 65536
    count&(i% + 1) = T&
  NEXT i%

M& = count&(num.counts%)

FOR ZERO% = 1 TO numsensors%
      T.ANGLE(ZERO%) = 0: T.HEIGHT(ZERO%) = 0
      NEXT ZERO%
      CEN& = (count&(3) + count&(2)) / 2

FOR n% = 4 TO num.counts% - 1 STEP 6
      LEADING& = count&(n%) - CEN&
      BAR.BEG& = count&(n% + 1) - CEN&
      CODE.BEG& = count&(n% + 2) - CEN&
      CODE.END& = count&(n% + 3) - CEN&
      BAR.END& = count&(n% + 4) - CEN&
      TRAILING& = count&(n% + 5) - CEN&

2990 T.WIDTH& = TRAILING& - LEADING&: BAR.CENTER& = (BAR.BEG& + BAR.END&) / 2
      T.ANGLE& = (LEADING& + TRAILING&) / 2
      code2 = (CODE.BEG& - BAR.BEG&) / (BAR.END& - CODE.END&) * 100
      CODE.PCT = ((CODE.END& - CODE.BEG&) / T.WIDTH&) * 100: GOSUB 3130
      IF T.ANGLE(CN%) <> 0 THEN msg$ = "TWO TARGETS # " + STR$(CN%): GOSUB 4150:
 mistake% = 1: GOTO 3070
      T.HEIGHT = 125 * .5 - (125 * (T.ANGLE& - BAR.CENTER&) / T.WIDTH&) / .353333
      T.ANGLE(CN%) = T.ANGLE& / M& * 360: T.HEIGHT(CN%) = T.HEIGHT
      tn% = tn% + 1

3060 NEXT n%
 3070 RETURN

3130 ' lookup target #
      IF CODE.PCT < 8.375 THEN GOTO 3221
      IF CODE.PCT < 13.13 THEN GOTO 3222
      IF CODE.PCT < 16.91 THEN CN% = 3: GOTO 3220
      IF CODE.PCT < 21.23 THEN CN% = 4: GOTO 3220
      IF CODE.PCT < 25.7 THEN CN% = 5: GOTO 3220
      IF CODE.PCT < 29.94 THEN CN% = 6: GOTO 3220
      IF CODE.PCT < 34.03 THEN CN% = 7: GOTO 3220
      CN% = 8

3220 RETURN

3221 IF code2 > 381 THEN CN% = 1: RETURN
      IF code2 > 220 THEN CN% = 9: RETURN
      IF code2 > 142 THEN CN% = 10: RETURN
      IF code2 > 97 THEN CN% = 11: RETURN
      IF code2 > 65 THEN CN% = 12: RETURN
      IF code2 > 42 THEN CN% = 13: RETURN
      IF code2 > 26 THEN CN% = 14: RETURN
      CN% = 15: RETURN 3222 IF code2 > 333 THEN CN% = 2: RETURN
      CN% = 16: RETURN 3230 'END OF GLEN'S PROGRAM ====================
      'display measurements
      GOSUB 4500
      IF second% = 1 THEN second% = 0: GOTO 1930
      '
      GOTO 1580
      '
 3300 'print menu
 3310 msg$ = "Print estimate ( P ), Quit ( Q ), Return ( R ), Save ( S ), Next Sc
 reen ( N )": GOSUB 4150
 3320 k$ = INKEY$: IF k$ = "" THEN 3320
      IF k$ = "Q" OR k$ = "q" THEN
          msg$ = "Do You Want To Save These Measurements ? ( Y ) or ( N )": GOSUB
  4150
```

```
            DO
            k$ = INKEY$: k$ = UCASE$(k$)
            IF k$ <> "" AND k$ <> "N" AND k$ <> "Y" THEN BEEP
            LOOP WHILE k$ <> "N" AND k$ <> "Y"
              IF k$ = "Y" THEN msg$ = "Saving": GOSUB 4150: GOSUB 11700: END
              END
          END IF
          IF k$ = "P" OR k$ = "p" THEN 3370
          IF k$ = "R" OR k$ = "r" THEN 1580
          IF k$ = "S" OR k$ = "s" THEN msg$ = "Saving": GOSUB 4150: GOSUB 11700: GOT
O 3310
          IF k$ = "N" OR k$ = "n" THEN GOSUB 7500:  GOTO 1580
        BEEP: GOTO 3310
        '
3370    '
        IF dszero% <> 0 THEN GOTO 3390

3375 msg$ = "Print Out Original Or Last Measurements. ( O ) or ( L ) ": GOSUB 41
50
        DO
        k$ = INKEY$
        LOOP WHILE k$ = ""
        IF k$ = "O" OR k$ = "o" THEN p.file$ = cv.first: GOTO 3380
        IF k$ = "L" OR k$ = "l" THEN p.file$ = cv.last: GOTO 3380
        BEEP: GOTO 3375
3380 msg$ = "": GOSUB 4150
        GOSUB 11800

3390  '
        msg$ = "": GOSUB 4150'clear status line
        'Program name="EST" -- Estimate printer
        '
        ESC$ = CHR$(27): BOLD$ = ESC$ + "G": NOBOLD$ = ESC$ + "H"
        BIG$ = ESC$ + "W1": NORMAL$ = ESC$ + "W0" + CHR$(18) + ESC$ + "P"
        VL$ = CHR$(186): VX$ = CHR$(197): UT$ = CHR$(193): dt$ = CHR$(194): UL$ = C
HR$(201): UR$ = CHR$(187): LL$ = CHR$(200): LR$ = CHR$(188)
        HLT$ = CHR$(185): HRT$ = CHR$(204)
        BN$ = "ULTRALINE Auto Body"
        AD1$ = "Box 133"
        AD2$ = "Benson, MN 56215"
        PH$ = "(612)843-2665"
        'printing starts here
        le = 26'left edge
        LPRINT ESC$; "E"
        LPRINT TAB(le); UL$; STRING$(27, 205); UR$
        LPRINT TAB(le); VL$; "     "; BOLD$; BN$; NOBOLD$; TAB(56); VL$
        LPRINT TAB(le); VL$; "          "; AD1$; TAB(54); VL$
        LPRINT TAB(le); VL$; "       "; AD2$; TAB(54); VL$
        LPRINT TAB(le); VL$; "        "; PH$; TAB(54); VL$
        LPRINT TAB(le); LL$; STRING$(27, 205); LR$
        '

LPRINT STRING$(8, 32); UL$; STRING$(60, 205); UR$
     LPRINT STRING$(8, 205); HLT$; BIG$; BOLD$; "    Frame Repair Estimate    "
; NOBOLD$; NORMAL$; HRT$; STRING$(8, 205)
     LPRINT STRING$(8, 32); LL$; STRING$(60, 205); LR$
     LPRINT
           LPRINT TAB(le - 10); BOLD$; "Date: "; NOBOLD$; DATE$; BOLD$; "     Time:
"; NOBOLD$;
        hour = VAL(TIME$)
        IF hour <= 12 THEN
           LPRINT STR$(hour); MID$(TIME$, 3, 3);
           IF hour < 12 THEN LPRINT " AM" ELSE LPRINT " PM"
        ELSE LPRINT STR$(hour - 12); MID$(TIME$, 3, 3); " PM"
        END IF
     LPRINT
     LPRINT TAB(10); BOLD$; "--- Customer Information ---"; TAB(45); "--- Vehicl
e Information ---"; NOBOLD$
     LPRINT ESC$; "F"'emphasized off
     qa$(10) = LTRIM$(qa$(10))
     LPRINT TAB(11); BOLD$; "Name: "; NOBOLD$; qa$(2) + SPACE$(1) + qa$(1); TAB(
46); BOLD$; "Vehicle: "; NOBOLD$; "19"; qa$(10); " "; qa$(11); " "; qa$(12)
     LPRINT TAB(8); BOLD$; "Address: "; NOBOLD$; qa$(3); TAB(48); BOLD$; "Color:
"; NOBOLD$; qa$(15)
```

```
        LPRINT TAB(17); qa$(4); ", "; qa$(5); " "; qa$(6); TAB(43); BOLD$; "Odomete
r: "; NOBOLD$; qa$(14)
        LPRINT TAB(10); BOLD$; "Phone: "; NOBOLD$; qa$(7); TAB(48); BOLD$; "VIN #:
"; NOBOLD$; qa$(9)

LPRINT TAB(7); BOLD$; "Ins. Co.: "; NOBOLD$; qa$(8); TAB(44); BOLD$; "Licen
se #: "; NOBOLD$; qa$(16)
        LPRINT
        LPRINT TAB(5); BOLD$; "Repair Order #: "; NOBOLD$; qa$(18); TAB(44); BOLD$;
   "Repair Technician: "; NOBOLD$; qa$(17)
        LPRINT
        LPRINT STRING$(80, 205)
        LPRINT
        '
        'print screen here
        GOSUB print.screen
        '
        LPRINT STRING$(80, 205)
        LPRINT CHR$(12);              'form feed '
        GOTO 3300 ' go back to Print,Quit,Return
        '
        'Subroutines....
        '
4150 'bottom line message printer
        cmsg% = 40 - LEN(msg$) / 2
        LOCATE 43, 1: COLOR 1, back%: PRINT SPACE$(80); : LOCATE 43, cmsg%: PRINT "
" + msg$ + " "; : COLOR fore%, back%
        RETURN
4160 'bottom line message printer
        cmsg% = 20 - LEN(msg$) / 2: after.use% = after.use% + 1
        LOCATE 25, 1: COLOR 15, back%: PRINT SPACE$(80); : LOCATE 25, cmsg%: PRINT
" " + msg$ + " "; : COLOR fore%, back%
        RETURN '
        '
4380 'print select sensor message
        msg$ = " Type Target Number to Place. Then ENTER. ( 0 ) to Stop ": GOSUB 41
50
        RETURN
        '
        'print select sensor message
4430 msg$ = "Use Arrow Keys to Locate Target #.  Hit <SPACEBAR> to Mark position
.": GOSUB 4150
        RETURN
        '
4460 'format and display measurements
        IF M% > 9999 THEN 4490'skip bogus measurement
        FST% = n% + LWH%
        cfm2%(FST%) = M%
        sfr%(FST%) = r%
        sfc%(FST%) = c%
        IF M% = 0 THEN GOSUB 4490: GOTO 4465
        LOCATE r%, c%: PRINT LTRIM$(STR$(M%));
4465 cff2%(FST%) = M1% -
        IF M1% = 0 THEN GOTO 4495
        COLOR 1, back%
        LOCATE r% - 1, c%: PRINT LTRIM$(STR$(M1%));
        COLOR fore%, back%
        RETURN
        '
4490 LOCATE r%, c%: PRINT "     ";   'erase length measurements from screen
4495 LOCATE r% - 1, c%: PRINT "     ";
        RETURN 4500 'adjust centerline IF mx%(zzero%) <= 0 THEN
            IF mx%(tap%(pat%(zzero%) + numplaces% / 2)) <> 0 AND c.line% = 0 THEN
                adj.cen% = (mx%(zzero%) + mx%(tap%(pat%(zzero%) + numplaces% / 2)))
 / 2
            ELSE adj.cen% = mx%(zzero%) + filex%(pat%(zzero%))
            END IF
```

```
        ELSE
            IF mx%(tap%(pat%(zzero%) - numplaces% / 2)) <> O AND c.line% = O THEN
                adj.cen% = (mx%(zzero%) + mx%(tap%(pat%(zzero%) - numplaces% / 2)))
/ 2
            ELSE adj.cen% = mx%(zzero%) - filex%(pat%(zzero%))
            END IF
        END IF
        oset1 = ATN(adj.cen% / my%(zzero%))
        IF ABS(adj.cen%) > 25 OR c.line% = 2 THEN GOTO 4510
        FOR tn% = 1 TO numsensors%
        IF mx%(tn%) = O THEN GOTO 4505
        my%(tn%) = my%(tn%) * COS(oset1) + mx%(tn%) * SIN(oset1)
        mx%(tn%) = mx%(tn%) * COS(oset1) - my%(tn%) * SIN(oset1)
4505 NEXT tn%
        'IF contin = 1 THEN GOTO measr'

4510 GOSUB 5660 '    try to find location of targets
        IF first.time% = 1 THEN GOTO 1930'
        ' erase dimension lines not used
        FOR n% = numplaces% / 2 + 1 TO numplaces%
        IF tap%(n%) <> O OR tap%(n% - numplaces% / 2) <> O THEN GOTO 4570

LINE (px%(n%), py%(n%))-(px%(n%), 323), O
4570 NEXT n%
        ,
        FOR n% = numplaces% / 2 + 1 TO numplaces%
        IF tap%(n%) = O AND tap%(n% - numplaces% / 2) = O THEN GOTO 4588
        IF n% > numplaces% - 2 THEN
            LINE (px%(n%), py%(n%))-(px%(n%), 265)'redraw lines
        ELSE
            LINE (px%(n%), py%(n%))-(px%(n%), 323)'redraw lines
        END IF
4588 NEXT n%
        LWH% = O '                        print width measurements to screen
        FOR n% = 1 TO numplaces%
        IF (tap%(n%)) = O THEN 4680
        M% = ABS(mx%(tap%(n%)))
        IF n% < numplaces% / 2 + 1 THEN r% = rdx%: GOTO 4650
        r% = rpx%
4650 c% = cx%(n%)
        M1% = filex%(n%): GOSUB 4460
4680 NEXT n%
        IF once% = O THEN once% = 1: second% = 1: RETURN
        GOSUB 6670        '       print length measurements to screen
        '       compute length measurements and columns of used positions
        LWH% = 40
        FOR n% = 1 TO numplaces%
        IF n% < numplaces% / 2 + 1 THEN GOTO 4840            'goto drivers sid
e
        IF n% = pszp% THEN PUT (px%(n%) + 1, 283 - 5), l.arrow%, PSET: PUT (px%(n%)
 - 6, 283 - 5), r.arrow%, PSET: GOTO 4890 ' pass side
        IF (tap%(n%)) = O THEN GOTO 4890
        IF n% > numplaces% - 2 THEN GOTO 4890
        M% = ABS(my%(tap%(n%)))
        M1% = FY%(n%)
        r% = rpy%
        c% = cy%(n%)
        GOSUB 4460
        GOTO 4890
4840 IF n% = dszp% THEN PUT (px%(n%) - 6, 307 - 5), r.arrow%, PSET: PUT (px%(n%)
 + 1, 307 - 5), l.arrow%, PSET: GOTO 4890 ' drivers side
        IF (tap%(n%)) = O THEN GOTO 4890
        IF n% > numplaces% / 2 - 2 THEN GOTO 4890
        M% = ABS(my%(tap%(n%)))
        M1% = FY%(n%)
        r% = rdy%
        c% = cy%(n%)
        GOSUB 4460
4890 NEXT n%
5110 '
        ' print height measurements to screen
        LWH% = 80
        FOR n% = 1 TO numplaces%
        IF (tap%(n%)) = O THEN GOTO 5210
        M% = mz%(tap%(n%))
```

```
         IF n% = strut1% OR n% = strut2% THEN M% = M% + strut.rod%
         IF n% < numplaces% / 2 + 1 THEN r% = rdz%: GOTO 5180
         r% = rpz%
5180     c% = cz%(n%)
         M1% = filez%(n%): GOSUB 4460
5210     NEXT n%
         RETURN 5240 '
         ctr% = ctr% + 1: IF ctr% <> 3 GOTO 5340      '      determine target locations o
f 3 reference points
         FOR n% = 1 TO numplaces%
         IF tap%(n%) <> 0 AND tap%(n% + numplaces% / 2) <> 0 THEN dszero% = tap%(n%)
: dszp% = n%: pszero% = tap%(n% + numplaces% / 2): pszp% = n% + numplaces% / 2:
GOTO 5310
         IF tap%(n%) <> 0 AND tap%(n%) = pszero% THEN GOTO 5310
         IF tap%(n%) <> 0 AND tap%(n%) = dszero% THEN GOTO 5310
         IF tap%(n%) <> 0 THEN zzero% = tap%(n%)
5310     NEXT n%
         '
         stp% = 1
5340     RETURN
         '
5660     '
         '                      self locate targets
         rng = 75'
         FOR T% = 1 TO numsensors%
         IF T% = dszero% OR T% = pszero% OR T% = zzero% THEN GOTO 5900
         IF mx%(T%) = 0 THEN GOTO 5900
         FOR CN% = 1 TO numplaces%
         IF tap%(CN%) = T% THEN GOTO 5900         '   already found position
         NEXT CN%
         IF mx%(T%) < 0 THEN GOTO 5930            '   drivers side
         '
         FY% = 0                           '  pass side ,in front of zero line
         FOR PN% = pszp% TO numplaces% / 2 + 2 STEP -1
         FY% = FY% + filey%(PN%)
         IF FY% > my%(T%) - rng AND FY% < my%(T%) + rng AND ABS(mx%(T%)) > filex%(PN
% - 1) - rng AND ABS(mx%(T%)) < filex%(PN% - 1) + rng THEN tap%(PN% - 1) = T%: s
nsr% = PN% - 1: GOSUB 6080: GOTO 5900
         NEXT PN%
         FY% = 0   '  pass side in back of zero line
         FOR PN% = pszp% + 1 TO numplaces%
         FY% = FY% - filey%(PN%)
         IF FY% > my%(T%) - rng AND FY% < my%(T%) + rng AND ABS(mx%(T%)) > filex%(PN
%) - rng AND ABS(mx%(T%)) < filex%(PN%) + rng THEN tap%(PN%) = T%: snsr% = PN%:
         GOSUB 6080: GOTO 5900
         NEXT PN%
         msg$ = "Use Arrow Keys to Place Target #" + STR$(T%) + ". Hit <SPACEBAR> to
 Mark Position.": GOSUB 4150' couldn't find position
         ms% = T%: LOCATE 23, 7: PRINT ms%; : IF ms% > 9 THEN l = 2 ELSE l = 1
         stp% = 0: sp% = 1: nn% = 1: GOSUB 1640: sp% = 0: stp% = 0: nn% = 0' have op
erator place target
5900     NEXT T%
         RETURN
         '
5930     FY% = 0    '     drivers side in front of zero line
         FOR PN% = dszp% TO 2 STEP -1
         FY% = FY% + filey%(PN%)
         IF FY% > my%(T%) - rng AND FY% < my%(T%) + rng AND ABS(mx%(T%)) > filex%(PN
% - 1) - rng AND ABS(mx%(T%)) < filex%(PN% - 1) + rng THEN tap%(PN% - 1) = T%: s
nsr% = PN% - 1: GOSUB 6080: GOTO 5900
         NEXT PN%
         FY% = 0    '  drivers side in back of zero line
         FOR PN% = dszp% + 1 TO numplaces% / 2
         FY% = FY% - filey%(PN%)
         IF FY% > my%(T%) - rng AND FY% < my%(T%) + rng AND ABS(mx%(T%)) > filex%(PN
%) - rng AND ABS(mx%(T%)) < filex%(PN%) + rng THEN tap%(PN%) = T%: snsr% = PN%:
GOSUB 6080: GOTO 5900
         NEXT PN%
         msg$ = "Use Arrow Keys to Place Target #" + STR$(T%) + ". Hit <SPACEBAR> to
 Mark Position.": GOSUB 4150' couldn't find position
         ms% = T%: LOCATE 23, 7: PRINT ms%; : IF ms% > 9 THEN l = 2 ELSE l = 1
```

```
           stp% = 0: sp% = 1: nn% = 1: GOSUB 1640: sp% = 0: stp% = 0: nn% = 0' have op
erator place target
      GOTO 5900
      '       self place target numbers on positions
6080 IF nn% = 0 THEN LOCATE 23, 7: PRINT T%: pat%(T%) = snsr%
      a$ = STR$(T%): IF LEN(a$) - 1 = 2 THEN GOTO 6120
      DRAW "c4 bm54,174 r10 d10 L10 u10": PAINT (55, 175), 7, 4
      sxsize% = 10: sysize% = 10: GOTO 6140
6120 DRAW "c4 bm54,174 r18 d10 L18 u10": PAINT (55, 175), 7, 4
      sxsize% = 18: sysize% = 10
6140 x% = 54: Y% = 174: GET (x%, Y%)-(x% + sxsize%, Y% + sysize%), xdcr%
6150 PUT (x%, Y%), xdcr%
      PUT (px%(snsr%) - sxsize% / 2, py%(snsr%) - sysize% / 2), xdcr%, PSET
      RETURN
      '
6190 '       input target number to place
      IF sp% = 1 THEN stp% = 1
6210 IF stp% = 1 THEN
         RETURN
      ELSE
         a$ = ""
         LOCATE 23, 7: PRINT "#";
  6215  k$ = INKEY$: IF k$ = "" THEN GOTO 6215
         IF LEN(k$) = 2 THEN GOTO 6225
         IF k$ = CHR$(13) THEN GOTO 6225
         IF ASC(k$) < 48 OR ASC(k$) > 57 THEN GOTO 6215
         a$ = a$ + k$: LOCATE 23, 8: PRINT a$;
         k$ = ""
      END IF
      GOTO 6215

6225 l = LEN(a$): IF l > 2 THEN BEEP: LOCATE 23, 7: PRINT SPACE$(l + 1): GOTO 62
 10
      IF a$ = "0" THEN stp% = 1: LOCATE 23, 7: PRINT SPACE$(l + 1): RETURN
      ms% = VAL(a$): IF ms% = 0 THEN BEEP: LOCATE 23, 7: PRINT SPACE$(l + 1): GOT
O 6210
      IF ms% > numsensors% THEN BEEP: LOCATE 23, 7: PRINT SPACE$(l + 1): GOTO 621
0
6260 IF nn% = 0 THEN GOSUB 4430
      IF l = 2 THEN GOTO 6300
      DRAW "c4 bm54,174 r10 d10 L10 u10": PAINT (55, 175), 7, 4
      sxsize% = 10: sysize% = 10: GOTO 6320
6300 DRAW "c4 bm54,174 r18 d10 L18 u10": PAINT (55, 175), 7, 4
      sxsize% = 18: sysize% = 10
6320 x% = 54: Y% = 174: GET (x%, Y%)-(x% + sxsize%, Y% + sysize%), xdcr%
      RETURN
6340 '       /
      ' Re-assign a target to a position
      FOR n% = 1 TO numsensors%
      IF n% = ms% THEN GOTO 6380
      IF tap%(mp%) = n% THEN GOSUB 6390
6380 NEXT n%
      RETURN
6390 IF ctr% < 3 THEN ctr% = ctr% - 1: GOTO 6430
      IF tap%(mp%) = dszero% THEN dszero% = ms%
      IF tap%(mp%) = pszero% THEN pszero% = ms%
      IF tap%(mp%) = zzero% THEN zzero% = ms%
      mx%(n%) = 0: my%(n%) = 0: mz%(n%) = 0
6430 RETURN
6440 '
      '
      FOR n% = 1 TO numplaces%
      IF n% = mp% THEN GOTO 6490
      IF tap%(n%) = ms% THEN GOSUB 6520
6490 NEXT n%
      RETURN
      '
6520 IF ctr% < 3 THEN ctr% = ctr% - 1: GOTO 6560
      IF tap%(n%) = dszero% THEN dszero% = tap%(mp%)
      IF tap%(n%) = pszero% THEN pszero% = tap%(mp%)
      IF tap%(n%) = zzero% THEN zzero% = tap%(mp%)
6560 nn% = 1: snsr% = n%: T% = ms%: GOSUB 6080: nn% = 0: snsr% = 0 '  erase old
target #
```

```
      SOUND 0, 0
      msg$ = " Keep Old Measurements or Discard Old Measurements ? ( K or D )": G
OSUB 4150
8010  k$ = INKEY$: IF k$ = "" THEN GOTO 8010
      IF k$ = "K" OR k$ = "k" THEN GOTO 6570
      IF k$ = "D" OR k$ = "d" THEN only.one% = 1: keep% = n%: GOSUB 1941: only.on
e% = 0: tap%(keep%) = 0: GOTO 6580
      BEEP: GOTO 8010
      '
6570  ti% = ti% + 1: p% = tap%(n%): tap%(n%) = numsensors% + ti%: Y(tap%(n%)) =
1: mx%(tap%(n%)) = mx%(p%): my%(tap%(n%)) = my%(p%): mz%(tap%(n%)) = mz%(p%)
6580 RETURN 6670  '
      '                            add the length measurements together
      FOR n% = 1 TO numplaces%
      IF n% > numplaces% / 2 GOTO 6840      ' pass side
      IF n% = dszp% THEN GOTO 7000
      IF n% < dszp% THEN GOTO 6790
      FY% = 0                               'drivers side rear
      FOR PN% = dszp% + 1 TO n%
      FY% = FY% + filey%(PN%)
      NEXT PN%
      GOTO 6990
      '                            drivers side front
6790  FY% = 0
      FOR PN% = n% + 1 TO dszp%
      FY% = FY% + filey%(PN%)
      NEXT PN%
      GOTO 6990
6840  '
      FY% = 0                      ' pass side
      IF n% = pszp% THEN GOTO 7000
      IF n% < pszp% THEN GOTO 6930
      FY% = 0                      'pass side rear
      FOR PN% = pszp% + 1 TO n%
      FY% = FY% + filey%(PN%)
      NEXT PN%
      GOTO 6990
6930  '
      FY% = 0                      'pass side front
      FOR PN% = n% + 1 TO pszp%
      FY% = FY% + filey%(PN%)
      NEXT PN%
      '
6990  FY%(n%) = FY%
7000  NEXT n%
      RETURN 7500  ' program ' SC '
      fore% = 1: back% = 3
      SCREEN 9, 1, 1: WIDTH 80, 43: COLOR fore%, back%
      FOR i = 1 TO 1000: NEXT i
      SCREEN 9, 0, 0
RETURN
'
print.screen:

SHELL "prtscn 0"
RETURN
'
10999
      IF ERR = 52 OR ERR = 53 OR ERR = 54 OR ERR = 64 OR ERR = 75 OR ERR = 76
THEN
          CLOSE #2
          IF help% = 10 THEN RESUME 19000 ELSE ON ERROR GOTO 0
      ELSEIF ERR = 57 THEN
          RESUME 2105
      ELSEIF ERR = 62 THEN
          RESUME NEXT
      ELSEIF ERR = 24 OR ERR = 57 OR ERR = 68 THEN
          try = numtries + 1
          RESUME 15
      ELSE
          PRINT "Some kind of ERROR has occurred!"; ERR; ERL; "-"
          ON ERROR GOTO 0
```

```
              END IF
              END
11500   '
        LOCATE 9, 45: PRINT "Retrieve An Old File,"
        LOCATE 10, 45: PRINT "Or Start A New File? "
        LOCATE 11, 45: PRINT " ( O ) or ( N ) "
11510   DO
          k$ = INKEY$
        LOOP WHILE k$ = ""
        k$ = UCASE$(k$)
        FOR i = 0 TO 3
        LOCATE 8 + i, 45: PRINT SPACE$(22)
        NEXT i
          IF k$ <> "O" AND k$ <> "N" THEN BEEP: GOTO 11500
          IF k$ = "N" THEN old.file = 0: GOTO 11550
        old.file = 1
11550   RETURN 11600   '
        f$(0) = "": x = 0
        SHELL "dir c:\perm\*.rec>c:\perm\sortdat"
        OPEN "c:\perm\sortdat" FOR INPUT AS #3
        DO
        LINE INPUT #3, a$
        b$ = LEFT$(a$, 1)
        IF b$ <> "." AND b$ <> "" AND b$ <> " " THEN
            a.file$ = LEFT$(a$, 8) + "." + MID$(a$, 10, 3)
            GOSUB 11650
            IF look.for$ = RTRIM$(qa$(q)) THEN
                x = x + 1
                f$(x) = a.file$
                LOCATE x, 45: PRINT x; " "; qa$(1); ", "; qa$(2); " "; qa$(10); " ";
qa$(12);
            END IF
        END IF
        LOOP WHILE NOT EOF(3)
        CLOSE #3
        go.search = 0:   q = 1
        IF x = 0 THEN
            prnt.q = 0
            LOCATE 8, 45: PRINT "No Match Found.";
            FOR i% = 1 TO qnum - 1
            qa$(i%) = ""
            NEXT i%
        ELSE prnt.q = 1
        END IF
        IF f$(x) = "" THEN GOTO 11620
            LOCATE x + 2, 45: PRINT "Enter The Number ";
            LOCATE x + 3, 45: PRINT "Of File To Use";
11610       LOCATE x + 3, 59: INPUT ; xa$
            IF VAL(xa$) < 1 OR VAL(xa$) > x THEN
                BEEP
                LOCATE x + 3, 56: PRINT SPACE$(LEN(xa$) + 2);
                GOTO 11610
            ELSE
                FOR i = 1 TO x + 3
                LOCATE i, 45: PRINT SPACE$(34);
                NEXT i
            END IF
        a.file$ = f$(VAL(xa$))
        GOSUB 11650

11620   '
        RETURN

11650   '
            OPEN "c:\perm\" + a.file$ FOR RANDOM AS #4 LEN = LEN(cv)
            GET #4, 1, cv
        qa$(1) = RTRIM$(cv.lname)
        qa$(2) = RTRIM$(cv.fname)
        qa$(3) = RTRIM$(cv.addr)
        qa$(4) = RTRIM$(cv.city)
        qa$(5) = RTRIM$(cv.st)
```

```
      qa$(6) = RTRIM$(cv.zip)
      qa$(7) = RTRIM$(cv.phone)
      qa$(8) = RTRIM$(cv.ins)
      qa$(9) = RTRIM$(cv.vin)
      qa$(10) = RTRIM$(cv.yr)
      qa$(11) = RTRIM$(cv.make)
      qa$(12) = RTRIM$(cv.model)
      qa$(13) = RTRIM$(cv.typ)
      qa$(14) = RTRIM$(cv.miles)
      qa$(15) = RTRIM$(cv.col)
      qa$(16) = RTRIM$(cv.plate)
      qa$(17) = RTRIM$(cv.tech)
      qa$(18) = RTRIM$(cv.ro)
      first.file$ = RTRIM$(cv.first)
      last.file$ = RTRIM$(cv.last)
         CLOSE #4
RETURN

11660 ' cv.lname = qa$(1)
      cv.fname = qa$(2)
      cv.addr = qa$(3)
      cv.city = qa$(4)
      cv.st = qa$(5)
      cv.zip = qa$(6)
      cv.phone = qa$(7)
      cv.ins = qa$(8)
      cv.vin = qa$(9)
      cv.yr = qa$(10)
      cv.make = qa$(11)
      cv.model = qa$(12)
      cv.typ = qa$(13)
      cv.miles = qa$(14)
      cv.col = qa$(15)
      cv.plate = qa$(16)
      cv.tech = qa$(17)
      cv.ro = qa$(18)

RETURN

11700 '

GOSUB 11660

IF a.file$ = "" THEN
         a.file$ = LEFT$(qa$(1), 5)
         SHELL "dir c:\perm\" + a.file$ + "*.rec !sort>c:\perm\sdat"
         OPEN "c:\perm\sdat" FOR INPUT AS #3
         DO WHILE NOT EOF(3)
         LINE INPUT #3, a$
         LOOP
         b = VAL(MID$(a$, 6, 3))
         b = b + 1
         b$ = LTRIM$(STR$(b))
         b$ = "00" + b$
         b$ = RIGHT$(b$, 3)
         a.file$ = LEFT$(qa$(1), 5) + b$ + ".rec"
         CLOSE #3
      END IF IF first.file$ = "" THEN
         cv.first = LEFT$(a.file$, 9) + "ONE"
         OPEN "c:\perm\" + a.file$ FOR RANDOM AS #4 LEN = LEN(cv)
         PUT #4, 1, cv
         CLOSE #4
         OPEN "c:\perm\" + cv.first FOR RANDOM AS #5 LEN = LEN(orf)
         FOR i% = 1 TO 120
         orf.measurements = cfm2%(i%)
         orf.filenums = cff2%(i%)
         orf.rws = sfr%(i%)
         orf.clms = sfc%(i%)
         PUT #5, i%, orf
```

```
   NEXT i%
   dt$ = LEFT$(DATE$, 2) + MID$(DATE$, 4, 2)
   orf.measurements = VAL(dt$)
   orf.filenums = VAL(RIGHT$(DATE$, 2))
   orf.rws = VAL(LEFT$(TIME$, 2))

orf.clms = VAL(MID$(TIME$, 4, 2
   PUT #5, 121, orf
   CLOSE #5
   END IF
   IF last.file$ = "" THEN
       cv.last = LEFT$(a.file$, 9) + "TWO"
       OPEN "c:\perm\" + a.file$ FOR RANDOM AS #4 LEN = LEN(cv)
       PUT #4, 1, cv
       CLOSE #4
   END IF OPEN "c:\perm\" + cv.last FOR RANDOM AS #5 LEN = LEN(orf)
       FOR i% = 1 TO 120
       orf.measurements = cfm2%(i%)
       orf.filenums = cff2%(i%)
       orf.rws = sfr%(i%)
       orf.clms = sfc%(i%)
       PUT #5, i%, orf
       NEXT i%
       dt$ = LEFT$(DATE$, 2) + MID$(DATE$, 4, 2)
       orf.measurements = VAL(dt$)
       orf.filenums = VAL(RIGHT$(DATE$, 2))
       orf.rws = VAL(LEFT$(TIME$, 2))
       orf.clms = VAL(MID$(TIME$, 4, 2))
       PUT #5, 121, orf
       CLOSE #5

RETURN

11800 '

OPEN "c:\perm\" + p.file$ FOR RANDOM AS #5 LEN = LEN(orf)
       FOR i% = 1 TO numplaces%
       GET #5, i%, orf
       M% = orf.measurements
       M1% = orf.filenums
       r% = orf.rws
       c = orf.clms
       IF M1% <> 0 THEN GOSUB 11880
       NEXT i%
       FOR i% = 41 TO 40 + numplaces%
       GET #5, i%, orf
       M% = orf.measurements
       M1% = orf.filenums
       r% = orf.rws
       c = orf.clms
       IF M1% <> 0 THEN GOSUB 11880
       NEXT i%
       FOR i% = 81 TO 80 + numplaces%
       GET #5, i%, orf
       M% = orf.measurements
       M1% = orf.filenums
       r% = orf.rws
       c = orf.clms
       IF M1% <> 0 THEN GOSUB 11880
       NEXT i%
       GET #5, 121, orf
       f.date = orf.measurements
       s.date = orf.filenums
```

```
       f.time = orf.rws
       s.time = orf.clms
       z$ = LTRIM$(STR$(f.date))
       IF LEN(z$) = 3 THEN z$ = LEFT$(z$, 1) ELSE z$ = LEFT$(z$, 2)
       M$ = z$ + "-" + RIGHT$(STR$(f.date), 2) + "-" + LTRIM$(STR$(s.date))
       w$ = LTRIM$(STR$(s.time))
       IF LEN(w$) = 1 THEN w$ = "0" + w$
       hr$ = STR$(f.time)
       M1$ = hr$ + ":" + w$
       LOCATE 23, 2: PRINT M$
       LOCATE 24, 2: PRINT M1$
       CLOSE #5

RETURN

11880 '
    LOCATE r%, c: PRINT LTRIM$(STR$(M%));
    COLOR 1, back%
    LOCATE r% - 1, c: PRINT LTRIM$(STR$(M1%));
    COLOR fore%, back%
    RETURN
19000 '
    LOCATE 8, 47: PRINT "There is no file on";
    LOCATE 9, 47: PRINT "record for the car you";
    LOCATE 10, 47: PRINT "entered.  If you wish to";
    LOCATE 11, 47: PRINT "change the vehicle ";
    LOCATE 12, 47: PRINT "information type ' C '.";
    LOCATE 14, 47: PRINT " to use Generic vehicle "
    LOCATE 15, 47: PRINT "information type ' G ',";
    LOCATE 16, 47: PRINT "to enter the make and model";
    LOCATE 17, 47: PRINT "type ' M '.";
    DO
      k$ = INKEY$
    LOOP WHILE k$ = ""
    FOR l% = 8 TO 17
      LOCATE l%, 47: PRINT SPACE$(30);
    NEXT l%
    IF k$ = "C" OR k$ = "c" THEN
        q = q - 1
        print.q = 0
        GOTO 770
    END IF
    IF k$ = "G" OR k$ = "g" THEN
      data.file$ = "GENERIC"
      prnt.q = 0
      GOTO 770
    END IF
    IF k$ = "M" OR k$ = "m" THEN
      prnt.q = 0
      GOTO 770
    ELSE BEEP: GOTO 19000
    END IF SUB dfile (qa$(), data.file$, f1$)

' Program for naming spec. files f1$ = "": f2$ = "": f3$ = "": f4$ = ""

' qa$(11) = UCASE$(qa$(11))
    qa$(12) = UCASE$(qa$(12))
    qa$(13) = UCASE$(qa$(13))
    f1$ = qa$(10)
    f1$ = LTRIM$(f1$)
    IF LEN(f1$) > 2 THEN f1$ = "0" + MID$(f1$, 2, 1)
    f2$ = LEFT$(qa$(11), 5)

f3$ = LEFT$(qa$(12), 3)
```

```
        typ$ = LEFT$(qa$(13), 1)
        IF typ$ = "2" THEN
            IF LEN(qa$(13)) > 11 THEN f3$ = "3DR": GOTO 10020
            f4$ = "2DR": GOTO 10020
            END IF IF typ$ = "3" THEN f4$ = "3DR": GOTO 10020

IF typ$ = "4" THEN
            IF LEN(qa$(13)) > 11 THEN f4$ = "5DR": GOTO 10020
            f4$ = "4DR": GOTO 10020
            END IF IF typ$ = "5" THEN f4$ = "5DR": GOTO 10020

IF typ$ = "C" THEN f4$ = "CON": GOTO 10020

IF typ$ = "W" OR typ$ = "S" THEN f4$ = "WAG": GOTO 10020

IF typ$ = "L" THEN f4$ = "LIM"

10020   data.file$ = f2$ + f3$ + "." + f4$
END SUB

SUB vins (qa$(), bad)

bad = 0
    FOR i% = 10 TO 13
    qa$(i%) = ""
    NEXT i%

IF LEN(qa$(9)) < 10 THEN bad = 1: GOTO 11000
    vin$ = UCASE$(qa$(9))
    ten$ = MID$(vin$, 10, 1)
    IF ASC(ten$) < 74 THEN qa$(10) = LTRIM$(STR$(ASC(ten$) + 15)) ELSE qa$(10) = LTRIM$(STR$(ASC(ten$) + 14))
    ff$ = "c:\info\vins\" + LEFT$(qa$(10), 2) + "MAKES"
    OPEN ff$ FOR INPUT AS #2
    INPUT #2, title$
    WHILE NOT (EOF(2))
       a% = 1
       INPUT #2, CODE$, make$
       FOR a% = 1 TO 3
       b$ = MID$(CODE$, a%, 1)
       d$ = MID$(vin$, a%, 1)
       IF b$ = "*" OR b$ = d$ THEN GOTO 10104
       GOTO 10105
10104    NEXT a%
         GOTO 10120
10105   '
    WEND
10120 CLOSE #2
    IF LEN(make$) > 8 THEN make$ = LEFT$(make$, 8)
    mod.file$ = "c:\info\vins\" + make$ + ".MOD"
    OPEN mod.file$ FOR INPUT AS #2
    INPUT #2, qa$(11), title$
    WHILE NOT (EOF(2))
    a% = 1
    INPUT #2, CODE$, mod$, typ$
    FOR a% = 4 TO 9
    b$ = MID$(CODE$, a% - 3, 1)
    d$ = MID$(vin$, a%, 1)
    IF b$ = "*" OR b$ = d$ THEN GOTO 10204
    GOTO 10205
10204 NEXT a%
    qa$(12) = mod$: qa$(13) = typ$: GOTO 10220

10205   '

WEND
10220 CLOSE #2
    GOTO 11000

11000 END SUB
```

This completes the description of the preferred and alternate embodiments of the invention. Those skilled in the art may recognize other equivalents to the specific embodiment described herein which equivalents are intended to be encompassed by the claims attached hereto.

What is claimed is:

1. Apparatus for indicating deformation of a vehicle body or the like, said vehicle body having at least one reference point and a normal position thereof, said apparatus comprising:

at least one target means including a reflective portion, positioned in a predetermined location relative to the reference point on the vehicle body for indicating deformation of the body by the position of the target means relative to said normal position thereof;

means for sweeping a beam of radiation across the reflective portion of the target means, said reflective portion reflecting said beam;

said beam sweeping means comprising two laser beams and a rotating mirror associated with each beam for receiving the beam therefrom respectively, whereby each laser beam sweeps a 360° arc;

means for receiving radiation reflected from the target means; and means for interpreting the radiation reflected from the target means and for indicating at least the two-dimensional spatial position of the target means relative to normal position.

2. A combination radiation source and receiving means for use with reflective targets for determining the spatial coordinates of points associated with the targets, the radiation source and receiving means comprising:

radiation means for producing a beam;

rotatable means for directing the beam toward the targets and sweeping it across the targets;

means mounting the radiation means and the rotatable reflective means with respect to each other such that the beam reflects from a fixed origin on the reflective means;

receiver means for receiving reflected radiation from the target;

means responsive to the receiver means for interpreting the radiation reflected from the target and determining at least the two-dimensional spatial coordinates of the points associated with the targets; and, a beam splitter for splitting the beam into two beams of equal intensity;

the rotatable reflective means being comprised of two rotating mirrors, the two mirrors being mounted and the beams being directed onto the rotating mirrors such that the reflected beams are co-planar.

3. The combination of claim 2 wherein the receiver means comprises switch means for switching between two states depending on the presence or absence of radiation and further including counter means for counting a number of time interval counts of equal duration over a radiation sweep.

4. The combination of claim 3 further including:

computing means for identifying those counts during which reflected radiation is received by the receiving means and during which reflected radiation is not received.

5. Apparatus for indicating deformation of a vehicle body or the like, comprising:

a set of reflectively coded targets for attachment to a body in predetermined locations;

a radiation source and receiving means adapted for placement under the body and constructed and arranged to sweep two beams of radiation through a 360° circle, parallel to the surface on which the radiation source and receiving means is placed such that the coded targets are swept by the beams;

counter means for counting a number of time interval counts of equal duration over a 360° radiation sweep;

computing means for identifying those counts during which reflected radiation is received by the receiving means and during which it is not, to thereby determine the three dimensional spatial coordinates of a point associated with the target and for determining the normal position of said point, and program means for operating said apparatus including reference data of the normal location, with respect to a reference plane, of said predetermined locations on the vehicle, said program means being stored in a RAM memory and constructed and arranged to control the operation of said apparatus so as to:

gather the following input from an operator:
 (a) the type of vehicle,
 (b) the placement of three coded reference targets which form a reference plane,
 (c) a start signal from the operator to start the measurement process;

initialize the counter means to zero;

retrieve the counter means information after a complete 360° sweep;

calculate the (X,Y,Z) coordinates of each coded target;

rotate the (X,Y,Z) coordinates into the reference plane formed by the three reference targets, and graphically display the placement of the coded targets on a vehicle of the type input by the operator, showing the relative displacement of the actual spatial coordinates and the normal spatial coordinates.

6. The apparatus of claim 5 wherein the program means is further constructed and arranged so as to:

verify that the correct amount of data is received from the counter means;

verify that the two beams are rotating at the correct speed; and store the graphical display on a non-volatile memory at the user's request.

7. The apparatus of claim 5 wherein the program means is further constructed and arranged so as to:

access stored information concerning a particular type of vehicle based on the Vehicle Identification Number.

8. Apparatus for measuring accidental deformation of a vehicle comprising:

a laser source and measuring unit, adapted for placement under the vehicle;

a plurality of coded reflective targets adapted to be positioned with respect to predetermined locations on the vehicle;

computer means including reference data of the normal location, with respect to a reference plane, of said predetermined locations on the vehicle; and a processing program for accepting output from the source and measuring unit representing the deformed position of said points as computed based on reflections from the coded targets and for processing the output and comparing it to the reference data whereby the amount of deformation may be indicated;

said laser source and measuring unit providing two laser beams and a rotating mirror associated with each beam for receiving radiation therefrom respectively, whereby each laser beam sweeps an entire 360° arc.

9. Apparatus for measuring accidental deformation of a vehicle comprising:

a laser source and measuring unit, adapted to be placed under the vehicle, the laser source and measuring unit being comprised of source means for two laser beams and a pair of rotating mirrors for receiving each of the laser beams respectively, whereby each laser beam sweeps an entire 360° arc;

a plurality of coded reflective targets adapted to be positioned with respect to predetermined locations on the vehicle, each coded reflective target comprising at least two reflective areas separated by a non-reflective area, wherein the width of each of the two reflective areas at which the beam sweeps across the surface of the coded target is indicative of a Z coordinate of the target, and the total width of the target is indicative of X,Y coordinates of the target;

counter means for counting a number of time interval counts of equal duration over a 360° radiation sweep;

computing means for identifying those counts during which reflected radiation is received by the receiving means and during which it is not, to thereby determine the three dimensional spatial coordinates of a point associated with the target and including reference data of the normal location, with respect to a reference plane, of said predetermined locations on the vehicle, and program means for operating said apparatus, said program means being stored in a RAM memory and constructed and arranged to control the operation of said apparatus so as to:

gather the following input from an operator:
(a) the type of vehicle,
(b) the placement of three coded reference targets which form a reference plane,
(c) a start signal from the operator to start the measurement process;

initialize the counter means to zero;

retrieve the counter means information after a complete 360° sweep;

calculate the X,Y,Z coordinates of each coded target;

rotate the X,Y,Z coordinates into the reference plane formed by the three reference targets, and graphically display the placement of the coded targets on a vehicle of the type input by the operator, showing the relative displacement of the actual spatial position and the normal spatial position whereby the amount of deformation may be indicated.

10. An electronic vehicular frame/structure analyzer comprising:

a laser beam unit having a laser beam generator which directs a laser beam at a beam splitter which splits the laser beam into two beams of equal intensity, each of which is reflected off of a rotating mirror;

a beam sensor connected to the laser beam unit;

a counter connected to the beam sensor;

a plurality of manually located targets coded with vertically-skewed, target unique reflective and non-reflective strips, the reflective strips constructed such that a laser beam that strikes it is reflected back to the beam sensor, and electronic means including:

a computer;

programming means incorporating vehicle frame/structure manufacturing specifications and screen displays;

a computer screen connected to the computer;

whereby the computer, programming means, screens and printer process information from the counter and the beam sensor to:

calculate three dimensional (X,Y,Z) coordinates of the targets;

select three targets as reference points;

calculate a reference plane including the reference points;

translate the (X,Y,Z) coordinates of the non-selected targets into the coordinate system of the reference plane;

display and print translated (X,Y,Z) coordinates of all the targets, and manufacturing specifications, and revise the translated coordinates repeatedly on command.

* * * * *